United States Patent
Tachikawa et al.

(10) Patent No.: US 8,097,685 B2
(45) Date of Patent: Jan. 17, 2012

(54) DENDRITIC POLYMER, METHOD FOR PRODUCING THE SAME, AND THERMOPLASTIC RESIN COMPOSITION

(75) Inventors: Koji Tachikawa, Toyota (JP); Makito Yokoe, Nagoya (JP); Mitsushige Hamaguchi, Nagoya (JP); Makiko Saito, Nagoya (JP); Hideo Matsuoka, Ichinomiya (JP); Toru Yamanaka, Nagoya (JP)

(73) Assignee: TORAY Industries, Inc., Tokyo (JP)

( * ) Notice: Subject to any disclaimer, the term of this patent is extended or adjusted under 35 U.S.C. 154(b) by 0 days.

(21) Appl. No.: 12/225,811

(22) PCT Filed: Mar. 30, 2007

(86) PCT No.: PCT/JP2007/057066
§ 371 (c)(1),
(2), (4) Date: Oct. 24, 2008

(87) PCT Pub. No.: WO2007/116818
PCT Pub. Date: Oct. 18, 2007

(65) Prior Publication Data
US 2009/0118417 A1 May 7, 2009

(30) Foreign Application Priority Data

Mar. 30, 2006 (JP) ................... 2006-093714
Jun. 27, 2006 (JP) ................... 2006-176127
Jun. 27, 2006 (JP) ................... 2006-176188

(51) Int. Cl.
*C08G 63/00* (2006.01)

(52) U.S. Cl. ........ 525/437; 525/425; 525/439; 525/444; 525/445; 525/450; 528/272; 528/296; 528/302; 528/305; 528/308; 528/361

(58) Field of Classification Search .................. 525/437, 525/448, 425, 439, 444, 450; 528/296, 272, 528/302, 305, 308, 361
See application file for complete search history.

(56) References Cited

U.S. PATENT DOCUMENTS

| | | | | |
|---|---|---|---|---|
| 4,410,683 A | | 10/1983 | Gale | 528/125 |
| 4,542,203 A | | 9/1985 | Ueno et al. | 528/126 |
| 5,196,502 A | | 3/1993 | Turner et al. | 528/272 |
| 5,324,612 A | * | 6/1994 | Maeda et al. | 430/109.4 |
| 5,326,832 A | * | 7/1994 | Belder et al. | 525/438 |
| 6,054,007 A | * | 4/2000 | Boyd et al. | 156/245 |
| 2004/0152005 A1 | * | 8/2004 | Ito et al. | 430/109.4 |
| 2004/0256599 A1 | * | 12/2004 | Ueno et al. | 252/299.62 |
| 2006/0211822 A1 | | 9/2006 | Varlet et al. | 525/165 |

FOREIGN PATENT DOCUMENTS

| | | |
|---|---|---|
| EP | 0 793 146 A1 | 9/1997 |
| JP | 58-104924 A | 6/1983 |
| JP | 64-024827 A | 1/1989 |
| JP | 02-180923 A | 7/1990 |
| JP | 03-054574 A | 3/1991 |
| JP | 03-275715 A | 12/1991 |
| JP | 05-038007 B2 | 6/1993 |
| JP | 05-214083 A | 8/1993 |
| JP | 06-340797 A | 12/1994 |
| JP | 10-010720 A | 1/1998 |
| JP | 2000-264965 A | 9/2000 |
| JP | 2005-513186 A | 5/2005 |

* cited by examiner

*Primary Examiner* — James J Seidleck
*Assistant Examiner* — Robert Jones, Jr.
(74) *Attorney, Agent, or Firm* — Kubovcik & Kubovcik

(57) ABSTRACT

The present invention is directed to a hyperbranched-polyester comprising at least one kind of a structural unit selected from an aromatic oxycarbonyl unit (P), aromatic and/or aliphatic dioxy units (Q), and an aromatic dicarboxy unit (R), and a trifunctional or higher polyfunctional organic residue (B), wherein the content of B is within a range from 7.5 to 50 mol % based on entire monomers constituting the hyperbranched-polyester. The present invention provides a hyperbranched-polyester which can remarkably improve thin-wall flowability, stiffness and gas barrier property by blending with a thermoplastic resin, and a thermoplastic resin composition blended with the same.

14 Claims, No Drawings

DENDRITIC POLYMER, METHOD FOR PRODUCING THE SAME, AND THERMOPLASTIC RESIN COMPOSITION

This application is a 371 of international application PCT/JP2007/057066, filed Mar. 30, 2007, which claims priority based on Japanese patent application Nos. 2006-093714, 2006-176188 and 2006-176127 filed Mar. 30, 2006, Jun. 27, 2006, and Jun. 27, 2006, respectively, which are incorporated herein by reference.

TECHNICAL FIELD

The present invention relates to a hyperbranched-polyester having a lot of sterically controlled functional groups, which can exert the effect of improving thin-wall flowability of a thermoplastic resin and enabling reduction in thickness and weight through an improvement in gas barrier property and stiffness by blending with a thermoplastic resin.

BACKGROUND ART

High-performance requirements to plastics have more increased recently, and thus a lot of polymers with various novel performances have been developed and marketed. Among these, liquid crystalline resins such as optically anisotropic liquid crystalline polyesters characterized by a parallel arrangement of molecular chains have become of major interest in view of excellent moldability and mechanical properties and demands have increases in injection molding applications mainly for electric/electronic components.

However, when the liquid crystalline resins are used alone and in combination with other thermoplastic resins, very large anisotropy exceeds the limitation of use or design of moldings and the use may be limited.

Therefore, for the purpose of reducing anisotropy, it is studied to introduce branching by blending a liquid crystalline polyester with a tri- or tetrafunctional compound by copolymerization or kneading (refer to patent Japanese Unexamined Patent Publication (Kokai) No. 58-104924 (page 1 to 5); and Japanese Examined Patent Publication (Kokoku) No. 5-38007 (pages 1 and 2)).

Japanese Unexamined Patent Publication (Kokai) No. 58-104924 (page 1 to 5) describes that a mechanical strength in a transverse direction of a liquid crystalline resin is improved by introducing a small amount of a branched structure, and Japanese Examined Patent Publication (Kokoku) No. 5-38007 (pages 1 and 2) describes that flow anisotropy of a liquid crystalline resin is improved by introducing a small amount of a branched structure. However, when crosslinking points are introduced into the liquid crystalline resin, since an ordered structure of the liquid crystalline resin is broken, it cannot be said that the effect has a sufficient balance.

It is also studied to introduce a similar branched structure so as to attain balance between weld strength and moldability (refer to Japanese Unexamined Patent Publication (Kokai) No. 3-275715 (page 1); and Japanese Unexamined Patent Publication (Kokai) No. 6-340797 (page 1).

In Japanese Unexamined Patent Publication (Kokai) No. 3-275715 (page 1), it is studied to achieve high polymerization degree by copolymerizing a liquid crystalline resin with a tri- or tetrafunctional structural unit. Although mechanical properties and weld strength are surely improved, melt viscosity increases when compared with a non-crosslinked polymer having an identical molecular weight, and fluidity is not improved.

In Japanese Unexamined Patent Publication (Kokai) No. 6-340797 (page), a polyester oligomer having a tetrabranched structure is blended with a liquid crystalline resin, and thus mold releasability is improved and also a good balance between mechanical properties is achieved. However, the polyester oligomer having a branched structure and a liquid crystalline resin are not positively reacted and performances deteriorate when an additive amount increases.

It is also studied to develop polyamide having a hyperbranched-structure, and to improve fluidity by blending the polyamide with a thermoplastic resin (refer to Published Japanese Translation No. 2005-513186 of the PCT Application (page 1); and Japanese Unexamined Patent Publication (Kokai) No. 2000-264965 (page 1)).

In Published Japanese Translation No. 2005-513186 of the PCT Application (page 1); and Japanese Unexamined Patent Publication (Kokai) No. 2000-264965 (page 1), a hyperbranched-polymer having a heteroatom as a branching point is studied. In case of having a heterobranching point, sufficient performances cannot be obtained since thermostability is not sufficient.

Japanese Unexamined Patent Publication (Kokai) No. 5-214083 (page 1 to 2) discloses synthesis of a heterobranched polymer by polymerizing only a branched structure.

DISCLOSURE OF THE INVENTION

An object of the present invention is to provide a hyperbrahched-polyester which has high viscosity response under shear while improving anisotropy, as characteristics of a liquid crystalline resin and characteristics in question, and also can exert the effect of improving thin-wall flowability of a thermoplastic resin and improving gas barrier property and stiffness by blending with a thermoplastic resin.

The present inventors have intensively studied so as to achieve the above object and found a hyperbranched-polyester having a new structure which shows liquid crystallinity, and thus the present invention has been completed.

That is, the present invention is directed to a hyperbranched-polyester comprising at least one kind of a structural unit selected from an aromatic oxycarbonyl unit (P), aromatic and/or aliphatic dioxy units (Q), and an aromatic dicarbonyl unit (R), and a trifunctional or higher polyfunctional organic residue (B), wherein the content of B is within a range from 7.5 to 50 mol % based on entire monomers constituting the hyperbranched-polyester.

The present invention also includes a thermoplastic resin composition comprising the above hyperbranched-polyester and a thermoplastic resin.

The present invention also includes a method for preparing a hyperbranched-polyester, which comprises reacting a monomer including at least one kind of a structural unit selected from a structural unit represented by the following formula R1, a monomer including at least one kind of a structural unit selected from a structural unit represented by the following formula R2, a monomer including at least one kind of a structural unit selected from a structural unit represented by the following formula R3, and a trifunctional or higher polyfunctional monomer, wherein an amount (mol) the polyfunctional compound is 7.5 mol % or more based on the entire monomers constituting the hyperbranched-polyester:

[Chemical Formula 1]

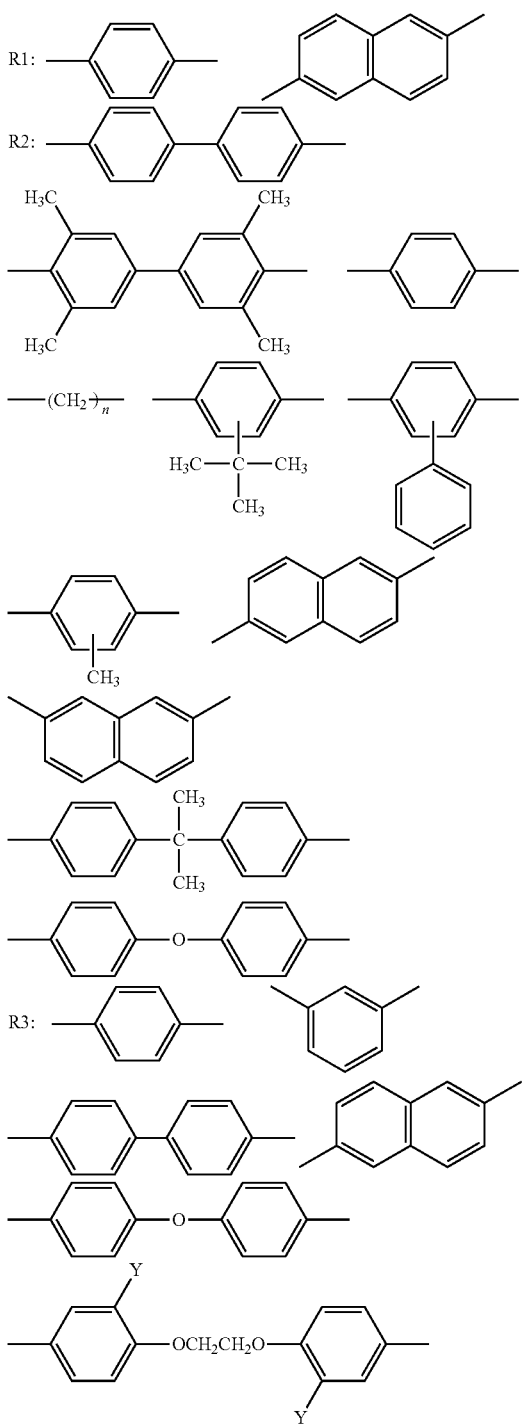

The hyperbranched-polyester of the present invention has small anisotropy and is excellent in viscosity response under shear and also has a lot of reactive functional groups, and is therefore sufficient in reactivity and compatibility with various thermoplastic resins. Therefore, thin-wall flowability, stiffness and gas barrier property can be remarkably improved by blending the hyperbranched-polyester of the present invention with a thermoplastic resin.

The thermoplastic resin composition blended with the hyperbranched-polyester of the present invention can be formed into moldings, sheets, pipes, films and fibers, which have excellent surface appearance (color tone) and mechanical properties, heat resistance and flame retardancy by a molding method such as a conventional injection molding, extrusion molding or press molding method. The thermoplastic resin is useful for a giant molding having a thin-wall portion, or a fuel tank having a gas barrier property.

BEST MODE FOR CARRYING OUT THE INVENTION

The hyperbranched-polyester of the present invention is a hyperbranched-polyester comprising at least one kind of a structural unit selected from an aromatic oxycarbonyl unit (P), aromatic and/or aliphatic dioxy units (Q), and an aromatic dicarbonyl unit (R), and a trifunctional or higher polyfunctional organic residue (B), wherein the content of B is within a range from 7.5 to 50 mol % based on entire monomers constituting the hyperbranched-polyester.

The aromatic oxycarbonyl unit (P), the aromatic and/or the aliphatic dioxy unit (Q) and the aromatic dicarbonyl unit (R) each preferably represents a structural unit represented by the following formula (1):

[Chemical Formula 2]

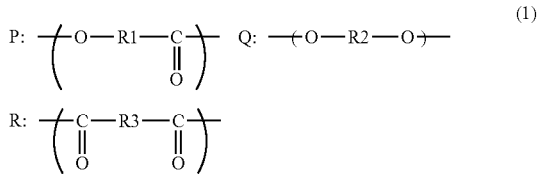

(1)

wherein R1 and R3 each represents an aromatic residue, R2 represents an aromatic residue or an aliphatic residue, and R1, R2 and R3 may contain plural structural units.

The aromatic residue includes, for example, a substituted or unsubstituted phenylene group, naphthylene group or biphenylene group, and the aliphatic residue includes, for example ethylene, propylene or butylenes. R1, and R3 each preferably represents at least one structural unit selected from structural units represented by the following formula:

[Chemical Formula 3]

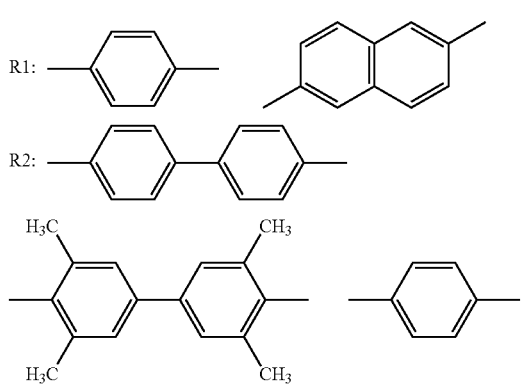

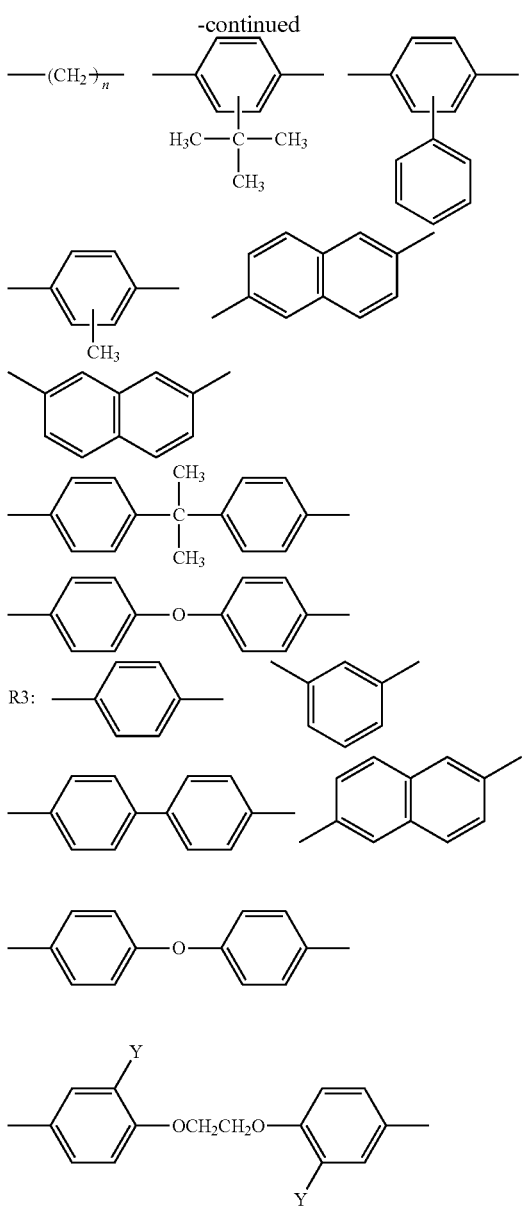

wherein Y represents at least one kind selected from a hydrogen atom, a halogen atom and an alkyl group, an alkyl group is preferably an alkyl group having 1 to 4 carbon atoms, and n represents an integer of 2 to 8.

The hyperbranched-polyester of the present invention has, as a molecular framework, a tri-branched or higher polybranched structure in which trifunctional or higher polyfunctional organic residues (B) are directly bonded with each other through an ester bond and/or an amide bond, or bonded via a structural unit selected from linear building units P, Q and R. The branched structure may be formed from a single molecular framework such as a tri-branched or tetra-branched molecular framework, and plural molecular frameworks such as tri-branched and tetra-branched molecular framework may coexist. It is not necessary that the entire polymer is not composed of the molecular framework. For example, the polymer may include other structures at the end for end blocking. When B is a trifunctional organic residue, a hyperbranched-polyester may include a structure in which all three functional groups of B have been reacted, a structure in which only two functional groups have been reacted, and a structure in which only one functional group has been reacted. The content of the structure in which all three functional groups of B are reacted is preferably 15 mol % or more, more preferably 20 mol % or more, and still more preferably 30 mol % or more, based on the entire B. When B is a tetrafunctional organic residue, a hyperbranched-polyester may include a structure in which all four functional groups of B have been reacted, a structure in which only three functional groups have been reacted, a structure in which only two functional groups have been reacted, and a structure in which only one functional group has been reacted. It is preferred that the content of the structure in which all four functional groups of B have been reacted is 10 mol % or more based on the entire B and the content of the structure in which three functional groups have been reacted is 20 mol % or more. It is more preferred that the content of the structure in which four functional groups have been reacted is 20 mol % or more based on the entire B and the content of the structure in which three functional groups have been reacted is 30 mol % or more. It is still more preferred that the content of the structure in which four functional groups have been reacted is 25 mol % or more based on the entire B and the content of the structure in which three functional groups have been reacted is 35 mol % or more.

B is preferably an organic residue of a trifunctional compound and/or a tetrafunctional compound, and most preferably an organic residue of a trifunctional compound.

The tri-branched molecular framework is schematically represented by the formula (2). The tetra-branched molecular framework is schematically represented by the formula (3).

[Chemical Formula 4]

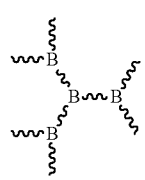

(2)

[Chemical Formula 5]

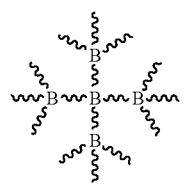

(3)

The hyperbranched-polyester of the present invention preferably exhibits melt liquid crystallinity. As used herein, the expression "exhibits melt liquid crystallinity" means that the hyperbranched-polyester exhibits a liquid crystal in a certain temperature region when the temperature rises from room temperature. The liquid crystal state means a state where it exhibits optical anisotropy under shear.

In order to exhibit melt liquid crystallinity, in the tri-branched molecular framework, as shown in the following formula (4), an organic residue (B) is preferably bonded via a linear building unit D composed of a structural unit selected from structural units P, Q and R.

[Chemical Formula 6]

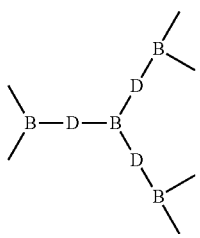

Similarly, the tetra-branched molecular framework preferably has a structure represented by the following formula (5).

[Chemical Formula 7]

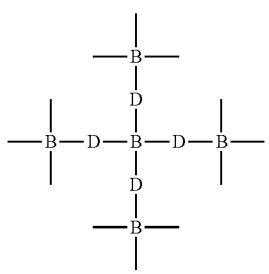

The trifunctional organic residue B is preferably an organic residue of a compound having a functional group selected from a carboxyl group, a hydroxyl group and an amino group. It is preferred to use a residue of an aliphatic compound such as glycerol, 1,2,3-tricarboxypropane, diaminopropanol, or diaminopropionic acid; or an aromatic compound such as trimesic acid, trimellitic acid, 4-hydroxy-1,2-benzenedicarboxylic acid, phloroglucinol, resorcylic acid, tricarboxynaphthalene, dihydroxynaphthoic acid, aminophthalic acid, 5-aminoisophthalic acid, aminoterephthalic acid, diaminobenzoic acid, or melamine. A residue of an aromatic compound represented by the following formula is more preferred.

[Chemical Formula 8]

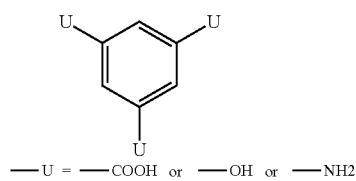

The trifunctional organic residue is preferably a residue of phloroglucinol, trimesic acid, trimellitic acid, trimellitic anhydride, α-resorcylic acid, or 4-hydroxy-1,2-benzenedicarboxylic acid, still more preferably a residue of trimesic acid or α-resorcylic acid, and most preferably a residue of trimesic acid.

The tetra- or higher polyfunctional organic residue B is preferably an organic residue of a compound having a functional group selected from a carboxyl group, a hydroxyl group and an amino group. Examples thereof include residues of aliphatic compounds such as erythritol, pentaerythritol, threitol, xylitol, glucitol, mannitol, 1,2,3,4-butanetetracarboxylic acid, 1,2,4,5-cyclohexanetetraol, 1,2,3,4,5-cyclohexanepentaneol, 1,2,3,4,5,6-cyclohexanehexaneol, 1,2,4,5-cyclohexanetetracarboxylic acid, 1,2,3,4,5-cyclohexanepentacarboxylic acid, 1,2,3,4,5,6-cyclohexanehexacarboxylic acid, citric acid, and tartaric acid; and residues of aromatic compounds such as 1,2,4,5-benzenetetraol, 1,2,3,4-benzenetetraol, 1,2,3,5-benzenetetraol, 1,2,3,4,5-benzenepentaneol, 1,2,3,4,5,6-benzenehexaneol, 2,2',3,3'-tetrahydroxybiphenyl, 2,2',4,4'-tetrahydroxybiphenyl, 3,3',4,4'-tetrahydroxybiphenyl, 3,3',5,5'-tetrahydroxybiphenyl, 2,3,6,7-naphthalenetetraol, 1,4,5,8-naphthalenetetraol, pyromellitic acid, mellophanic acid, prehnitic acid, mellitic acid, 2,2',3,3'-biphenyltetracarboxylic acid, 2,2',4,4'-biphenyltetracarboxylic acid, 3,3',4,4'-biphenyltetracarboxylic acid, 3,3',5,5'-biphenyltetracarboxylic acid, 2,3,6,7-naphthalenetetracarboxylic acid, 1,4,5,8-naphthalenetetracarboxylic acid, 2,3,6,7-naphthalenetetraol, 1,4,5,8-naphthalenetetraol, 1,2,4,5,6,8-naphthalenehexaol, 1,2,4,5,6,8-naphthalenehexacarboxylic acid, and gallic acid. A residue of an aromatic compound represented by the following formula is more preferred.

[Chemical Formula 9]

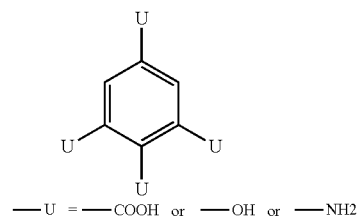

The tetrafunctional organic residue is preferably a residue of 1,2,4,5-benzenetetraol, 1,2,3,4-benzenetetraol, 1,2,3,5-benzenetetraol, pyromellitic acid, mellophanic acid, prehnitic acid, or gallic acid, and particularly preferably a residue of gallic acid.

The aromatic hydroxycarbonyl unit (P), the aromatic and/or aliphatic dioxy units (Q), and the aromatic dicarbonyl unit (R) of the hyperbranched-polyester are units constituting a linear building unit between branchings of the hyperbranched-polyester. p, q and r are average contents (molar ratios) of structural units P, Q and R; and p+q+r is preferably within a range from 1 to 10 mol based on 1 mol of the content b of B. p+q+r is more preferably within a range from 2 to 6 mol. Too long branched chain length is not preferred because the effect of viscosity response under shear based on a stiff and minute hyperbranched-structure is decreased.

The values of p, q and r can be determined from a peak intensity derived from each structural unit after dissolving a hyperbranched-polyester in a mixed solvent of 50% by weight of pentafluorophenol and 50% by weight of deuterated chloroform and performing nuclear magnetic resonance spectrum analysis of proton-nucleus at 40° C. An average content is calculated from a peak integrated intensity ratio of each structural unit and then round to three decimal places. From an integrated intensity ratio to a peak as the content b of a branched structure B, an average chain length of a linear building unit is calculated and is taken as a value of p+q+r. Also in this case, the value is round to three decimal places.

A ratio of p to q and a ratio of p to r (p/q, p/r) are preferably within a range from 5/95 to 95/5, more preferably from 10/90 to 90/10, and still more preferably from 20/80 to 80/20. The ratio is preferably within the above range because it is easy to exhibit liquid crystallinity. It is preferred that a melting point of the hyperbranched-polyester can be adjusted within a preferable range by adjusting ratios p/q and p/r to 95/5 or less. It is also preferred that melt liquid crystallinity of the hyper-branched-polyester can be exhibited by adjusting ratios p/q and p/r to 5/95 or more.

It is preferred that q and r are substantially equimolar. However, any one of components can also be excessively added so as to control a terminal group. The ratio q/r is preferably within a range from 0.7 to 1.5, and more preferably from 0.9 to 1.1. As used herein, "equimol" means that a molar amount in a repeating unit is equal and does not include a terminal structure. As used herein, "terminal structure" means the end of a linear-building unit, and means the end of a linear building unit which is most close to the end when the end is capped.

In the general formula (1), R1 is a structural unit derived from an aromatic oxycarbonyl unit, and specific examples thereof include structural units derived from p-hydroxybenzoic acid and 6-hydroxy-2-naphthoic acid. R1 is preferably a structural unit derived from p-hydroxybenzoic acid and can be used in combination with a structural unit derived from 6-hydroxy-2-naphthoic acid. As long as the effect of the present invention is adversely affected, a structural unit derived from an aliphatic hydroxycarboxylic acid such as glycolic acid, lactic acid, hydroxypropionic acid, hydroxybutyric acid, hydroxyvaleric acid or hydroxycaproic acid may be included.

R2 is a structural unit derived from aromatic and/or aliphatic dioxy units, and examples thereof include structural units derived from 4,4'-dihydroxybiphenyl, hydroquinone, 3,3',5,5'-tetramethyl-4,4'-dihydroxybiphenyl, t-butylhydroquinone, phenylhydroquinone, methylhydroquinone, 2,6-dihydroxynaphthalene, 2,7-dihydroxyhaphthalene, 2,2-bis(4-hydroxyphenyl)propane, 4,4'-dihydroxydiphenylether, ethylene glycol, 1,3-propyleneglycol, and 1,4-butanediol. The structural unit is preferably a structural unit derived from 4,4'-dihydroxybiphenyl, hydroquinone, or ethylene glycol. It is preferred to include a structural unit derived from 4,4'-dihydroxybiphenyl and hydroquinone, or 4,4'-dihydroxybiphenyl and ethylene glycol in view of control of liquid crystallinity.

R3 is a structural unit derived from an aromatic dicarbonyl unit, and examples thereof include structural units derived from terephthalic acid, isophthalic acid, 2,6-naphthalenedicarboxylic acid, 4,4'-diphenyldicarboxylic acid, 1,2-bis(phenoxy)ethane-4,4'-dicarboxylic acid, 1,2-bis(2-chlorophenoxy)ethane-4,4'-dicarboxylic acid, and 4,4'-diphenyletherdicarboxylic acid. R3 is preferably a structural unit derived from terephthalic acid or isophthalic acid, and both structural units are particularly preferably used in combination because it is easy to adjust a melting point. A structural unit derived from an aliphatic dicarboxylic acid such as sebacic acid or adipic acid may be partially included.

It is preferred that the linear building unit of the hyperbrahched-polyester of the present invention is mainly composed of a polyester framework. As long as a large influence is not exerted on characteristics, a carbonate structure, an amide structure or a urethane structure can also be introduced. It is particularly preferred to introduce an amide structure. It is preferred that compatibility with various thermoplastic resins can be adjusted by introducing these other bond. The amide bond is preferably introduced by a method of copolymerizing aliphatic, alicyclic or aromatic amine compounds such as p-aminobenzoic acid, m-aminobenzoic acid, p-aminophenol, m-aminophenol, p-phenylenediamine, m-phenylenediamine, tetramethylenediaminepentam-ethylenediamine, hexamethylenediamine, 2-methylpentamethylenediamine, nonamethylenediamine, undecamethylenediamine, dodecamethylenediamine, 2,2,4—2,4,4-trimethylhexamethylenediamine, 5-methylnonamethylenediamine, m-xylylenediamine, p-xylylenediamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, and aminoethylpiperazine. It is particularly preferred to copolymerize p-aminophenol or p-aminobenzoic acid.

Specific examples of the linear building unit of the hyperbranched-polyester include those composed of a structural unit derived from p-hydroxybenzoic acid and 6-hydroxy-2-naphthoic acid; those composed of a structural unit derived from p-hydroxybenzoic acid, a structural unit derived from 6-hydroxy-2-naphthoic acid, a structural unit derived from 4,4'-dihydroxybiphenyl and a structural unit derived from terephthalic acid; those composed of a structural unit derived from p-hydroxybenzoic acid, a structural unit derived from 4,4'-dihydroxybiphenyl, a structural unit derived from terephthalic acid and a structural unit derived from isophthalic acid; those composed of a structural unit derived from p-hydroxybenzoic acid, a structural unit derived from 4,4'-dihydroxybiphenyl, a structural unit derived from hydroquinone, a structural unit derived from terephthalic acid and a structural unit derived from isophthalic acid; those composed of a structural unit derived from p-hydroxybenzoic acid, a structural unit derived from ethylene glycol and a structural unit derived from terephthalic acid; those composed of a structural unit derived from p-hydroxybenzoic acid, a structural unit derived from ethylene glycol, a structural unit derived from 4,4'-dihydroxybiphenyl and a structural unit derived from terephthalic acid; those composed of a structural unit derived from p-hydroxybenzoic acid, a structural unit derived from hydroquinone, a structural unit derived from 4,4'-dihydroxybiphenyl, a structural unit derived from terephthalic acid and a structural unit derived from 2,6-naphthalenedicarboxylic acid; and those composed of a structural unit derived from p-hydroxybenzoic acid, a structural unit derived from 6-hydroxy-2-naphthoic acid, a structural unit derived from hydroquinone and a structural unit derived from terephthalic acid.

It is particularly preferred that the linear building unit is composed of the following structural units (I), (II), (III), (IV) and (V), or composed of the following structural units (I), (II), (VI) and (IV).

[Chemical Formula 10]

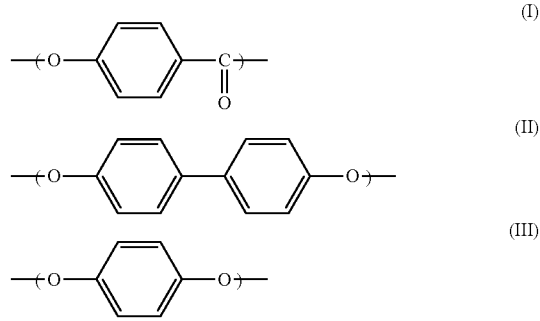

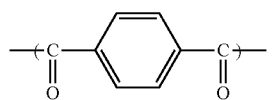
(IV)

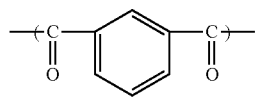
(V)

[Chemical Formula 11]

(I)

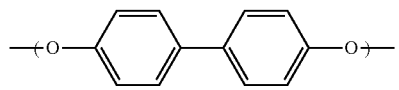
(II)

(VI)

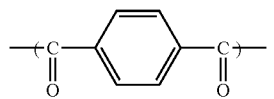
(IV)

When the linear building unit is composed of the above structural units (I), (II), (III), (IV) and (V), the content p of the structural unit (I) is preferably from 30 to 70 mol %, and more preferably from 45 to 60 mol %, based on the total content p+q+r of the structural units.

The content q (II) of the structural unit (II) is preferably from 60 to 75 mol %, and more preferably from 65 to 73 mol %, based on the total content q of the structural units (II) and (III). The content r (IV) of the structural unit (IV) is preferably from 60 to 92 mol %, more preferably from 60 to 70 mol %, and still more preferably from 62 to 68 mol %, based on the total content r of the structural units (IV) and (V).

In this case, the addition effect on viscosity response under shear and a thermoplastic resin, as the effect of the present invention, is remarkably exerted, preferably.

As described above, it is preferred that the total content q of the structural units (II) and (III) is substantially equal to the total content r of the structural units (IV) and (V). Any of components may be excessively added.

When the linear building unit is composed of the structural units (I), (II), (VI) and (IV), the content p of the structural unit (I) is preferably from 30 to 90 mol %, and more preferably from 40 to 80 mol %, based on p+q+r. The content q (VI) of the structural unit (VI) is preferably from 70 to 5 mol %, and more preferably from 60 to 8 mol %, based on the total content q of the structural units (II) and (VI). As described above, it is preferred that the content r of the structural unit (IV) is substantially equal to the total content q of the structural units (II) and (VI). Any of components may be excessively added.

The end of the hyperbranched-polyester of the present invention is a carboxyl group, a hydroxyl group, an amino group, or a derivative thereof. Examples of the derivative of a hydroxyl group or the derivative of carboxylic acid include alkyl esters such as a methyl ester, and aromatic esters such as a phenyl ester and a benzyl ester. It is also possible to block the end using a monofunctional epoxy compound, an oxazoline compound, and an acid anhydride compound. Examples of the end blocking method include a method of preliminarily adding a monofunctional organic compound upon synthesis of a hyperbranched-polyester, and a method of adding a monofunctional organic compound at a stage where framework of a hyperbranched-polyester is formed.

Specifically, when a hydroxyl group end and an acetoxy end is capped, benzoic acid, 4-t-butylbenzoic acid, 3-t-butylbenzoic acid, 4-chlorobenzoic acid, 3-chlorobenzoic acid, 4-methylbenzoic acid, 3-methylbenzoic acid, and 3,5-dimethylbenzoic acid can be added.

When a carboxyl group end is capped, acetoxybenzene, 1-acetoxy-4-t-butylbenzene, 1-acetoxy-3-t-butylbenzene, 1-acetoxy-4-chlorobenzene, 1-acetoxy-3-chlorobenzene, and 1-acetoxy-4-cyanobenzene can be added.

Theoretically, the end can be capped by adding an organic compound used in end blocking in the amount corresponding to the amount of a terminal group to be capped. The organic compound for end blocking is preferably used in the amount of 1.005 equivalents or more, and more preferably from 1.008 equivalents or more, per equivalent corresponding to a terminal group to be capped. The amount of the organic compound for end blocking is 1.5 equivalents or less per equivalent corresponding to a terminal group to be capped.

When the amount of the organic compound to be used for end blocking is too small, end blocking is not sufficiently carried out. In contrast, when the amount is too large, excessive additives are remained in the system and thus the reaction rate decreases or a gas is generated. Therefore, it is not preferred.

The content of the organic residue B is preferably 7.5 mol % or more, more preferably 10 mol % or more, and still more preferably 20 mol % or more, based on the content of the entire monomers constituting the hyperbranched-polyester. In such a case, a chain length of the linear building unit becomes a length suited for the hyperbranched-polyester to take a hyperbranched-form. The upper limit of the content of the organic residue B is 50 mol % or less, preferably 45 mol % or less, and more preferably 40 mol % or less.

As long as an adverse influence is not exerted on characteristics, the hyperbranched-polyester of the present invention may partially have a crosslinked structure.

In the present invention, there is no limitation on the method for producing a hyperbranched-polyester, and the hyperbranched-polyester can be produced in accordance with a known method for polycondensation of a polyester. The method is preferably a method of reacting a monomer including at least one kind of a structural unit selected from a structural unit represented by R1, a monomer including at least one kind of a structural unit selected from a structural unit represented by R2 and a monomer including at least one kind of a structural unit selected from a structural unit represented by R3, and a trifunctional or higher polyfunctional monomer, wherein the amount (mol) of the polyfunctional monomer is 7.5 mol % or more based on the entire monomers (mol) constituting the hyperbranched-polyester. The amount of the polyfunctional monomer is preferably 10 mol % or more, more preferably 15 mol % or more, and still more preferably 20 mol % or more. The upper limit of the addition amount is preferably 50 mol % or less, more preferably 33 mol % or less, and still more preferably 25 mol % or less.

Upon the above reaction, it is preferred to employ an aspect in which a monomer including at least one kind of a structural unit selected from structural units represented by R1, R2 and R3 is acylated and then reacted with a trifunctional or higher polyfunctional monomer. It is also preferred to employ an aspect in which a monomer including at least one kind of a structural unit selected from structural units represented by R1, R2 and R3, and a trifunctional or higher polyfunctional monomer are acylated, and then subjected to a polymerization reaction.

A preferred production method will be described by way of the case where a hyperbranched-polyester composed of the structural units (I), (II), (III), (IV) and (V) and a trimesic acid residue as an example.

(1) A method in which a liquid crystalline polyester oligomer was synthesized from p-acetoxybenzoic acid, 4,4'-diacetoxybiphenyl, diacetoxybenzene, terephthalic acid and isophthalic acid by a deacetylation polycondensation reaction, followed by the addition of trimesic acid and further deacetylation polymerization reaction to obtain a hyperbranched-polyester.

(2) A method in which a hyperbranched-polyester is produced from p-acetoxybenzoic acid, 4,4'-diacetoxybiphenyl, diacetoxybenzene, terephthalic acid, isophthalic acid and trimesic acid by a deacetylation polycondensation reaction.

(3) A method in which p-hydroxybenzoic acid, 4,4'-dihydroxybiphenyl, hydroquinone, terephthalic acid and isophthalic acid is reacted with an acetic anhydride thereby acylating a phenolic hydroxyl group, and a liquid crystalline polyester oligomer is synthesized by adeacetylation polycondensation reaction, and then trimesic acid is added thereby causing a deacetylation polymerization reaction to obtain a hyperbranched-polyester.

(4). A method in which p-hydroxybenzoic acid, 4,4'-dihydroxybiphenyl, hydroquinone, terephthalic acid, isophthalic acid and trimesic acid are reacted with an acetic anhydride thereby acylating a phenolic hydroxyl group, and then a deacetylation polycondensation reaction is carried out to obtain a hyperbranched-polyester.

(5) A method in which a liquid crystalline polyester oligomer is synthesized from a phenyl ester of p-hydroxybenzoic acid, 4,4'-dihydroxybiphenyl, hydroquinone, diphenyl terephthalate and diphenyl isophthalate by a phenol-eliminated polycondensation reaction, and then trimesic acid is added and a phenol-eliminated polycondensation reaction is carried out to obtain a hyperbranched-polyester.

(6) A method in which a hyperbranched-polyester is produced from a phenyl ester of p-hydroxybenzoic acid, 4,4'-dihydroxybiphenyl, hydroquinone, diphenyl terephthalate, diphenyl isophthalate and a phenyl ester of trimesic acid by a phenol-eliminated polycondensation reaction.

(7) A method in which p-hydroxybenzoic acid, terephthalic acid, isophthalic acid and trimesic acid are reacted with diphenyl carbonate to obtain a phenyl ester, and then 4,4'-dihydroxybiphenyl and hydroquinone are added and a phenol-eliminated polycondensation reaction is carried out to obtain a hyperbranched-polyester.

Among these methods, the methods (1) to (5) are preferred, the methods (3) and (4) are more preferred, and the method (3) is most preferred in view of chain length control and stereocontrol.

In the method (3), the amount of the acetic anhydride is preferably 0.95 equivalents or more and 1.10 equivalents or less, more preferably 1.00 equivalents or more and 1.08 equivalents or less, and most preferably 1.02 equivalents or more and 1.05 equivalents or less, based on the total phenolic hydroxyl groups in view of chain length control. The terminal group can be controlled by controlling the amount of the acetic anhydride and excessively adding either a dihydroxy monomer or a dicarboxylic acid monomer.

In order to increase the molecular weight, equivalents of the carboxylic acid and hydroxyl group in the entire monomers are preferably made to be identical by excessively adding a dihydroxy monomer such as hydroquinone or 4,4'-dihydroxybiphenyl to a dicarboxylic acid monomer by the amount corresponding to the equivalents of the carboxylic acid of trimesic acid. When the carboxylic acid is intentionally remained in the terminal group, it is preferred the above-described excessive addition of the dihydroxy monomer is not carried out. Furthermore, the hydroxyl group is intentionally remained in the end, it is preferred that the dihydroxy monomer is excessively added in the amount more than carboxylic acid equivalents of trimesic acid and the amount of the acetic anhydride is adjusted to less than 1.00 equivalents of the phenolic hydroxyl group.

By these methods, the hyperbranched-polyester of the present invention can be selectively provided with a terminal group structure having excellent reactivity with various thermoplastic resins. According to the thermoplastic resin serving as a matrix, a dispersion state may be sometimes controlled easily by blocking the end using a monofunctional epoxy compound so as to suppress excessive reactivity.

The deacetylation polycondensation reaction is preferably carried out by a melt polymerization method in which the reaction is carried out at a temperature at which the hyperbranched-polyester is melted and, according to circumstances, the reaction is carried out under reduced pressure thereby distilling off a predetermined amount of acetic acid, thus completing the polycondensation reaction. For example, a predetermined amount of p-hydroxybenzoic acid, 4,4'-dihydroxybiphenyl, hydroquinone, terephthalic acid, isophthalic acid and acetic anhydride are charged in a reaction vessel equipped with a stirring blade and a distillation tube, and a discharge port at the lower portion. The mixture is heated while stirring under a nitrogen gas atmosphere thereby acetylating a hydroxyl group. The deacetylation polycondensation reaction is carried out by heating to a temperature of 200 to 350° C. thereby distilling off acetic acid. At the stage where acetic acid is distilled off in the amount accounting for 50% of a theoretical distillation amount, a predetermined amount of trimesic acid is added and also acetic acid is distilled off in the amount accounting for 91% of a theoretical distillation amount, and then the reaction is terminated.

The acetylation is carried out under the following conditions. The reaction temperature is preferably within a range from 130 to 170° C., and more preferably from 135 to 155° C. The reaction time is preferably from 0.5 to 6 hours, and more preferably from 1 to 2 hours.

The polycondensation temperature is a temperature at which the hyperbranched-polyester is melted, and is preferably a temperature of a melting point of the hyperbranched-polyester+10° C. or higher. Specifically, the polycondensation temperature is within a range from 200 to 350° C., and preferably from 240 to 280° C. The polycondensation may be carried out under a nitrogen atmosphere at normal pressure. The reaction is carried out under reduced pressure because the reaction quickly proceeds and the amount of residual acetic acid in the system decreases. The vacuum degree is preferably from 0.1 mmHg (13.3 Pa) to 200 mmHg (26,600 Pa), and more preferably from 10 mmHg (1,330 Pa) to 100 mmHg (13,300 Pa). The acetylation and polycondensation may be continuously carried out in the same reaction vessel, or the acetylation and polycondensation may be carried out in a different reaction vessel.

After the completion of the polycondensation reaction, the interior temperature of the reaction vessel is maintained at a temperature at which the hyperbranched-polyester is molten, and a pressure of 0.01 to 1.0 kg/cm$^2$ (0.001 to 0.1 MPa) is applied, and then a hyperbranched-polyester is ejected in the form of a strand through a discharge port disposed at the lower portion of the reaction vessel. It is possible to eject the hyperbranched-polyester in the form of droplets by disposing an intermittent opening/closing mechanism is disposed at the discharge port. The ejected hyperbranched-polyester is cooled while passing through the air or water, and is optionally cut or ground.

From the resultant palletized, granular or powdered hyperbranched-polyester, water and acetic acid are optionally removed by heat drying or vacuum drying. Solid phase polymerization can also be carried out so as to finely adjust the polymerization degree or further increase the polymerization degree. The method of solid phase polymerization includes, for example, a method of heating the hyperbranched-polyester thus obtained under a nitrogen gas flow or reduced pressure at a temperature within a range from a melting point of the hyperbranched-polyester 5° C. to a melting point −50° C. (for example, 200 to 300° C.) for 1 to 50 hours.

The polycondensation reaction of the hyperbranched-polyester proceeds without using a catalyst, and it is also possible to use metal compounds such as stannous acetate, tetrabutyl titanate, potassium acetate and sodium acetate, antimony trioxide, and metallic magnesium.

In the hyperbranched-polyester of the present invention, the number average molecular weight is preferably from 1,000 to 40,000, more preferably from 1,000 to 20,000, still more preferably from 1,000 to 10,000, and most preferably from 1,000 to 5,000. The number average molecular weight is a value measured as an absolute molecular weight by a GPC-LS (gel permeation chromatograph-light scattering) method using a solvent in which the hyperbranched-polyester is soluble.

The melt viscosity of the hyperbranched-polyester in the present invention is preferably from 0.01 to 30 Pa·s, more particularly from 0.5 to 20 Pa·s, and particularly preferably from 1 to 10 Pa·s. The melt viscosity is a value measured by a Koka-type flow tester under the conditions of a liquid crystallization initiation temperature of the hyperbranched-polyester+10° C. and a shear rate of 100/s.

The hyperbranched-polyester thus obtained of the present invention exhibits melt liquid crystallinity, high viscosity response under shear, high elastic modulus and high gas barrier property, and is therefore used alone as a resin material and a coating agent.

The hyperbranched-polyester of the present invention has a lot of terminal groups, unlike a conventional liquid crystalline polyester. Therefore, the hyperbranched-polyester is well dispersed in a thermoplastic resin upon blending with the thermoplastic resin, and can impart characteristics such as high viscosity response under shear, high elastic modulus and high gas barrier property without deteriorating characteristics of the thermoplastic resin.

The thermoplastic resin used in the thermoplastic resin composition of the present invention is not specifically limited as long as it is a resin which exhibits thermoplasticity, and examples thereof include styrene-based resin, fluororesin, polyoxymethylene, polyamidepolyesterpolyimide, polyamideimide, vinyl chloride, olefin-based resin, thermoplatic elastomer, polyacrylate, polyphenyleneether, polycarbonate, polyethersulfone, polyetherimide, polyetherketone, polyether ether ketone, polyarylene sulfides such as polyphenylene sulfide, cellulose derivatives such as cellulose acetate, cellulose acetate butyrate and ethyl cellulose, liquid crystalline resin, and modified resins thereof, or one or more kinds of blends thereof.

Examples of the styrene-based resin include PS (polystyrene), HIPS (high impact polystyrene), AS (acrylonitrile-styrene copolymer), AES (acrylonitrile-ethylene.propylene.non-conjugated diene rubber-styrene copolymer), ABS (acrylonitrile-butadiene-styrene copolymer), and MBS (methyl methacrylate-butadiene-styrene copolymer).

Examples of the olefin-based resin include polypropylene, polyethylene, an ethylene-propylene copolymer, an ethylene-1-butene copolymer, an ethylene-propylene-non-conjugated diene copolymer, an ethylene-ethyl acrylate copolymer, an ethylene-glycidyl methacrylate copolymer, an ethylene-vinyl acetate-glycidyl a methacrylate copolymer and an ethylene-propylene-g-maleic anhydride copolymer, and a methacrylic acid-methyl methacrylate-glutaric anhydride copolymer.

Examples of the thermoplastic elastomer include a polyesterpolyether elastomer, a polyesterpolyester elastomer, a thermoplastic polyurethane elastomer, a thermoplastic styrene-butadiene elastomer, a thermoplastic olefin elastomer, and a thermoplastic polyamide elastomer.

Examples of the polyamide include nylon 6 (polycaproamide), nylon 66 (polyhexamethyleneadipamide), nylon 12 (polydodecaneamide), nylon 610 (polyhexamethylenesebacamide), and a nylon 6/66 copolymer (polycaproamide-polyhexamethyleneadipamide copolymer). Also, copolymers including a hexamethyleneterephthalamide unit such as a nylon 6T/66 copolymer (polyhexamethyleneadipamide-polyhexamethyleneterephthalamide copolymer), a nylon 6T/6I copolymer (polyhexamethyleneterephthalamide-polyhexamethyleneisophthalamide copolymer), a nylon 6T/M5T copolymer (polyhexamethyleneterephthalamide-poly-2-methylpentamethyleneterephthalamide copolymer), a nylon 6T/12 copolymer (polyhexamethyleneterephthalamide-polydodecaneamide copolymer), a nylon 66/6T/6I copolymer (polyhexamethyleneadipamide-polyhexamethyleneterephthaiamide-polyhexamethyleneisophthalamide copolymer), and a nylon 6T/6 copolymer (polycaproamide-polyhexamethyleneterephthalamide copolymer) are preferred. Furthermore, it is practically preferred to use plural polyamide resins thereof as a mixture according to required characteristics such as impact resistance and moldability.

There is no limitation on polymerization degree of these polyamide resins. Among these polyamide resins, preferred is nylon which has a relative viscosity measured in a 98% sulfuric acid solution of a sample concentration of 0.01 g/ml at 25° C. within a range from 1.5 to 7.0, and particularly preferably from 2.0 to 6.0.

The polyamide resin is a copolymer including a hexamethyleneterephthalamide unit is preferred because of high heat resistance. In this case, the melting point is preferably 200° C. or higher, more preferably 250° C. or higher, and particularly preferably 280° C. or higher, in view of heat resistance. When the melting point is higher than 340° C., since decomposition is likely to occur upon melt molding, the melting point is preferably 340° C. or lower, more preferably 330° C. or lower, and particularly preferably 320° C. or lower. In this case, a dicarboxylic acid component is preferably composed of 40 to 100 mol % of a terephthalic acid component unit %, and 0 to 60% of an aromatic dicarboxylic acid component and/or an aliphatic dicarboxylic acid unit other than terephthalic acid.

A copper compound is preferably used as an additive for improving long-term heat resistance in the polyamide resin. The copper compound is preferably a monovalent copper compound, especially a monovalent copper halide compound, and particularly preferably a monovalent cuprous acetate or a monovalent cuprous iodide. The amount of the copper compound is preferably within a range from 0.01 to 2 parts by weight, and more preferably from 0.015 to 1 part by weight, based on 100 parts by weight of nylon. When the amount is too large, isolation of metallic copper occurs upon melt molding and thus coloration causes, resulting in decrease of value of a product. It is also possible to use an alkali halide in combination with the copper compound. As the alkali halide compound, potassium iodide and sodium iodide are particularly preferred.

The polyester is preferably a polymer or copolymer including dicarboxylic acid or an ester-forming derivative thereof, and diol or an ester-forming derivative thereof as a main structural unit. Among these, aromatic polyester resins such as polyethylene terephthalate, polypropylene terephthalate, polybutylene terephthalate, polycyclohexanedimethylene terephthalate, polyethylene naphthalate, polypropylene naphthalate, polybutylene naphthalate, polyethylene isophthalate/terephthalate, polypropylene isophthalate-terephthalate, polybutylene isophthalate/terephthalate, polyethylene terephthalate/naphthalate, polypropylene terephthalate/naphthalate, and polybutylene terephthalate/naphthalate are particularly preferred, and polybutylene terephthalate is most preferred. In these polymers, a ratio of the terephthalic acid unit to the entire dicarboxylic acid is preferably 30 mol % or more, and more preferably 40 mol % or more.

The polyester may contain hydroxycarboxylic acid, or one or more kinds selected from an ester-forming derivative thereof and lactone. Examples of the hydroxycarboxylic acid include glycolic acid, lactic acid, hydroxypropionic acid, hydroxybutyric acid, hydroxyvaleric acid, hydroxycaproic acid, hydroxybenzoic acid, p-hydroxybenzoic acid, and 6-hydroxy-2-naphthoic acid. Examples of the lactone include caprolactone, valerolactone, propiolactone, undecalactone, and 1,5-oxepan-2-one. Examples of the polymer or copolymer including them as a structural unit include aliphatic polyester resins such as polyglycolic acid, polylactic acid, polyglycolic acid/lactic acid, and polyhydroxybutyric acid/β-hydroxybutyric acid/β-hydroxyvaleric acid.

The melting point of the polyester is not specifically limited, and is preferably 120° C. or higher, more preferably 180° C. or higher, still more preferably 200° C. or higher, and particularly preferably 220° C. or higher, in view of heat resistance. The upper limit is not specifically limited, and is preferably 300° C. or lower, and more preferably 280° C. or lower. The melting point of the polyester is a value measured at a temperature rise rate of 20° C./min. by differential scanning calorimeter (DSC).

The amount of a carboxylterminal group of the polyester is not specifically limited, and is preferably 50 eq/t or less, more preferably 30 eq/t or less, still more preferably 20 eq/t or less, and particularly preferably 10 eq/t or less, in view of fluidity, hydrolysis resistance and heat resistance. The lower limit is 0 meq/t. In the present invention, the amount of the carboxyl terminal group of the polyester resin (A) is a value measured by titration with ethanolic potassium hydroxide after dissolving in an o-cresol/chloroform solvent.

The viscosity of the polyester is not specifically limited as long as melt kneading can be carried out. In view of moldability, an inherent viscosity of an o-chlorophenol solution measured at 25° C. is preferably within a range from 0.36 to 1.60 dl/g, and more preferably from 0.50 to 1.25 dl/g.

There is no limitation on the molecular weight of the polyester resin. In view of heat resistance, the weight average molecular weight (Mw) is preferably within a range from 50,000 to 500,000, more preferably from 100,000 to 300,000, and still more preferably from 150,000 to 250,000. In the present invention, the molecular weight of the polyester is a value measured by gel permeation chromatography (GPC).

There is no limitation on the method for producing the polyester, and the polyester can be produced by a known polycondensation or ring-opening polymerization method. The polymerization may be either batch polymerization or continuous polymerization, and either ester exchange reaction or direct polymerization reaction can be applied.

Among these resins, those classified into engineering plastics are preferred. Specifically, polyamide, polyester, polycarbonate, and polyarylene sulfide are preferred. Nylon 6, nylon 66, polyethylene terephthalate, polybutylene terephthalate, polycarbonate, and polyphenylene sulfide are particularly preferred.

A resin selected from polyamide and polyester is preferred because it has reactivity with a terminal functional group of the hyperbranched-polyester and exerts good effect.

The melt viscosity of the thermoplastic resin is not specifically limited, and is preferably from 10 to 300 Pa·s, more preferably from 15 to 200 Pa·s, and still more preferably from 20 to 100 Pa·s. When the melt viscosity of the thermoplastic resin is too low, it is difficult to produce a shear force enough to cause a change in volume of the dispersed hyperbranched-polyester and to exert the effect. In contrast, when the melt viscosity of the thermoplastic resin is too high, it becomes impossible to disperse the hyperbranched-polyester in the resin and it is difficult to exert the effect. The melt viscosity is a value measured by a Koka-type flow tester under the conditions of a melting point of the thermoplastic resin +10° C. and a shear rate of 1,000/s.

The amount of the hyperbranched-polyester in the thermoplastic resin composition of the present invention is preferably from 0.01 to 99 parts by weight, more preferably from 0.1 to 50 parts by weight, and still more preferably from 0.5 to 20 parts by weight, based on 100 parts by weight of the thermoplastic resin. The amount is preferably within the above range because the effect of the present invention can be remarkably exerted.

The thermoplastic resin composition of the present invention may further contain an impact modifier. The impact modifier is not specifically limited as long as it improves impact resistance by melt-kneading with a thermoplastic resin, and examples thereof include an olefin-based resin, an acrylic rubber, a silicone-based rubber, a fluorine-based rubber, a urethane-based rubber, a polyamide elastomer, a polyester elastomer, and a so-called core-shell type multi-layered structure comprising at least one layer made of these rubbery components and one or more layers made of a polymer which is different from them. The multi-layered structure may comprise 2 or more layers, 3 or more layers or 4 or more layers, and is preferably a multi-layered structure comprising one or more rubber layers (core layers) inside. The component of the layer other than the rubber layer of the multi-layered structure is not specifically limited as long as it is composed of a polymer component having thermoplasticity, and is preferably composed of a polymer component having a higher glass transition temperature than that of the rubber layer. Examples of such a polymer include polymers including an unsaturated alkyl carboxylate ester unit, an unsaturated carboxylic acid unit, an unsaturated glycidyl group-containing unit, an unsaturated dicarboxylic anhydride unit, an aliphatic vinyl unit, an aromatic vinyl unit, a cyanated vinyl unit, a maleimide unit, and an unsaturated dicarboxylic acid unit.

As the impact modifier, an olefin-based resin is preferably used. Specific examples thereof include homopolymers and copolymers, such as polyethylene, polypropylene, polystyrene, poly1-butene, poly1-pentene, and polymethylpentene; an ethylene-α-olefin copolymer, an ethylene-α,β-unsaturated carboxylate ester copolymer, a hydrolyzate of a copolymer of ethylene and an vinyl alcohol ester, a copolymer of ethylene and/or propylene and an unsaturated carboxylic acid and/or an unsaturated carboxylate ester, a block copolymer of a conjugated diene and a vinyl aromatic hydrocarbon, and a hydrogenated material of the block copolymer. Among these, an ethylene-α-olefin copolymer and an ethylene-α,β-unsaturated carboxylate ester copolymer are preferred.

The ethylene-α-olefin copolymer in the present invention is a copolymer containing ethylene and at least one kind of α-olefin having 3 to 20 carbon atoms, and is preferably a copolymer using α-olefin having 3 to 12 carbon atoms in view of an improvement in mechanical strength. Particularly preferred copolymer is a copolymer of ethylene modified with at least one kind of a compound selected from an unsaturated carboxylic acid or a derivative thereof and α-olefin having 3 to 12 carbon atoms in view of further improved compatibility and extremely excellent impact resistance, as described hereinafter. The content of the α-olefin in the ethylene-α-olefin-based copolymer is preferably from 1 to 30 mol %, more preferably from 2 to 25 mol %, and still more preferably from 3 to 20 mol %. Furthermore, at least one kind of non-conjugated diene such as 1,4-hexadiene, dicyclopentadiene, 2,5-norbornadiene5-ethylidenenorbornene, 5-ethyl-2,5-norbornadiene, or 5-(1'-propenyl)-2-norbornene may be copolymerized.

The ethylene-α,β-unsaturated carboxylate ester copolymer in the present invention is a polymer obtained by copolymerizing ethylene with an α,β-unsaturated carboxylate ester. Examples of the α,β-unsaturated carboxylate ester include esters of a α,β-unsaturated carboxylic acid, such as methyl acrylate, ethyl acrylate, butyl acrylate, glycidyl acrylate, methyl methacrylate, ethyl methacrylate, butyl methacrylate, and glycidyl methacrylate. Specific examples of the ethylene-α,β-unsaturated carboxylate ester copolymer include an ethylene-methyl acrylate copolymer, an ethylene-ethyl acrylate copolymer, an ethylene-butyl acrylate copolymer, an ethylene-methyl methacrylate copolymer, an ethylene-ethyl methacrylate copolymer, an ethylene-butyl methacrylate copolymer, an ethylene-glycidyl methacrylate copolymer, an ethylene-glycidyl acrylate copolymer, an ethylene-glycidyl methacrylate copolymer, an ethylene-methyl acrylate-glycidyl methacrylate copolymer, and an ethylene-methyl methacrylate-glycidyl methacrylate copolymer. Among these copolymers, an ethylene-glycidyl methacrylate copolymer, an ethylene-methyl acrylate-glycidyl methacrylate copolymer, and an ethylene-methyl methacrylate-glycidyl methacrylate copolymer are preferably used.

In the present invention, an olefin-based resin can also be used after modifying with at least one kind of a compound selected from an unsaturated carboxylic acid and a derivative thereof. The present invention has a feature that use of the modified polyolefin-based resin enables further improvement in compatibility and excellent impact resistance. A modifier is preferably an unsaturated dicarboxylic acid and an acid anhydride as a derivative thereof, and particularly preferably maleic acid or a maleic anhydride or an anhydride thereof. There is no limitation on the method of introducing these modifiers into the olefin-based resin, and there can be used a method of copolymerizing an olefin monomer with a modifier and a method of graft polymerization of a polyolefin-based resin using a radical initiator as the modifier. The amount of the modifier to be introduced is preferably from 0.001 to mol %, and more preferably from 0.01 to 35 mol %, based on the entire olefin monomer of the olefin-based resin.

The amount of the impact modifier to be added in the thermoplastic resin composition of the present invention is preferably from 1 to 100 parts by weight based on 100 parts by weight of the thermoplastic resin. When the amount of the impact modifier is less than 1 part by weight, sufficient effect of improving impact resistance is not exerted. In contrast, it is not preferred to add the impact modifier in the amount of more than 100 parts by weight because thickening occurs and moldability deteriorates. The amount is more preferably from 5 to 80 parts by weight, and particularly preferably from 10 to 70 parts by weight.

The thermoplastic resin composition of the present invention may further contain an inorganic filler so as to impart characteristics such as mechanical strength. Any of fibrous, tabular, powdered and granular inorganic fillers can be used. As the inorganic filler, both of fibrous fillers and non-fibrous fillers can be used. Examples of the fibrous filler include a glass fiber, a carbon fiber, a potassium titanate whisker, a zinc oxide whisker, a calcium carbonate whisker, a wollastonite whisker, an aluminum borate whisker, an aramid fiber, an alumina fiber, a silicon carbide fiber, a ceramic fiber, an asbestos fiber, a gypsum fiber, and a metal fiber. Examples of the non-fibrous filler include talc, wollastonite, zeolite, sericite, mica, kaolin, clay, pyrophyllite, bentonite, asbestos, silicate (alumina silicate, etc.), metal compounds (silicon oxide, magnesium oxide, alumina, zirconium hydroxide, titanium oxide, iron oxide, etc.), carbonates (calcium carbonate, magnesium carbonate, dolomite, etc.), sulfates (calcium sulfate, barium sulfate, etc.), glass beads, ceramic beads, boron nitride, silicon carbide, calcium phosphate, hydroxides (calcium hydroxide, magnesium hydroxide, aluminum hydroxide, etc.), glass flake, glass powder, carbon black and silica, and graphite. It is also possible to use smectite-based clay minerals such as montmorillonite, beidellite, nontronite, saponite, hectorite, and sauconite; various clay minerals such as vermiculite, halloysite, kanemite, kenyaite, zirconium phosphate, and titanium phosphate; and layered silicate, for example, Li-fluor-taeniolite, Na-fluor-taeniolite, and swellable micas such as Na-fluor-tetrasilicic mica and Li-fluor-tetrasilicic mica.

Among these inorganic fillers, glass fiber, talc, wollastonite, montmorillonite and synthetic mica are preferred. A glass fiber capable of exerting a large effect of improving a mechanical strength is particularly preferably used. Also, two or more kinds of inorganic fillers can be used in combination.

The glass fiber is not specifically limited as long as it is usually used for reinforcing a resin, and it is possible to use those selected from long fiber-type and short fiber-type chopped strands and milled fibers. An alkalescent glass fiber is preferably used because of excellent mechanical strength. The glass fiber is preferably coated with a thermoplastic resin such as an ethylene-vinyl acetate copolymer or an epoxy-based, urethane-based or acryl-based resin, or treated with a sizing agent, and particularly preferably treated with an epoxy-based sizing agent. The glass fiber is preferably treated with a silane-based or titanate-based coupling agent, or a surface treating agent, and particularly preferably an epoxysilane-based or aminosilane-based coupling agent.

It is also possible to preferably use a layered silicate in which exchangeable cations existing between layers are replaced by organic onium ions. Examples of the organic onium ions include ammonium ions, phosphonium ions and sulfonium ions. Among these ions, ammonium ions and phosphonium ions are preferably used, and ammonium ions are particularly preferably used. Ammonium ions may be any of primary ammonium ions, secondary ammonium ions, tertiary ammonium ions and quaternary ammonium ions. Examples of primary ammonium ions include decyl ammonium ions, dodecylammonium ions, octadecylammonium ions, oleylammonium ions, and benzylammonium ions. Examples of secondary ammonium ions include methyldodecylammonium ions and methyloctadecylammonium ions. Examples of tertiary ammonium ions include dimethyldodecylammonium ions and dimethyloctadecylammonium ions. Examples of quaternary ammonium ions include benzyltrialkylammonium ions such as benzyltrimethylammonium ions, benzyltriethylammonium ions, benzyltributylammonium ions, benzyldimethyldodecylammonium ions, and benzyldimethyloctadecylammonium ions; alkyltrimethylammonium ions such as trioctylmethylammonium ions, trimethyloctylammonium ions, trimethyldodecylammonium ions, and trimethyloctadecylammonium ions; and dimethyldialkylammonium ions such as dimethyldioctylammonium ions, dimethyldidodecylammonium ions, and dimethyldioctadecylammonium ions. Examples of ammonium ions further include ammonium ions derived from aniline, p-phenylenediamine, α-naphthylamine, p-aminodimethylaniline, benzidine, pyridine, piperidine, 6-aminocaproic acid, 11-aminoundecanoic acid, and 12-aminododecanoic acid. Among these ammonium ions, ammonium ions derived from trioctylmethylammonium, trimethyloctadecylammonium, benzyldimethyloctadecylammonium, and 12-aminododecanoic acid are preferred.

The layered silicate in which exchangeable cations existing between layers are replaced by organic onium ions can be produced by reacting a layered silicate containing exchangeable cations between layers with organic onium ions using a known method. Specific examples of the method include a method by an ion exchange reaction in a polar solvent such as water, methanol, or ethanol, and a method by a direct reaction of a layered silicate with a liquid or molten ammonium salt.

When the inorganic filler is an organically-modified layered silicate, it is preferred that a layered silicate is uniformly dispersed in a level of a single layer in a thermoplastic resin as a matrix. The state where the layered silicate is uniformly dispersed in a level of a single layer means that the layered silicate is dispersed in the entire matrix resin in a state of a single layer to about 10 layers without causing secondary aggregation. This state can be visually confirmed by a slice obtained by cutting a thermoplastic resin composition using an electron microscope. The organically-modified layered silicate is preferably used because of large effect of improving stiffness.

The amount of the inorganic filler to be blended is preferably from 0.01 to 200 parts by weight, more preferably from 0.05 to 150 parts by weight, and particularly preferably from 0.1 to 100 parts by weight, based on 100 parts by weight of the thermoplastic resin. When the inorganic filler is an organically-modified layered silicate, the amount is preferably within a range from 0.01 to 30 parts by weight, more preferably from 0.05 to 15 parts by weight, and particularly preferably from 0.1 to 10 parts by weight, in terms of an inorganic ash content based on 100 parts by weight of the thermoplastic resin. When the content is too small, the effect of improving heat resistance and stiffness may be lowered. In contrast, when the content is too large, toughness may deteriorate.

The inorganic ash content of the organically-modified layered silicate can be decided by a method of weighing about 2 g of an organically-modified layered silicate, placing the organically-modified layered silicate in a crucible, firing in an electric furnace set at 600° C. for 2 hours thereby ashing the silicate, and determining an inorganic ash content from the weight of the residue after firing. The inorganic ash content in the thermoplastic resin composition can be determined by weighing about 2 g of a thermoplastic resin composition, placing the thermoplastic resin composition in a crucible, firing in an electric furnace set at 600° C. for 3 hours thereby ashing the thermoplastic resin composition, and determining an inorganic ash content from the weight of the residue after firing.

Furthermore, the thermoplastic resin composition can be blended with one or more kinds of heat resistance improvers selected from phenol-based and phosphorous-based compounds so as to maintain thermostability. The amount of the heat resistance improver to be blended is preferably 0.01 parts by weight or more, and particularly preferably 0.02 parts by weight or more, based on 100 parts by weight of the thermoplastic resin in view of the heat resistance improving effect. In view of a gas component generated upon molding, the amount is preferably 5 parts by weight or less, and particularly preferably 1 part by weight or less. It is preferred to use the phenol-based and phosphorous-based compounds in combination since a large effect of maintaining heat resistance, thermo stability and fluidity is exerted.

As the phenol-based compound, a hindered phenol-based compound is preferably used, and N,N'-hexamethylenebis(3,5-di-t-butyl-4-hydroxy-hydrocynnamide) and tetrakis[methylene-3-(3',5'-di-t-butyl-4'-hydroxyphenyl)propionate] methane are preferably used.

Examples of the phosphorous-based compound include bis(2,6-di-t-butyl-4-methylphenyl)pentaerythritol-di-phosphite, bis(2,4-di-t-butylphenyl)pentaerythritol-di-phosphite, bis(2,4-di-cumylphenyl)pentaerythritol-di-phosphite, tris(2,4-di-t-butylphenyl)phosphite, tetrakis(2,4-di-t-butylphenyl)-4,4'-bisphenylene phosphite, di-stearylpentaerythritol-di-phosphite, triphenyl phosphite and 3,5-di-butyl-4-hydroxybenzylphosphonate diethyl ester. Among these compounds, a compound having a high melting point is preferably used so as to suppress volatilization and decomposition of the heat resistance improver during the production process of the thermoplastic resin composition.

The thermoplastic resin composition of the present invention can be further blended with a flame retardant. The flame retardant to be used is not specifically limited as long as it can impart flame retardancy to the thermoplastic composition of the present invention. Specific examples thereof include halogen atom-free non-halogen-based flame retardants such as phosphorous-based flame retardants, nitrogen-based flame retardants, magnesium hydroxide, and silicone-based flame retardant; and halogen-based flame retardants such as bromine-based flame retardants. These flame retardants may be used alone, or plural flame retardants may be used in combination.

The amount of the flame retardant to be added in the present invention is preferably from 1 to 150 parts by weight, more preferably from 3 to 100 parts by weight, still more preferably from 5 to 70 parts by weight, and further preferably from 5 to 50 parts by weight. When the amount is less than 1 part by weight, flame retardancy may deteriorate. In contrast, when the amount is more than 150 parts by weight, fluidity remarkably deteriorates and thus flame retardancy may deteriorate.

The phosphorous-based flame retardant is a compound containing elemental phosphorus, and specific examples thereof include red phosphorus; polyphosphoric acid-based compounds such as ammonium polyphosphate and melamine polyphosphate; aromatic phosphate-based compounds; and aromatic bisphosphate-based compounds.

Examples of the nitrogen-based flame retardant include salts of a triazine-based compound and cyanuric acid or isocyanuric acid. Salts of melamine, benzoguanamine and acetoguanamine with cyanuric acid or isocyanuric acid are particularly preferred.

Commercially available magnesium hydroxides can be used and there is no limitation on particle diameter, specific surface area and shape. The magnesium hydroxide preferably has a particle diameter of 0.1 to 20 μm, a specific surface area of 3 to 75 m²/g, and a spherical, needle or tubular shape. The magnesium hydroxide may be subjected to a surface treatment or not. Examples of the method for a surface treatment method include treatment methods such as formation of coating with a silane coupling agent, an anion surfactant, a polyhydric functional organic acid, and a thermosetting resin such as an epoxy resin.

The bromine-based flame retardant used in the present invention is not specifically limited as long as it is a compound containing bromine in a chemical structure, and conventionally known flame retardants can be used. For example, ethylene bis(tetrabromophthalimide), brominated epoxy polymer, brominated polystyrene, crosslinked brominated polystyrene, brominated polyphenyleneether and brominated polycarbonate are preferably used, and brominated polystyrene, crosslinked brominated polystyrene, brominated polyphenyleneether and brominated polycarbonate are most preferably used. It is also preferred to add a flame-retardant auxiliary which is used so as to synergistically improve flame retardancy by using in combination with the above bromine-based flame retardant. For example, antimony trioxide and antimony pentaoxide are preferred. In view of the effect of improving flame retardancy, the amount of the flame-retardant auxiliary is preferably from 0.2 to 30 parts by weight based on 100 parts by weight of the thermoplastic resin.

The thermoplastic resin composition of the present invention may be further blended with conventional additives, for example, ultraviolet absorbers (resorcinol, salicylate, etc.), discoloration inhibitors (phosphite, hypophosphite, etc.), lubricants and releasants (stearic acid, montanic acid, a metal salt thereof, etc.), colorants, conductant agents, colorants such as carbon black, nucleating agents, plasticizers and antistatic agents, and polymers other than a thermoplastic resin.

The thermoplastic resin composition of the present invention is preferably produced by melt-kneading. A known method can be used for melt-kneading. For example, a resin composition can be obtained by melt-kneading components at a melting temperature of a thermoplastic resin or higher using a Bunbary mixer, a rubber roller, a kneader, a single screw extruder or a twin screw extruder. A method using a twin screw extruder is particularly preferred.

It is possible to use, as a kneading method, any of (1) a method of simultaneously kneading a thermoplastic resin, a hyperbranched-polyester, an inorganic filler as an optional component and other additives, (2) a method of preparing a thermoplastic resin composition (master pellet) containing a thermoplastic resin and a high concentration of other additives, and adding a thermoplastic resin, a hyperbranched-polyester, an inorganic filler as an optional component and remainder of additives in each defined concentration (master pellet method), and (3) a dividedly addition method of kneading a portion of a thermoplastic resin, a hyperbranched-polyester and other additives, and adding remainders of a thermoplastic resin, a hyperbranched-polyester, inorganic filler as an optional component and additives.

In the thermoplastic resin composition thus obtained of the present invention, a thermoplastic resin and a hyperbranched-polyester are in a good dispersion state, and thus characteristics such as thin-wall flowability, stiffness and gas barrier property are imparted to the thermoplastic resin without deteriorating characteristics of the thermoplastic resin.

The thermoplastic resin composition of the present invention can be formed into moldings, sheets, pipes, films and fibers, which have excellent surface appearance (color tone) and mechanical properties, by a molding method such as a conventional injection molding, extrusion molding or press molding method. The thermoplastic resin composition is particularly useful for large-sized injection molding such as automobile components, giant moldings having a 0.01 to 1.0 mm thick thin-wall portion, and fuel tanks having a gas barrier property.

The thermoplastic resin composition thus obtained is useful as electric/electronic components, home/office electric appliance components, building members, fishery related members, civil engineering related members, automotive underhood members, automotive interior components, automotive exterior components, various automotive connectors, mechanical components, agricultural members, sanitary goods, medical supplies, containers, encasements, clothings, and interior goods, and is particularly useful as automotive interior components, automotive exterior components and automotive connectors.

Specific examples of the electric/electronic components include relay cases, coil bobbins, optical pickup chassis, motor cases, PC housings and internal components. Examples of home/office electric appliance components include VTR components, television set components, illumination components, refrigerator components and air conditioner components. Examples of building members include sash rollers, blind curtain components, piping joints and curtain liners. Examples of fishery related members include fishing lines, fishing nets, marine alga culturing nets and bait bags. Examples of civil engineering related members include vegetation nets, vegetation mats, weedproofing bags, weedproofing nets, curing sheets and slope protective sheets. Examples of automotive underhood members include air flow meters, sir pumps, various cases, various tubes and various tanks. Examples of automotive interior components include torque control levers, safety belt-components, resistor blades and washer dish bars. Examples of automotive exterior components include roof rails, fenders, bumpers, door mirror stays and door handles. Examples of various automotive connectors include wire harness connectors, SMJ connectors, PCB connectors and door grommet connectors.

Thermoplastic resin composition of the present invention and the molding comprising the same can be recycled. For example, the resin composition obtained by grinding a resin composition and the molding comprising the same, preferably forming into a powder, and optionally adding additives can be used in the same manner as in the resin composition of the present invention, and also can be formed into a molding.

EXAMPLES

The present invention will be described in more detail by way of Examples, and the gist of the present invention is not limited only to the following Examples.

Example 1

In a 500 mL reaction vessel equipped with a stirring blade and a distillation tube, 66.3 g (0.48 mol) of p-hydroxybenzoic acid, 8.38 g (0.045 mol) of 4,4'-dihydroxybiphenyl, 7.48 g (0.045 mol) of terephthalic acid, 14.41 g (0.075 mol) of polyethylene terephthalate having an inherent viscosity of about 0.6 dl/g and 62.48 g (1.00 equivalents based on the total phenolic hydroxyl groups) of acetic anhydride were charged and then reacted at 145° C. for 2 hours while stirring under a nitrogen gas atmosphere. After adding 31.52 g (0.15 mol) of trimesic acid and heating to 260° C., stirring was carried out for 3 hours. When 91% of a theoretical distillation amount of acetic acid was distilled off, heating and stirring were terminated and contents were ejected in cold water.

With respect to the resultant hyperbranched-polyester (A-1), nuclear magnetic resonance spectrum analysis was carried out. As a result, based on a trimesic acid residue, the content p of a p-oxybenzoate unit was 2.66, the content q of a 4,4'-dioxybiphenyl unit and an ethylene oxide unit was 0.66, the content r of a terephthalate unit was 0.66, and p+q+r=4. At the end, a carboxylic acid and an acetyl group existed in a ratio of 64:36.

With respect to extent of branching, the proportion of those reacted with all three functional groups of trimesic acid was calculated.

A sample was dissolved in a mixed solvent of 50% pentafluorophenol and 50% deuterated chloroform, and then a nuclear magnetic resonance spectrum was measured at 40° C. and nuclear magnetic resonance spectrum analysis of proton-nucleus was carried out. As a result, peaks at 7.44 ppm and 8.16 ppm derived from a p-oxybenzoate unit, peaks at ppm and 7.70 ppm derived from a 4,4'-dioxybiphenyl unit, a peak at 8.31 ppm derived from a terephthalate unit, a peak at 4.75 ppm derived from an ethylene oxide unit and a peak at 9.25 ppm derived from a trimesic acid were detected. The content of each structural unit was calculated from an integrated intensity ratio of each peak and then rounded to three decimal places. F. From a ratio of a peak integrated intensity derived from linear building units P, Q and R to a peak integrated intensity derived from an organic residue B, the contents p, q, r and the content of a branching point were calculated. The presence or absence of carboxylic acid was determined from a peaks sift of three protons of trimesic acid and extent of branching was calculated and then round to three decimal places.

The resultant hyperbranched-polyester showed a melting point Tm of 185° C., a liquid crystallization initiation temperature of 159° C. and a number average molecular weight of 2,300. Melt viscosity measured at a temperature of 189° C. and a sear rate of 100/s using a Koka-type flow tester was 12. Pa·s.

A melting point (Tm) was determined by the following procedure. In scanning calorimetry of a hyperbranched-polyester, an endothermic peak temperature (Tm1) was measured at a temperature of from room temperature under temperature-rise conditions of 20° C./min. After maintaining at a temperature of Tm1+20° C. for 5 minutes and cooling to room temperature under temperature-fall conditions of 20° C./min., the measurement was carried out again under temperature-rise conditions of 20° C./min. to determine an endothermic peak temperature (Tm).

The liquid crystallization initiation temperature was determined by the following procedure. Using an optical reology heating system (CSS-450), the measurement was, carried out at a shear rate of 1.0 (1/seconds), a temperature-rise rate of 5.0° C./min. and an object lens magnification of 60 times to determine a temperature at which flow of the entire visual field initiates.

The molecular weight was determined by the following procedure. Using pentafluorophenol in which a hyperbranched-polyester is soluble, the measurement was carried out by a GPC-LS (gel permeation chromatograph-light scattering) method to determine a number average molecular weight.

The resultant hyperbranched-polyester was subjected to the following evaluations (1) to (3). The results are shown in Table 2.

(1) Viscosity Response Under Shear

Using a Koka-type flow tester, a ratio ($\eta_{100}/\eta_{1000}$) of melt viscosity ($\eta_{100}$) measured at a shear rate of 100/s at a liquid crystallization initiation temperature +30° to melt viscosity ($\eta_{1000}$) measured at a shear rate of 1,000/s was determined. As the viscosity response under shear increases, it becomes possible to mold under low pressure because of sufficient liquid crystallinity and less mold flash.

(2) Stiffness

Using an injection molding machine FANUC 30α-C, a hyperbranched-polyester was molded at a liquid crystallization initiation temperature of +30° C. under constant rate/constant pressure conditions to obtain specimens measuring 1 mm in thickness ×6.2 mm in width ×40 mm in length. With respect to the resultant specimen, a storage elastic modulus at 25° C. was measured by a twin bending test (frequency: 1 Hz) method using a dynamic mechanical spectrometer (VIBRON).

Anisotropy was evaluated by the following procedure. A storage elastic modulus of a specimen measuring 1 mm in thickness ×6.2 mm in width ×40 mm in length cut from a square plate measuring 1 mm in thickness ×40 mm molded similarly using the above molding machine in a flow direction and that of a specimen measuring 1 mm in thickness ×6.2 mm in width×40 mm in length cut from a square plate in a perpendicular direction were measured and a ratio was evaluated.

(3) Gas Barrier Property

A gas barrier property of a square plate measuring 1 mm in thickness ×60 mm molded similarly using the above molding machine in a flow direction was measured at 35° C. in accordance with a JISK7126 A method (differential pressure method) using GTR-10 (manufactured by YANACO ANALYTICAL INSTRUMENTS CORPORATION). A hydrogen gas was used.

Example 2

In the same manner as in Example 1, except that raw monomers were replaced by 58.01 g (0.42 mol) of p-hydroxybenzoic acid, 23.46 g (0.126 mol) of 4,4'-dihydroxybiphenyl, 5.95 g (0.054 mol) of hydroquinone, 19.44 g (0.117 mol) of terephthalic acid, (0.063 mol) of isophthalic acid, 79.63 g (1.00 equivalents based on the total phenolic hydroxyl groups) of acetic anhydride and 31.52 g (0.15 mol) of trimesic acid, a hyperbranched-polyester was obtained. In the same manner as in Example 1, the resultant hyperbranched-polyester was evaluated. The results are shown in Table 1 and Table 2.

Example 3

In the same manner as in Example 1, except that raw monomers were replaced by 58.01 g (0.42 mol) of p-hydroxybenzoic acid, 65.36 g (0.351 mol) of 4,4'-dihydroxybiphenyl, 5.95 g (0.054 mol) of hydroquinone, 19.44 g (0.117 mol) of terephthalic acid, (0.063 mol) of isophthalic acid, 83.61 g (1.05 equivalents based on the total phenolic hydroxyl groups) of acetic-anhydride and 31.52 g (0.15 mol) of trimesic acid, a hyperbranched-polyester was obtained. In the same manner as in Example 1, the resultant hyperbranched-polyester was evaluated. The results are shown in Table 1 and Table 2.

Example 4

In the same manner as in Example 1, except that raw monomers were replaced by 58.01 g (0.42 mol) of p-hydroxybenzoic acid, 70.95 g (0.381 mol) of 4,4'-dihydroxybiphenyl, 5.95 g (0.054 mol) of hydroquinone, 19.44 g (0.117 mol) of terephthalic acid, isophthalic acid (0.063 mol), 75.65 g (0.95 equivalents based on the total phenolic hydroxyl groups) and acetic anhydride and 31.52 g (0.15 mol) of trimesic acid, a hyperbranched-polyester was obtained. In the same manner as in Example 1, the resultant hyperbranched-polyester was evaluated. The results are shown in Table 1 and Table 2.

Example 5

In the same manner as in Example 1, except that raw monomers were replaced by 60.50 g (0.44 mol) of p-hydroxybenzoic acid, 30.49 g (0.162 mol) of 6-hydroxy-2-naphthoic acid, 18.62 g (0.10 mol) of 4,4-dihydroxybiphenyl, 61.25 g (1.00 equivalents based on the total phenolic hydroxyl groups) of acetic anhydride and 31.52 g (0.176 mol) of trimesic acid, a hyperbranched-polyester was obtained. In the same manner as in Example 1, the resultant hyperbranched-polyester was evaluated. The results are shown in Table 1 and Table 2.

Example 6

In a 500 mL reaction vessel equipped with a stirring blade and a distillation tube, 58.01 g (0.42 mol) of p-hydroxybenzoic acid, 23.46 g (0.126 mol) of 4,4'-dihydroxybiphenyl, 5.95 g (0.054 mol) of hydroquinone, 19.44 g (0.117 mol) of terephthalic acid, isophthalic acid (0.063 mol) and 79.63 g (1.00 equivalents based on the total phenolic hydroxyl groups) of acetic anhydride were charged and then reacted at 145° C. ℃2 hours while stirring under a nitrogen gas atmosphere. After adding 31.52 g (0.15 mol) of trimesic acid and heating to 260° C., stirring was carried out for 3 hours, followed by evacuation to 26,600 Pa. When 93% of a theoretical distillation amount of acetic acid was distilled off, heating and stirring were terminated and contents were ejected in cold water. In the same manner as in Example 1, the resultant hyperbranched-polyester was evaluated. The results are shown in Table 1 and Table 2.

Example 7

In 500 mL reaction vessel equipped with a stirring blade and a distillation tube, 58.01 g (0.42 mol) of p-hydroxybenzoic acid, 23.46 g (0.126 mol) of 4,4'-dihydroxybiphenyl, 5.95 g (0.054 mol) of hydroquinone, 19.44 g (0.117 mol) of terephthalic acid, (0.063 mol) of isophthalic acid and 79.63 g (1.00 equivalents based on the total phenolic hydroxyl groups) of acetic anhydride were charged and then reacted at 145° C. for 2 hours while stirring under a nitrogen gas atmosphere. After adding 31.52 g (0.15 mol) of trimesic acid and heating to 260° C., stirring was carried out for 3 hours, followed by evacuation to 13,300 Pa. When 96% of a theoretical distillation amount of acetic acid was distilled off, heating and stirring were terminated and contents were ejected in cold water. In the same manner as in Example 1, the resultant hyperbranched-polyester was evaluated. The results are shown in Table 1 and Table 2.

Example 8

In the same manner as in Example 1, except that raw monomers were replaced by 58.01 g (0.42 mol) of p-hydroxybenzoic acid, 23.46 g (0.126 mol) of 4,4'-dihydroxybiphenyl, 5.95 g (0.054 mol) of hydroquinone, 19.44 g (0.117 mol) of terephthalic acid, (0.063 mol) of isophthalic acid, 79.63 g (1.00 equivalents based on the total phenolic hydroxyl groups) of acetic anhydride and 15.13 g (0.072 mol) of trimesic acid, a hyperbranched-polyester was obtained. In the same manner as in Example 1, the resultant hyperbranched-polyester was evaluated. The results are shown in Table 1 and Table 2.

Example 9

In the same manner as in Example 1, except that raw monomers were replaced by 58.01 g (0.42 mol) p-hydroxybenzoic acid, 23.46 g (0.126 mol) of 4,4'-dihydroxybiphenyl, 5.95 g (0.054 mol) of hydroquinone, 19.44 g (0.117 mol) of terephthalic acid, (0.063 mol) of isophthalic acid and 79.63 g (1.00 equivalents based on the total phenolic hydroxyl groups) of acetic anhydride and 23.12 g (0.15 mol) of α-resorcylic acid was used in place of trimesic acid, a hyperbranched-polyester was obtained. In the same manner as in Example 1, the resultant hyperbranched-polyester was evaluated. The results are shown in Table 1 and Table 2.

Example 10

In a 500 mL reaction vessel equipped with a stirring blade and a distillation tube, 58.01 g (0.42 mol) of p-hydroxybenzoic acid, 65.368 g (0.351 mol) of 4,4'-dihydroxybiphenyl, 5.95 g (0.054 mol) of hydroquinone, 19.44 g (0.117 mol) of terephthalic acid, (0.063 mol) of isophthalic acid, 31.52 g (0.15 mol) of trimesic acid and 83.61 g (1.05 equivalents based on the total phenolic hydroxyl groups) of acetic anhydride were charged and then reacted at 145° C. for 2 hours while stirring under a nitrogen gas atmosphere. After heating to 280° C., stirring was carried out for 3 hours. When 91% of a theoretical distillation amount of acetic acid was distilled off and 12.2 g (0.100 mol: 1.000 times larger than that of theoretical acetoxy end) of benzoic acid was added and then 100% of acetic acid was distilled off, heating and stirring were terminated and contents were ejected in cold water. In the same manner as in Example 1, the resultant hyperbranched-polyester was evaluated. The results are shown in Table 1 and Table 2.

Example 11

In a 500 mL reaction vessel equipped with a stirring blade and a distillation tube, 66.30 g (0.48 mol) of p-hydroxybenzoic acid, 8.38 g (0.045 mol) of 4,4'-dihydroxybiphenyl, 7.48 g (0.045 mol) of terephthalic acid, 14.40 g (0.075 mol) of polyethylene terephthalate having an inherent viscosity of about 0.6 dl/g, 42.72 g (0.28 mol) of α-resorcylic acid and 78.26 g (1.08 equivalents based on the total phenolic hydroxyl groups) of acetic anhydride were charged and then reacted at 145° C. for 2 hours while stirring under a nitrogen gas atmosphere. After heating to 260° C., stirring was carried out for 3 hours. When 91% of a theoretical distillation amount of acetic acid was distilled off and 25.6 g (0.21 mol: 1.000 times larger than that of theoretical acetoxy end) of benzoic acid was added and then 100% of acetic acid was distilled off, heating and stirring were terminated and contents were ejected in cold water. In the same manner as in Example 1, the resultant hyperbranched-polyester was evaluated. The results are shown in Table 1 and Table 2.

Comparative Example 1

In the same manner as in Example 1, except that raw monomers were replaced by 66.3 g (0.48 mol) of p-hydroxybenzoic acid, 8.38 g (0.045 mol) of 4,4'-dihydroxybiphenyl, 7.48 g (0.045 mol) of terephthalic acid, 14.41 g (0.075 mol) of polyethylene terephthalate having an inherent viscosity of about 0.6 dl/g and 62.48 g (1.00 equivalents based on the total phenolic hydroxyl groups) of acetic anhydride and trimesic acid was not added, a polyester (B-1) was obtained. In the same manner as in Example 1, the resultant polyester was evaluated. The results are shown in Table 1 and Table 2.

Comparative Example 2

In the same manner as in Example 1, except that raw monomers were replaced by 66.3 g (0.48 mol) of p-hydroxybenzoic acid, 8.38 g (0.045 mol) of 4,4'-dihydroxybiphenyl, 7.48 g (0.045 mol) of terephthalic acid, g (0.075 mol) of polyethylene terephthalate having an inherent viscosity of about 0.6 dl/g, 62.48 g (1.00 equivalents based on the total phenolic hydroxyl groups) of acetic anhydride and 6.62 g (0.032 mol) of trimesic acid, a hyperbranched-polyester (B-2) was obtained. In the same manner as in Example 1, the resultant hyperbranched-polyester was evaluated. The results are shown in Table 1 and Table 2.

The hyperbranched-polyester is excellent in viscosity response under shear and therefore enables low-pressure high-speed molding and is less likely to cause mold flash. Since it is easy to be oriented by shear, high elastic modulus is achieved even by press molding and the resultant molding is highly packed and is therefore excellent in gas barrier property. Regardless of liquid crystallinity, the resultant molding has small anisotropy.

Reference Examples

Thermoplastic Resins

C-1: Nylon 6 (N6) "Amilan" CM1010 (melting point: 225° C.) manufactured by TORAY INDUSTRIES, INC.

C-2: Nylon 66 (N66) "Amilan" CM3001-N (melting point: 262° C.) manufactured by TORAY INDUSTRIES, INC.

TABLE 1

| | Hyperbranched-polyester | Branching point B Content (Mol %) | p | q | r | p + q + r | Ratio of terminal carboxylic acid/acectyl group | Extent of branching 3 | Molecular weight |
|---|---|---|---|---|---|---|---|---|---|
| Example 1 | A-1 | 20 | 2.66 | 0.66 | 0.20 | 4 | 64/36 | 0.68 | 2300 |
| Example 2 | A-2 | 20 | 2.14 | 0.92 | 0.92 | 4 | 73/27 | 0.65 | 2100 |
| Example 3 | A-3 | 20 | 1.68 | 1.60 | 0.72 | 4 | 50/50 | 0.67 | 3600 |
| Example 4 | A-4 | 20 | 1.62 | 1.68 | 0.70 | 4 | 49/51*[1] | 0.68 | 2800 |
| Example 5 | A-5 | 20 | 3.42 | 0.58 | 0 | 4 | 61/39*[1] | 0.67 | 2100 |
| Example 6 | A-6 | 20 | 2.14 | 0.92 | 0.92 | 4 | 61/39 | 0.68 | 4400 |
| Example 7 | A-7 | 20 | 2.14 | 0.92 | 0.92 | 4 | 61/39 | 0.65 | 9500 |
| Example 8 | A-8 | 10 | 4.84 | 2.08 | 2.08 | 9 | 56/44 | 0.70 | 4500 |
| Example 9 | A-9 | 20 | 2.14 | 0.92 | 0.92 | 4 | 46/54 | 0.66 | 2000 |
| Example 10 | A-10 | 20 | 1.68 | 1.60 | 0.72 | 4 | 50/50*[2] | 0.64 | 3700 |
| Example 11 | A-11 | 30 | 1.32 | 0.33 | 0.33 | 2 | 50/50*[2] | 0.64 | 3500 |
| Comparative Example 1 | B-1 | — | — | — | — | — | — | — | 2200 |
| Comparative Example 2 | B-2 | 5 | 12.66 | 3.17 | 3.17 | 19 | 54/46 | 0.75 | 2200 |

*[1]Hydroxyl group
*[2]Blocking with benzoic acid

TABLE 2

| | Hyperbranched-polyester | Melting point (° C.) | Liquid crystallization initiation temperature (° C.) | Melt viscosity | | Response under shear | Storage elastic modulus (GPa) | Anisotropy (MD/TD) | Hydrogen gas barrier properties (cm$^3$ · cm/cm$^2$ · sec · cmHg) |
| | | | | Viscosity (Pa · s) | Temperature (° C.) | | | | |
|---|---|---|---|---|---|---|---|---|---|
| Example 1 | A-1 | 185 | 159 | 12 | 189 | 25 | 4.5 | 1.1 | 1.8 |
| Example 2 | A-2 | 186 | 159 | 13 | 189 | 23 | 5.8 | 1.0 | 1.6 |
| Example 3 | A-3 | 192 | 167 | 20 | 197 | 32 | 6.4 | 1.1 | 1.5 |
| Example 4 | A-4 | 188 | 157 | 16 | 187 | 24 | 5.6 | 1.1 | 1.7 |
| Example 5 | A-5 | 168 | 145 | 12 | 175 | 16 | 2.0 | 1.3 | 2.2 |
| Example 6 | A-6 | 225 | 197 | 24 | 227 | 35 | 6.6 | 1.1 | 1.4 |
| Example 7 | A-7 | 256 | 228 | 38 | 258 | 41 | 7.2 | 1.0 | 1.3 |
| Example 8 | A-8 | 208 | 189 | 15 | 219 | 15 | 3.5 | 1.4 | 1.8 |
| Example 9 | A-9 | 176 | 152 | 15 | 182 | 18 | 2.9 | 1.3 | 2.0 |
| Example 10 | A-10 | 189 | 164 | 8 | 194 | 33 | 6.2 | 1.1 | 1.5 |
| Example 11 | A-11 | 182 | 152 | 7 | 192 | 29 | 6.0 | 1.1 | 1.6 |
| Comparative Example 1 | B-1 | 264 | 232 | 8 | 262 | 8 | 1.2 | 4.5 | 4.5 |
| Comparative Example 2 | B-2 | 232 | 215 | 9 | 245 | 10 | 1.3 | 3.8 | 4.2 |

As is apparent from Table 1 and Table 2, the hyperbranched-polyester of the present invention shows excellent liquid crystallinity by the specific hyperbranched-structure.

C-3: Polybutylene terephthalate (PBT) "Toraycon" 1100S (inherent viscosity: 0.89 dl/g, melting point: 223° C.) manufactured by TORAY INDUSTRIES, INC.

C-4: Polyethylene terephthalate (PET) T-704 (inherent viscosity: 1.20 dl/g, melting point: 260° C.) manufactured by TORAY INDUSTRIES, INC.

C-5: Polyphenylene sulfide (PPS) M2100 (melting point: 283° C.) manufactured by TORAY INDUSTRIES, INC.

C-6: Polylactic acid (PLA) LACEA H-100 (melting point: 168° C.) manufactured by Mitsui Chemicals, Inc.

C-7: Modified polyphenyleneether (modified PPE) Noryl GTX6011 (processing temperature: 280° C.) manufactured by GE Co.

C-8: Copolymer of methacrylic acid-methyl methacrylate-glutaric anhydride unit (processing temperature: 260° C.)

In a 20 liter autoclave made of a stainless steel equipped with a baffle and a Faudler stirring blade, a solution prepared by dissolving 0.1 parts by weight of a polyvinyl alcohol-based suspending agent ("POVAL PVA-117", manufactured by KURARAY CO., LTD.) in 165 parts by weight of ion-exchange water was supplied and the atmosphere in the system was bubbled with a nitrogen gas at a flow rate of 10 liter/min. for 15 minutes while stirring at 400 rpm. The concentration of dissolved oxygen of the aqueous solution was 2.5 ppm. After allowing a nitrogen gas to flow at a flow rate of 5 liter/min, the following mixed substance was added while stirring the reaction system, followed by heating to 65° C.

Methacrylic acid: 30 Parts by weight
Methyl methacrylate: 70 Parts by weight
t-dodecylmercaptan: 0.4 Parts by weight
Lauryl peroxide: 0.3 Parts by weight The point of time at which an inner temperature reached 65° C. was taken as a polymerization initiation time. The inner temperature was maintained at 65° C. for 210 minutes and, after heating to 85° C., the inner temperature was maintained at 85° C. for 60 minutes thereby completing the polymerization. After cooling the reaction system, the polymer was separated, washed and then dried to obtain a beads-shaped acrylic resin precursor. The resultant acrylic resin precursor showed a polymerization rate of 98% and a weight average molecular weight of 130,000.

100 Parts by weight of the resultant acrylic resin precursor was blended with 0.2 parts by weight of lithium acetate as a catalyst and the resultant blend was supplied in a twin-screw/single-screw combined continuous kneading extruder HTM38 having a diameter of 38 mm (manufactured by CTE Co., L-D 47.5, vent portion: 2 positions). While purging with nitrogen from the hopper portion at a flow rate of 10 liter/min., an intramolecular cyclization reaction was carried out at the number of screw rotations of 75 rpm, a raw material supply rate of 10 kg/h and a cylinder temperature of 290° C. to obtain a copolymer of a pellet-shaped methacrylic acid-methyl methacrylate-glutaric anhydride unit. This copolymer contained 32% by weight of a glutaric anhydride unit, 65% by weight of a methyl methacrylate unit and 3% by weight of a methacrylic acid unit.

C-9: Acrylonitrile-butadiene-styrene copolymer (ABS) T-100 (processing temperature: 220° C.) manufactured by TORAY INDUSTRIES, INC.

C-10: Polycarbonate resin (PC) TARFLON A1900 (processing temperature: 300° C.) manufactured by Idemitsu Petrochemical-Co., Ltd.

Examples 12 to 35, Comparative Examples 3 to 15

Using a twin screw extruder, Model TEM35B, manufactured by TOSHIBA MACHINE CO., LTD., thermoplastic resins (C-1 to C-10) and hyperbranched-polyesters (A-1 to A-11) obtained in Examples 1 to 9 or polyesters (B-1, B-2) obtained in Comparative Examples 1 and 2 were dry-blended in a mixing ratio shown in Table 3 and Table 4 and the resultant blend was charged from a hopper. Separately, inorganic fillers (GF: D-1 ECS03T747H (diameter: 10.5 μm) manufactured by Nippon Electric Glass Co., Ltd., D-2 CS3J948 (diameter: 10 μm) manufactured by Nitto Boseki Co., Ltd., D-3 T-28.9 (diameter: 13 μm) manufactured by Nippon Electric Glass Co., Ltd., D-4 T-249 (diameter: 13 μm) manufactured by Nippon Electric Glass Co., Ltd.) were charged from side feeder in a mixing ratio shown in Table 3 and Table 4 and then melt-kneaded at melting point +10° C. (C-7: 280° C., C-8: 260° C., C-9: 220° C., C-10: 300° C.) of the thermoplastic resin to obtain pellets of a thermoplastic resin composition.

The resultant pellets were hot-air dried and then supplied to an injection molding machine FANUC α30C (manufactured by FANUC LTD.) and formed into specimens as described in (4) to (6), and then the resultant thermoplastic resin composition was evaluated.

(4) Thin-Wall Flowability

A resin temperature upon injection molding was set to the same temperature upon kneading, an injection rate was set to 300 mm/s and an injection pressure was set to 50 MPa. Using a mold for bar flow length test, measuring 150 mm in length× 3.2 mm in width×0.3 mm in thickness, a bar flow length at a dwell pressure of 0 was measured at a mold temperature of 80° C.

(5) Storage Elastic Modulus

A resin temperature upon injection molding was set to the same temperature upon kneading, an injection rate was set to 300 mm/s and an injection pressure was set to a lower limit pressure +1 MPa, and then ASTM No. 1 dumbbell specimens were formed at a mold temperature of 80° C. Using a dynamic mechanical spectrometer (VIBRON), a storage elastic modulus at 25° C. was measured by a twin bending test (frequency: 1 Hz) method.

(6) Gas Barrier Property

A resin temperature upon injection molding was set to the same temperature upon kneading, an injection rate was set to 300 mm/s and an injection pressure was set to a lower limit pressure +1 MPa, and then square plate specimens measuring 1 mm in thickness ×40 mm were formed at a mold temperature of 80° C. In accordance with a A method (differential pressure method), the measurement was carried out at 35° C. using GTR-10 (manufactured by YANACO ANALYTICAL INSTRUMENTS CORPORATION). A hydrogen gas was used.

TABLE 3

|  | Thermoplastic resin (Parts by weight) | Hyperbranched-polyester (Parts by weight) | GF (Parts by weight) | Thin-wall flowability (mm) | Storage elastic modulus (GPa) | Hydrogen gas barrier properties ($cm^3 \cdot cm/cm^2 \cdot sec \cdot cmHg$) |
|---|---|---|---|---|---|---|
| Example 12 | C-1(100) | A-1(1) | D-1(50) | 109 | 9.4 | 2.0 |
| Example 13 | C-1(100) | A-1(3) | D-1(50) | 101 | 10.1 | 1.9 |

TABLE 3-continued

|  | Thermoplastic resin (Parts by weight) | Hyperbranched-polyester (Parts by weight) | GF (Parts by weight) | Thin-wall flowability (mm) | Storage elastic modulus (GPa) | Hydrogen gas barrier properties ($cm^3 \cdot cm/cm^2 \cdot sec \cdot cmHg$) |
|---|---|---|---|---|---|---|
| Example 14 | C-1(100) | A-2(3) | D-1(50) | 121 | 10.4 | 1.8 |
| Example 15 | C-1(100) | A-3(3) | D-1(50) | 105 | 9.8 | 1.9 |
| Example 16 | C-1(100) | A-5(3) | D-1(50) | 85 | 9.2 | 2.4 |
| Example 17 | C-1(100) | A-5(10) | D-1(50) | 115 | 10.1 | 2.0 |
| Example 18 | C-1(100) | A-5(35) | D-1(50) | 138 | 13.7 | 2.0 |
| Example 19 | C-1(100) | A-5(70) | D-4(50) | 150< | 16.5 | 2.1 |
| Example 20 | C-2(100) | A-5(3) | D-3(50) | 92 | 9.3 | 2.5 |
| Example 21 | C-3(100) | A-5(3) | D-2(50) | 68 | 9.0 | 2.3 |
| Example 22 | C-1(100) | A-7(3) | D-1(50) | 138 | 10.8 | 1.8 |
| Example 23 | C-1(100) | A-8(3) | D-1(50) | 78 | 9.2 | 2.2 |
| Example 24 | C-1(100) | A-9(3) | D-1(50) | 86 | 9.6 | 2.2 |
| Example 25 | C-1(100) | A-1(3) | — | 70 | 3.8 | 3.4 |
| Example 26 | C-1(100) | A-10(1) | D-1(50) | 118 | 9.4 | 1.9 |
| Example 27 | C-3(100) | A-10(1) | D-2(50) | 90 | 9.2 | 2.3 |
| Example 28 | C-4(100) | A-10(1) | — | 16 | 3.0 | 2.0 |
| Example 29 | C-5(100) | A-10(1) | D-1(50) | 35 | 10.3 | 4.0 |
| Example 30 | C-6(100) | A-10(1) | D-2(50) | 42 | 6.7 | 2.2 |
| Example 31 | C-7(100) | A-10(1) | — | 52 | 2.1 | 3.8 |
| Example 32 | C-8(100) | A-5(1) | — | 25 | 3.7 | 5.2 |
| Example 33 | C-9(100) | A-10(1) | — | 53 | 2.4 | 4.6 |
| Example 34 | C-10(100) | A-10(3) | — | 85 | 2.9 | 3.2 |
| Example 35 | C-4(100) | A-11(1) | — | 32 | 3.1 | 1.9 |

TABLE 4

|  | Thermoplastic resin (Parts by weight) | Hyperbranched-polyester (Parts by weight) | GF (Parts by weight) | Thin-wall flowability (mm) | Storage elastic modulus (GPa) | Hydrogen gas barrier properties ($cm^3 \cdot cm/cm^2 \cdot sec \cdot cmHg$) |
|---|---|---|---|---|---|---|
| Comparative Example 3 | C-1(100) | — | — | 58 | 3.0 | 4.5 |
| Comparative Example 4 | C-1(100) | — | D-4(50) | 38 | 8.5 | 2.6 |
| Comparative Example 5 | C-2(100) | — | D-3(50) | 48 | 8.7 | 2.9 |
| Comparative Example 6 | C-3(100) | — | D-2(50) | 35 | 8.8 | 2.5 |
| Comparative Example 7 | C-1(100) | B-1(3) | D-1(50) | 48 | 8.8 | 3.2 |
| Comparative Example 8 | C-1(100) | B-2(3) | D-1(50) | 51 | 8.9 | 2.6 |
| Comparative Example 9 | C-4(100) | — | — | 10 | 2.9 | 2.2 |
| Comparative Example 10 | C-5(100) | — | D-1(50) | 22 | 10.0 | 6.4 |
| Comparative Example 11 | C-6(100) | — | D-2(50) | 35 | 6.5 | 2.4 |
| Comparative Example 12 | C-7(100) | — | — | 38 | 1.9 | 5.5 |
| Comparative Example 13 | C-8(100) | — | — | 18 | 3.5 | 6.8 |
| Comparative Example 14 | C-9(100) | — | — | 49 | 2.2 | 5.0 |
| Comparative Example 15 | C-10(100) | — | — | 35 | 2.3 | 5.8 |

As is apparent from Table 3 and Table 4, since a thermoplastic resin composition blended with the hyperbranched-polyester of the present invention is excellent in thin-wall flowability and can be formed under low pressure, mold flash is less likely to occur. It is apparent that stiffness and gas barrier property are improved when compared with those blended with a polyester containing less branching. It is also found that the effect on various resins can be adjusted by controlling reactivity by end blocking.

Example 36

A thermoplastic resin composition obtained in Example 26 and a thermoplastic resin composition obtained in Comparative Example 9 were spun using a spinning device comprising a twin screw extruder equipped with a sand pack and a spinner while changing a temperature of a pack and that of a spinneret, and then a temperature corresponding to a pack pressure of 100 MPa was evaluated. The thermoplastic resin composition of Example 26 showed a temperature corresponding to a pack pressure of 100 MPa of 282° C., and the thermoplastic resin composition of Comparative Example 9 showed a temperature corresponding to a pack pressure of 100 MPa of 310° C. It is apparent that the thermoplastic resin composition of the present invention has low viscosity and is excellent in processability.

Example 37

A thermoplastic resin composition obtained in Example 26 and a thermoplastic resin composition obtained in Comparative Example 9 were supplied to a film-forming device in which a gear pump and a polymer filter having a diameter of 15 μm are connected to a twin screw extruder having a vent mechanism, Model TEX30, manufactured by Japan Steel Works, LTD. via a piping having a uniform thickness connected via a mold plate, and a T-die is further connected. While venting at the number of screw rotations of 150 rpm, a supply rate was controlled to a fixed value using a gear pump and a molten thermoplastic resin composition was ejected through a T-die with a retention portion having a lip opening of 0.5 mm to form a film and a T-die internal pressure was evaluated. The temperature was adjusted to 290° C. at all portions. The thermoplastic resin composition of Example 26 showed a T-die internal pressure of 65 MPa, and the thermoplastic resin composition of Comparative Example 9 showed a T-die internal pressure of 142 MPa. It is apparent that the thermoplastic resin composition of the present invention is excellent in processability.

Example 38

In a 500 mL reaction vessel equipped with a stirring blade and a distillation tube, 77.4 g (0.56 mol) of p-hydroxybenzoic acid, 9.78 g (0.053 mol) of 4,4'-dihydroxybiphenyl, 8.72 g (0.053 mol) of terephthalic acid, 32.0 g (0.19 mol) of gallic acid, 16.81 g (0.088 mol) of polyethylene terephthalate having an inherent viscosity of about 0.6 dl/g and 125.51 g (1.00 equivalents based on the total phenolic hydroxyl groups) of acetic anhydride were charged and then reacted at 145° C. for 2 hours while stirring under a nitrogen gas atmosphere. After heating to 280° C., stirring was carried out for 3 hours. When 70% of a theoretical distillation amount of acetic acid was distilled off, heating and stirring were terminated and contents were ejected in cold water.

The resultant hyperbranched-polyester (A-12) was subjected to nuclear magnetic resonance spectrum analysis. Based on the gallic acid residue, the content p of a p-oxybenzoate unit was 1.66, the content q of a 4,4'-dioxybiphenyl unit and an ethylene oxide unit was 0.42, and the content r of a terephthalate unit was 0.42, and p+q+r=2.50. At the end, an acetyl group existed. With respect to extent of branching, the proportion of those reacted with all four or three functional groups of trimesic acid was calculated.

The resultant hyperbranched-polyester showed a melting point Tm of 175° C., a liquid crystallization initiation temperature of 135° C. and a number average molecular weight of 2,000. A melt viscosity measured at a temperature of 187° C. and a shear rate of 100/s using a Koka-type flow tester was 11 Pa·s.

The resultant hyperbranched-polyester was subjected to the following evaluations (1) to (3). The results are shown in Table 6.

Example 39

In the same manner as in Example 38, except that raw monomers were replaced by 58.01 g (0.42 mol) of p-hydroxybenzoic acid, 23.46 g (0.126 mol) of 4,4'-dihydroxybiphenyl, 5.95 g (0.054 mol) of hydroquinone, 19.44 g (0.117 mol) of terephthalic acid, isophthalic acid (0.063 mol), 33.17 g (0.195 mol) of gallic acid and 139.35 g (1.00 equivalents based on the total phenolic hydroxyl groups) of acetic anhydride, a hyperbranched-polyester was obtained. In the same manner as in Example 1, the resultant hyperbranched-polyester was evaluated. The results are shown in Table 5 and Table 6.

Example 40

In the same manner as in Example 38, except that raw monomers were replaced by 60.50 g (0.44 mol) of p-hydroxybenzoic acid, 30.49 g (0.162 mol) of 6-hydroxy-2-naphthoic acid, 25.52 g (0.15 mol) of gallic acid and 107.20 g (1.00 equivalents based on the total phenolic hydroxyl groups) of acetic anhydride, a hyperbranched-polyester was obtained. In the same manner as in Example 1, the resultant hyperbranched-polyester was evaluated. The results are shown in Table 5 and Table 6.

Example 41

In the same manner as in Example 38, except that raw monomers were replaced by 77.4 g (0.56 mol) of p-hydroxybenzoic acid, 9.78 g (0.053 mol) of 4,4'-dihydroxybiphenyl, 8.72 g (0.053 mol) of terephthalic acid, 32.0 g (0.19 mol) of gallic acid, 16.81 g (0.088 mol) of polyethylene terephthalate having an inherent viscosity of about 0.6 dl/g and 125.51 g (1.00 equivalents based on the total phenolic hydroxyl groups) of acetic anhydride and the reaction was carried out until 75% of a theoretical distillation amount of acetic acid was distilled off, a hyperbranched-polyester was obtained. In the same manner as in Example 1, the resultant hyperbranched-polyester was evaluated. The results are shown in Table 5 and Table 6.

Example 42

In the same manner as in Example 38, except that raw monomers were replaced by 77.4 g (0.56 mol) of p-hydroxybenzoic acid, 9.78 g (0.053 mol) of 4,4'-dihydroxybiphenyl, 8.72 g (0.053 mol) of terephthalic acid, 32.0 g (0.19 mol) of gallic acid, 16.81 g (0.088 mol) of polyethylene terephthalate having an inherent viscosity of about 0.6 dl/g and 125.51 g (1.00 equivalents based on the total phenolic hydroxyl groups) of acetic anhydride and the reaction was carried out until 80% of a theoretical distillation amount of acetic acid was distilled off hyperbranched-polyester was obtained. In the same manner as in Example 1, the resultant hyperbranched-polyester was evaluated. The results are shown in Table 5 and Table 6.

Example 43

In the same manner as in Example 38, except that raw monomers were replaced by 77.4 g (0.56 mol) of p-hydroxybenzoic acid, 9.78 g (0.053 mol) of 4,4'-dihydroxybiphenyl, 8.72 g (0.053 mol) of terephthalic acid, 8.00 g (0.047 mol) of gallic acid, 16.81 g (0.088 mol) of polyethylene terephthalate having an inherent viscosity of about 0.6 dl/g and 125.51 g (1.00 equivalents based on the total phenolic hydroxyl groups) of acetic anhydride, a hyperbranched-polyester was obtained. In the same manner as in Example 1, the resultant hyperbranched-polyester was evaluated. The results are shown in Table 5 and Table 6.

Example 44

In a 500 mL reaction vessel equipped with a stirring blade and a distillation tube, 77.4 g (0.56 mol) of p-hydroxybenzoic acid, 9.78 g (0.053 mol) of 4,4'-dihydroxybiphenyl, 8.72 g (0.053 mol) of terephthalic acid, 16.81 g (0.088 mol) of polyethylene terephthalate having an inherent viscosity of about 0.6 dl/g and 67.89 g (1.00 equivalents based on the total phenolic hydroxyl groups) of acetic anhydride and then reacted at 145° C. for 2 hours while stirring under a nitrogen gas atmosphere. After adding 57.24 g (0.188 mol) of 1,4,5,8-naphthalenetetracarboxylic acid and heating to 280° C. stirring was carried out for 3 hours. When 70% of a theoretical distillation amount of acetic acid was distilled off, heating and stirring were terminated and contents were ejected in cold water. In the same manner as in Example 1, the resultant hyperbranched-polyester was evaluated. The results are shown in Table 5 and Table 6.

Example 45

In a 500 mL reaction vessel equipped with a stirring blade and a distillation tube, 77.4 g (0.56 mol) of p-hydroxybenzoic acid, 9.78 g (0.053 mol) of 4,4'-dihydroxybiphenyl, 8.72 g (0.053 mol) of terephthalic acid, 32.0 g (0.19 mol) of gallic acid, 16.81 g (0.088 mol) of polyethylene terephthalate having an inherent viscosity of about 0.6 dl/g and 125.51 g (1.00 equivalents based on the total phenolic hydroxyl groups) of acetic anhydride were charged and then reacted at 145° C. for 2 hours while stirring under a nitrogen gas atmosphere. After heating to 280° C., stirring was carried out for 3 hours. When 70% of a theoretical distillation amount of acetic acid was distilled off, 33.25 g (0.27 mol: 1-1.000 times larger than that of theoretical acetoxy end) of benzoic acid were added. When 100% of a theoretical distillation amount of acetic acid was distilled off, heating and stirring were terminated and contents were ejected in cold water. In the same manner as in Example 1, the resultant hyperbranched-polyester was evaluated. The results are shown in Table 5 and Table 6.

Comparative Example 16

In the same manner as in Example 38, except that raw monomers were replaced by 77.4 g (0.56 mol) of p-hydroxybenzoic acid, 9.78 g (0.053 mol) of 4,4'-dihydroxybiphenyl, 8.72 g (0.053 mol) of terephthalic acid, g (0.020 mol) of gallic acid, 16.81 g (0.088 mol) of polyethylene terephthalate having an inherent viscosity of about 0.6 dl/g and 125.51 g (1.00 equivalents based on the total phenolic hydroxyl groups) of acetic anhydride, a hyperbranched-polyester (B-3) was obtained. In the same manner as in Example 1, the resultant hyperbranched-polyester was evaluated. The results are shown in Table 5 and Table 6.

TABLE 5

| | Hyperbranched-polyester | Branching point B Content (Mol %) | p | q | r | P+q+r | Ratio of terminal carboxylic acid/acectyl group | Extent of branching 4 | Extent of branching 3 | Number average molecular weight |
|---|---|---|---|---|---|---|---|---|---|---|
| Example 38 | A-12 | 20 | 2.66 | 0.67 | 0.67 | 4 | 0/100 | 0.20 | 0.55 | 2000 |
| Example 39 | A-13 | 20 | 2.14 | 0.93 | 0.93 | 4 | 0/100 | 0.25 | 0.50 | 2100 |
| Example 40 | A-14 | 20 | 4 | — | — | 4 | 0/100 | 0.27 | 0.45 | 2300 |
| Example 41 | A-15 | 20 | 2.66 | 0.67 | 0.67 | 4 | 0/100 | 0.25 | 0.47 | 3500 |
| Example 42 | A-16 | 20 | 2.66 | 0.67 | 0.67 | 4 | 0/100 | 0.27 | 0.45 | 5100 |
| Example 43 | A-17 | 6 | 10.66 | 2.67 | 2.67 | 16 | 0/100 | 0.24 | 0.48 | 3300 |
| Example 44 | A-18 | 20 | 2.66 | 0.67 | 0.67 | 4 | 0/100 | 0.20 | 0.55 | 2900 |
| Example 45 | A-19 | 20 | 2.66 | 0.67 | 0.67 | 4 | 0/100* | 0.22 | 0.53 | 3100 |
| Comparative Example 1 | B-1 | — | — | — | — | — | — | — | — | 2200 |
| Comparative Example 16 | B-3 | 2.5 | 26.64 | 6.68 | 6.68 | 40 | 0/100 | 0.21 | 0.51 | 3000 |

*Blocking with benzoic acid

TABLE 6

| | Hyperbranched-polyester | Melting point (° C.) | Liquid crystallization initiation temperature (° C.) | Melt viscosity Viscosity (Pa·s) | Melt viscosity Temperature (° C.) | Response under shear | Storage elastic modulus (GPa) | Anisotropy (MD/TD) | Hydrogen gas barrier properties (cm³·cm/cm²·sec·cmHg) |
|---|---|---|---|---|---|---|---|---|---|
| Example 38 | A-12 | 175 | 135 | 11 | 187 | 30 | 4.1 | 1.1 | 1.7 |
| Example 39 | A-13 | 170 | 135 | 11 | 180 | 27 | 4.4 | 1.0 | 1.5 |
| Example 40 | A-14 | 173 | 140 | 12 | 185 | 19 | 2.0 | 1.1 | 2.4 |
| Example 41 | A-15 | 190 | 162 | 15 | 200 | 34 | 4.8 | 1.1 | 1.5 |
| Example 42 | A-16 | 220 | 191 | 20 | 235 | 39 | 5.8 | 1.3 | 1.3 |
| Example 43 | A-17 | 205 | 173 | 14 | 215 | 16 | 3.0 | 1.5 | 1.4 |
| Example 44 | A-18 | 181 | 147 | 12 | 190 | 27 | 3.9 | 1.1 | 1.3 |
| Example 45 | A-19 | 177 | 138 | 12 | 188 | 33 | 5.0 | 1.2 | 1.6 |
| Comparative Example 1 | B-1 | 264 | 232 | 8 | 262 | 8 | 1.2 | 4.5 | 4.8 |
| Comparative Example 16 | B-3 | 231 | 201 | 11 | 240 | 11 | 1.5 | 3.3 | 3.9 |

As is apparent from Table 5 and Table 6, the hyperbranched-polyester of the present invention shows excellent liquid crystallinity because of the specific hyperbranched-structure. The hyperbranched-polyester is excellent in viscosity response under shear and therefore enables low-pressure high-speed molding and is less likely to cause mold flash. Since it is easy to be oriented by shear, high elastic modulus is achieved even by press molding and the resultant molding is highly packed and is therefore excellent in gas barrier property. Regardless of liquid crystallinity, the resultant molding has small anisotropy.

Examples 46 to 67, Comparative Examples 17 to 29

Using a twin screw extruder, Model TEM35B, manufactured by TOSHIBA MACHINE CO., LTD., thermoplastic resins (C-1 to C-10) and hyperbranched-polyesters (A-12 to A-19) obtained in Examples 38 to 45 or polyesters (B-1, B-3) obtained in Comparative Examples 1 and 16 were dry-blended in a mixing ratio shown in Table 7 or Table 8 and the resultant blend was charged from a hopper. Separately, inorganic fillers (GF: D-1 ECS03T747H (diameter: 10.5 μm) manufactured by Nippon Electric Glass Co., Ltd., D-2 CS3J948 (diameter: 10 μm) manufactured by Nitto Boseki Co., Ltd., D-3 T-289 (diameter: 13 μm) manufactured by Nippon Electric Glass Co., Ltd., D-4 T-249 (diameter: 13 μm) manufactured by Nippon Electric Glass Co., Ltd.) were charged from side feeder in a mixing ratio shown in Table 7 or Table 8 and then melt-kneaded at melting point +10° C. (C-7: 280° C., C-8: 260° C., C-9: 220° C., C-10: 300° C.) of the thermoplastic resin to obtain pellets of a thermoplastic resin composition.

The resultant pellets were hot-air dried and then subjected to the above evaluations (4) to (6).

TABLE 7

|  | Thermoplastic resin (Parts by weight) | Hyperbranched-polyester (Parts by weight) | GF (Parts by weight) | Thin-wall flowability (mm) | Storage elastic modulus (GPa) | Gas barrier properties ($cm^3 \cdot cm/cm^2 \cdot sec \cdot cmHg$) |
|---|---|---|---|---|---|---|
| Example 46 | C-1(100) | A-12(1) | D-1(50) | 105 | 9.2 | 2.1 |
| Example 47 | C-1(100) | A-12(3) | D-1(50) | 111 | 9.4 | 1.8 |
| Example 48 | C-1(100) | A-13(1) | D-1(50) | 107 | 8.9 | 1.9 |
| Example 49 | C-1(100) | A-14(1) | D-1(50) | 88 | 8.8 | 2.6 |
| Example 50 | C-1(100) | A-15(1) | D-1(50) | 112 | 9.7 | 2.0 |
| Example 51 | C-1(100) | A-16(1) | D-1(50) | 122 | 10.3 | 1.7 |
| Example 52 | C-1(100) | A-17(1) | D-1(50) | 80 | 8.8 | 2.3 |
| Example 53 | C-1(100) | A-18(1) | D-1(50) | 103 | 9.0 | 2.1 |
| Example 54 | C-1(100) | A-19(1) | D-1(50) | 113 | 9.6 | 1.9 |
| Example 55 | C-1(100) | A-19(10) | D-1(50) | 120 | 9.5 | 2.0 |
| Example 56 | C-1(100) | A-19(35) | D-1(50) | 141 | 12.0 | 1.8 |
| Example 57 | C-1(100) | A-19(70) | D-4(50) | 150< | 14.5 | 1.8 |
| Example 58 | C-1(100) | A-19(1) | — | 74 | 3.6 | 3.3 |
| Example 59 | C-2(100) | A-19(1) | D-3(50) | 93 | 9.0 | 2.6 |
| Example 60 | C-3(100) | A-19(1) | D-2(50) | 52 | 8.8 | 2.3 |
| Example 61 | C-4(100) | A-19(1) | — | 18 | 3.5 | 2.2 |
| Example 62 | C-5(100) | A-19(1) | D-1(50) | 38 | 9.7 | 4.1 |
| Example 63 | C-6(100) | A-19(1) | D-2(50) | 44 | 6.5 | 2.5 |
| Example 64 | C-7(100) | A-19(1) | — | 55 | 2.4 | 3.5 |
| Example 65 | C-8(100) | A-19(1) | — | 29 | 3.8 | 5.5 |
| Example 66 | C-9(100) | A-19(1) | — | 59 | 2.9 | 4.6 |
| Example 67 | C-10(100) | A-19(1) | — | 88 | 3.5 | 3.0 |

TABLE 8

|  | Thermoplastic resin (Parts by weight) | Hyperbranched-polyester (Parts by weight) | GF (Parts by weight) | Thin-wall flowability (mm) | Storage elastic modulus (GPa) | Gas barrier properties ($cm^3 \cdot cm/cm^2 \cdot sec \cdot cmHg$) |
|---|---|---|---|---|---|---|
| Comparative Example 17 | C-1(100) | — | — | 55 | 3.2 | 4.8 |
| Comparative Example 18 | C-1(100) | — | D-1(50) | 41 | 8.6 | 2.7 |
| Comparative Example 19 | C-2(100) | — | D-3(50) | 47 | 8.5 | 3.3 |
| Comparative Example 20 | C-3(100) | — | D-2(50) | 38 | 8.5 | 2.6 |
| Comparative Example 21 | C-4(100) | — | — | 11 | 3.0 | 4.5 |
| Comparative Example 22 | C-5(100) | — | D-1(50) | 23 | 9.8 | 6.4 |
| Comparative Example 23 | C-6(100) | — | D-2(50) | 34 | 6.3 | 2.6 |
| Comparative Example 24 | C-7(100) | — | — | 36 | 2.2 | 5.8 |
| Comparative Example 25 | C-8(100) | — | — | 19 | 3.6 | 6.5 |

TABLE 8-continued

| | Thermoplastic resin (Parts by weight) | Hyperbranched-polyester (Parts by weight) | GF (Parts by weight) | Thin-wall flowability (mm) | Storage elastic modulus (GPa) | Gas barrier properties (cm³ · cm/cm² · sec · cmHg) |
|---|---|---|---|---|---|---|
| Comparative Example 26 | C-9(100) | — | — | 50 | 2.4 | 5.1 |
| Comparative Example 27 | C-10(100) | — | — | 37 | 2.5 | 5.2 |
| Comparative Example 28 | C-1(100) | B-1(1) | D-1(50) | 45 | 8.6 | 2.8 |
| Comparative Example 29 | C-1(100) | B-3(1) | D-1(50) | 52 | 8.8 | 2.5 |

As is apparent from Table 7 and Table 8, since a thermoplastic resin composition blended with the hyperbranched-polyester of the present invention is excellent in thin-wall flowability and can be formed under low pressure, mold flash is less likely to occur. It is apparent that stiffness and gas barrier property are improved when compared with those blended with a polyester containing less branching.

Example 68

In a reaction vessel equipped with a stirring blade and a distillation tube, 48.0 g (0.35 mol) of p-hydroxybenzoic acid, 30.9 g (0.17 mol) of 4,4'-dihydroxybiphenyl, 5.41 g (0.033 mol) of terephthalic acid, 10.4 g (0.054 mol) of PET having an inherent viscosity of about 0.6 dl, 42.0 g (0.20 mol) of trimesic acid, and 76.3 g (1.1 equivalents based on the total phenolic hydroxyl groups) of acetic anhydride were charged and then reacted at 145° C. for 1.5 hours while stirring under a nitrogen gas atmosphere. After heating to 280° C., a deacetylation polycondensation reaction was performed, followed by stirring for 4 hours. When 76% of a theoretical distillation amount of acetic acid was distilled off, heating and stirring were terminated and contents were ejected in cold water to obtain a hyperbranched-polyester resin (A-20). In the same manner as in Example 1, the resultant hyperbranched-polyester was evaluated. The results are shown in Table 9 and Table 10.

Example 69

In a reaction vessel equipped with a stirring blade and a distillation tube, 48.0 g (0.35 mol) of p-hydroxybenzoic acid, 30.9 g (0.17 mol) of 4,4'-dihydroxybiphenyl, 5.41 g (0.033 mol) of terephthalic acid, 10.4 g (0.054 mol) of PET having an inherent viscosity of about 0.6 dl/g, 42.0 g (0.20 mol) of trimesic acid and 76.3 g (1.1 equivalents based in the total phenolic hydroxyl groups) of acetic anhydride were charged and then reacted at 145° C. for 1.5 hours while stirring under a nitrogen gas atmosphere. After heating to 250° C., a deacetylation condensation reaction was carried out. After the reactor inner temperature reached 250° C., 14.7 g (0.12 mol) of benzoic acid was added, followed by heating to 280° C. When 100% of a theoretical distillation amount of acetic acid was distilled off, heating and stirring were terminated and contents were ejected in cold water to obtain a hyperbranched-polyester resin (A-21). In the same manner as in Example 1, the resultant hyperbranched-polyester was evaluated. The results are shown in Table 9 and Table 10.

Example 70

In a 500 mL reaction vessel equipped with a stirring blade and a distillation tube, 58.01 g (0.42 mol) of p-hydroxybenzoic acid, 42.08 g (0.226 mol) of 4,4'-dihydroxybiphenyl, 5.95 g (0.054 mol) of hydroquinone, 19.44 g (0.117 mol) of terephthalic acid, 10.47 g (0.063 mol) of isophthalic acid and 83.61 g (1.05 equivalents based on the total phenolic hydroxyl groups) of acetic anhydride were charged and then reacted at 145° C. for 2 hours while stirring under a nitrogen gas atmosphere. After adding 31.52 g (0.15 mol) of trimesic acid and heating to 260° C., stirring was carried out for 3 hours. When 91% of a theoretical distillation amount of acetic acid was distilled off, heating and stirring were terminated and contents were ejected in cold water to obtain a hyperbranched-polyester resin (A-22). In the same manner as in Example 1, the resultant hyperbranched-polyester was evaluated. The results are shown in Table 9 and Table 10.

Example 71

In a 500 mL reaction vessel equipped with a stirring blade and a distillation tube, 58.01 g (0.42 mol) of p-hydroxybenzoic acid, 42.08 g (0.226 mol) of 4,4'-dihydroxybiphenyl, 5.95 g (0.054 mol) of hydroquinone, 19.44 g (0.117 mol) of terephthalic acid, isophthalic acid (0.063 mol) and 75.65 g (0.95 equivalents based on the total phenolic hydroxyl groups) of acetic anhydride were charged and then reacted at 145° C. for 2 hours while stirring under a nitrogen gas atmosphere. After adding 31.52 g (0.15 mol) of trimesic acid and heating to 260° C., stirring was carried out for 3 hours. When 91% of a theoretical distillation amount of acetic acid was distilled off, heating and stirring were terminated and contents were ejected in cold water to obtain a hyperbranched-polyester resin (A-23). In the same manner as in Example 1, the resultant hyperbranched-polyester was evaluated. The results are shown in Table 7.

In the same manner as in Example 1, the resultant hyperbranched-polyester was evaluated. The results are shown in Table 9 and Table 10.

Example 72

In a 500 mL reaction vessel equipped with a stirring blade and a distillation tube, 58.01 g (0.42 mol) of p-hydroxybenzoic acid, 23.46 g (0.126 mol) of 4,4'-dihydroxybiphenyl, 5.95 g (0.054 mol) of hydroquinone, 19.44 g (0.117 mol) of terephthalic acid, 10.47 g (0.063 mol) of isophthalic acid and 79.63 g (1.00 equivalents based on the total phenolic hydroxyl groups) of acetic anhydride were charged and then reacted at 145° C. for 2 hours while stirring under a nitrogen gas atmosphere. After adding 23.12 g (0.15 mol) of α-resorcylic acid and heating to 260° C., stirring was carried out for 3 hours. When 91% of a theoretical distillation amount of acetic acid was distilled off, heating and stirring were terminated and contents were ejected in cold water to obtain a hyperbranched-polyester resin (A-24). In the same manner as in Example 1, the resultant hyperbranched-polyester was evaluated. The results are shown in Table 9 and Table 10.

Comparative Example 30

After the atmosphere in a reaction vessel equipped with a stirring blade and a condenser was replaced by nitrogen, 5 parts of trimethylolpropane, 50 parts of 2,2'-bis(hydroxymethyl)heptanoic acid, 7 parts of stearic acid and 0.2 parts of p-toluenesulfonic acid were charged and then reacted for 2 hours while stirring under a nitrogen gas flow at 140° C. The reaction was carried out at 140° C. under 67 Pa for one hour to obtain a hyperbranched-resin (B-4). The measurement results of the molecular weight of B-4 are shown in Table 9 and Table 10.

in each proportion shown in Table 11 and Table 12 and then the resultant blend was supplied from a main feeder. After setting a cylinder setting temperature to 250° C. and setting the number of screw rotations to 200 rpm, melt-kneading was carried out and a gut ejected from a mold was immediately cooled in a water bath and then palletized by a strand cutter. The resultant pellets were dried under reduced pressure at 80° C. for 12 hours, and specimens were prepared by injection molding (SG75H-MIV, manufactured by Sumitomo Heavy Industries, Ltd., cylinder temperature: 250° C., mold temperature: 80° C.) and then subjected to the following evaluations (7) to (11).

(7) Fluidity

After setting an injection pressure to 30 MPa, using a mold for bar flow length test, measuring 200 mm in length ×10 mm

TABLE 9

| | Hyperbranched-polyester | Branching point B Content (Mol %) | p | q | r | p + q + r | Ratio of terminal carboxylic acid/acecetyl group | Extent of branching 3 | Molecular weight |
|---|---|---|---|---|---|---|---|---|---|
| Example 68 | A-20 | 25 | 2.00 | 0.50 | 0.50 | 3 | 75/25 | 0.65 | 2100 |
| Example 69 | A-21 | 25 | 2.00 | 0.50 | 0.50 | 3 | 75/25 *1 | 0.65 | 2500 |
| Example 70 | A-22 | 20 | 2.14 | 1.40 | 0.46 | 4 | 50/50 | 0.67 | 3600 |
| Example 71 | A-23 | 20 | 2.14 | 0.93 | 0.93 | 4 | 40/60 *2 | 0.68 | 2900 |
| Example 72 | A-24 | 20 | 2.14 | 0.93 | 0.93 | 4 | 42/58 | 0.67 | 2000 |
| Comparative Example 30 | B-4 | 10 | 2.00 | 0.50 | 0.50 | 3 | — | — | 1900 |

*1: Blocking with benzoic acid
*2: Hydroxyl group

TABLE 10

| | Hyperbranched-polyester | Melting point (° C.) | Liquid crystallization initiation temperature (° C.) | Melt viscosity Viscosity (Pa · s) | Melt viscosity Temperature (° C.) | Response under shear | Storage elastic modulus (GPa) | Anisotropy (MD/TD) | Hydrogen gas barrier properties (cm$^3$ · cm/cm$^2$ · sec · cmHg) |
|---|---|---|---|---|---|---|---|---|---|
| Example 68 | A-20 | 180 | 159 | 11 | 190 | 28 | 5.8 | 1.0 | 1.6 |
| Example 69 | A-21 | 182 | 163 | 13 | 192 | 30 | 5.9 | 1.0 | 1.6 |
| Example 70 | A-22 | 192 | 167 | 20 | 202 | 27 | 5.6 | 1.1 | 1.7 |
| Example 71 | A-23 | 188 | 157 | 16 | 198 | 26 | 5.7 | 1.0 | 1.8 |
| Example 72 | A-24 | 176 | 152 | 12 | 186 | 21 | 5.4 | 1.1 | 1.9 |
| Comparative Example 30 | B-4 | — | — | — | — | 6 | 0.6 | 1.8 | 5.8 |

Reference Examples

B-5: Hyperbranched-polymer (BOLTORN H30) having a molecular weight of 3,500 manufactured by Perstorp Co.
C-11: Nylon 6 resin having a melting point of 225° C. and a relative viscosity at 98% sulfuric acid (1 g/dl) of 3.40 (CM1021, manufactured by TORAY INDUSTRIES, INC.)

The following impact modifiers were used.
E-1: Acid anhydride grafted ethylene-1-butene copolymer ("TAFMER" MH7020, manufactured by Mitsui Chemicals, Inc.)
E-2: Ethylene-methyl acrylate-glycidyl methacrylate copolymer ("BONDFAST" 7L, manufactured by Sumitomo Chemical Co., Ltd.).

Examples 73 to 88, Comparative Examples 31 to 38

Using a twin screw extruder, Model TEX30, manufactured by Japan Steel Works, LTD., components were dry-blended in width×1 mm in thickness, a bar flow length at a dwell pressure of 0 was measured. The larger the flow length, the more fluidity is better.

(8) Melt viscosity

Melt viscosity was measured at a shear rate of 100/s and a measuring temperature of 250° C. by Capirograph (manufactured by Toyo Seiki Seisaku-Sho, Ltd.) using a capillary measuring L of 10 mm×D of 1 mm.

(9) Tensile Strength, Tensile Elongation at Break

In accordance with ASTM D-638, a tensile Strength and a tensile elongation at break were determined by subjecting ASTM No. 1 dumbbell specimens to a tensile test at a distance between the gauges of the sample of 114 mm and a strain rate of 10 mm/min. in a thermostatic chamber at room temperature of 23° C. and humidity of 50% using a testing machine Tensilon UTA2.5T (manufactured by BALDWIN, Ltd.).

(10) Impact Resistance

In accordance with ASTM D256, an Izod impact strength of 3 mm thick notched specimens was measured in a thermostatic chamber at room temperature of 23° C. and humidity of 50%.

(11) Low Temperature Impact Resistance

In the same manner as in the method (10), except that the temperature was adjusted to −10° C., Izod impact strength was measured.

The evaluation results are shown in Table 11 and Table 12. As is apparent from a comparison between Comparative Example 31 and Comparative Examples 32 to 34, when the hyperbranched-polyester of the present invention resin is not contained, tensile characteristics and impact resistance of a nylon 6 resin are remarkably improved by blending an impact modifier, but fluidity drastically deteriorates. In contrast, as shown in Examples 73 to 88, when the hyperbranched-polyester of the present invention resin is contained fluidity of the nylon 6 resin is remarkably improved while maintaining excellent tensile characteristics and impact resistance obtained by blending of the impact modifier. In both cases of Comparative Example 35 using a linear liquid crystal resin and Comparative Example 36 using a hyperbranched-polyester resin which does not satisfy requirements of the present invention, the fluidity improving effect was not exerted. In case of Comparative Examples 37 and 38 in which a hyperbranched-resin having a structure which is different from that of the present invention, the fluidity improving effect was exerted, but physical properties deteriorated. In contrast, the resin compositions of Examples have a good balance between excellent tensile characteristics, impact resistance and fluidity.

TABLE 11

| | | | Examples | | | | | | | | | | | | | | | |
|---|---|---|---|---|---|---|---|---|---|---|---|---|---|---|---|---|---|---|
| | | | 73 | 74 | 75 | 76 | 77 | 78 | 79 | 80 | 81 | 82 | 83 | 84 | 85 | 86 | 87 | 88 |
| Thermoplastic resin | C-1 | Parts by weight | 100 | 100 | 100 | 100 | 100 | — | 100 | 100 | 100 | 100 | 100 | 100 | 100 | 100 | 100 | 100 |
| | C-11 | Parts by weight | — | — | — | — | — | 100 | — | — | — | — | — | — | — | — | — | — |
| Impact modifier | E-1 | Parts by weight | 30 | 30 | 30 | — | 45 | 20 | 30 | 30 | 30 | 30 | 30 | 30 | 30 | 30 | 30 | 30 |
| | E-2 | Parts by weight | — | — | — | 45 | — | — | — | — | — | — | — | — | — | — | — | — |
| Hyperbranched-polyester resin | A-20 | Parts by weight | 0.3 | 3 | 5 | 5 | 12 | 12 | — | — | — | — | — | — | — | — | — | — |
| | A-21 | Parts by weight | — | — | — | — | — | — | 5 | — | — | — | — | — | — | — | — | — |
| | A-1 | Parts by weight | — | — | — | — | — | — | — | 5 | — | — | — | — | — | — | — | — |
| | A-2 | Parts by weight | — | — | — | — | — | — | — | — | 5 | — | — | — | — | — | — | — |
| | A-22 | Parts by weight | — | — | — | — | — | — | — | — | — | 5 | — | — | — | — | — | — |
| | A-23 | Parts by weight | — | — | — | — | — | — | — | — | — | — | 5 | — | — | — | — | — |
| | A-5 | Parts by weight | — | — | — | — | — | — | — | — | — | — | — | 5 | — | — | — | — |
| | A-6 | Parts by weight | — | — | — | — | — | — | — | — | — | — | — | — | 5 | — | — | — |
| | A-7 | Parts by weight | — | — | — | — | — | — | — | — | — | — | — | — | — | 5 | — | — |
| | A-8 | Parts by weight | — | — | — | — | — | — | — | — | — | — | — | — | — | — | 5 | — |
| | A-24 | Parts by weight | — | — | — | — | — | — | — | — | — | — | — | — | — | — | — | 5 |
| Flow length | mm | | 75 | 110 | 125 | 105 | 135 | 90 | 135 | 120 | 110 | 108 | 95 | 90 | 95 | 92 | 80 | 85 |
| Melt viscosity | Pa·s | | 430 | 370 | 380 | 380 | 330 | 390 | 325 | 370 | 370 | 365 | 400 | 410 | 405 | 400 | 430 | 425 |
| Tensile strength | MPa | | 45 | 47 | 48 | 50 | 38 | 60 | 48 | 47 | 46 | 44 | 45 | 44 | 43 | 44 | 44 | 45 |
| Tensile elongation at break | % | | 180 | 192 | 185 | 210 | 205 | 190 | 180 | 172 | 175 | 170 | 180 | 170 | 175 | 185 | 175 | 170 |
| Impact resistance | J/m | | 950 | 940 | 960 | 1100 | 1200 | 750 | 970 | 958 | 900 | 910 | 990 | 960 | 930 | 960 | 975 | 940 |
| Low temperature impact resistance | J/m | | 720 | 750 | 730 | 275 | 680 | 300 | 725 | 700 | 730 | 710 | 710 | 740 | 750 | 725 | 750 | 720 |

TABLE 12

| | | | Comparative Examples | | | | | | | |
|---|---|---|---|---|---|---|---|---|---|---|
| | | | 31 | 32 | 33 | 34 | 35 | 36 | 37 | 38 |
| Thermoplastic resin | C-1 | Parts by weight | 100 | 100 | 100 | 100 | 100 | — | 100 | 100 |
| | C-11 | Parts by weight | — | — | — | — | — | — | — | — |
| Impact modifier | E-1 | Parts by weight | — | 30 | 45 | — | 30 | 30 | 30 | 30 |
| | E-2 | Parts by weight | — | — | — | 45 | — | — | — | — |
| Additives | B-1 | Parts by weight | — | — | — | — | 5 | — | — | — |
| | B-2 | Parts by weight | — | — | — | — | — | 5 | — | — |
| | B-3 | Parts by weight | — | — | — | — | — | — | 5 | — |
| | B-4 | Parts by weight | — | — | — | — | — | — | — | 5 |

TABLE 12-continued

|  |  | Comparative Examples | | | | | | | |
|---|---|---|---|---|---|---|---|---|---|
|  |  | 31 | 32 | 33 | 34 | 35 | 36 | 37 | 38 |
| Flow length | mm | 130 | 50 | 35 | 40 | 48 | 52 | 85 | 80 |
| Melt viscosity | Pa · s | 250 | 650 | 850 | 780 | 680 | 650 | 450 | 435 |
| Tensile strength | MPa | 78 | 45 | 36 | 49 | 47 | 49 | 42 | 42 |
| Tensile elongation at break | % | 155 | 175 | 185 | 168 | 170 | 182 | 70 | 45 |
| Impact resistance | J/m | 45 | 930 | 1250 | 1150 | 910 | 890 | 620 | 550 |
| Low temperature impact resistance | J/m | 30 | 715 | 770 | 280 | 720 | 695 | 400 | 350 |

Examples 89 to 93, Comparative Examples 39 to 43

Using a twin screw extruder, Model TEX30, manufactured by Japan Steel Works, LTD., components were dry-blended in each proportion shown in Table 13 and then the resultant blend was supplied from a main feeder. After setting a cylinder setting temperature to 250° C. and setting the number of screw rotations to 200 rpm, melt-kneading was carried out and a gut ejected from a mold was immediately cooled in a water bath and then palletized by a strand cutter. The resultant pellets were dried under reduced pressure at 110° C. for 12 hours, and specimens were prepared by injection molding (SG75H-MIV, manufactured by Sumitomo Heavy Industries, Ltd., cylinder temperature: 250° C., mold temperature: 80° C.) and then subjected to the following evaluations (7) to (11). The evaluation results are shown in Table 13. When compared with the resin compositions containing no hyperbranched-polyester resin of Comparative Examples 39 to 41 and the resin compositions blended with a hyperbranched-resin having a structure which is different from that of the present invention of Comparative Examples 42 and 43, the resin compositions containing the hyperbranched-polyester of the present invention resin of Examples 89 to 93 have good balance between excellent tensile characteristics, impact resistance and fluidity.

Reference Examples

F-1: Organically-modified layered silicate treated with an ammonium salt ("S-BEN" NTO, manufactured by HOJUN CO., LTD.)
After weighing 2 g of an organically-modified layered silicate (F-1), the organically-modified layered silicate was placed in a crucible and then fired in an electric furnace, Model TMF-5, manufactured by Irie Corporation set at 600° C. for 2 hours firing. The weight of the residue was 1.32 g. The inorganic ash content was calculated and found to be 66%.

F-2: Organically-modified layered silicate treated with an ammonium salt ("cloisite" 30B, manufactured by Southern Clay Products, Inc.)
After weighing 2 g of an organically-modified layered silicate (F-2), the organically-modified layered silicate was placed in a crucible and then fired in an electric furnace, Model TMF-5, manufactured by Irie Corporation set at 600° C. for 2 hours firing. The weight of the residue was 1.36 g. The inorganic ash content was calculated and found to be 68%.

F-3: Talc (LMS-300, manufactured by FUJI TALC INDUSTRIAL CO., LTD.)

F-4: Mica (A-21, manufactured by YAMAGUCHI MICA CO., LTD.)

F-5: Kaolin (Translink 445, manufactured by Engelhard Corporation).

TABLE 13

|  |  |  | Examples | | | | | Comparative Examples | | | | |
|---|---|---|---|---|---|---|---|---|---|---|---|---|
|  |  |  | 89 | 90 | 91 | 92 | 93 | 39 | 40 | 41 | 42 | 43 |
| Thermoplastic resin | C-3 | Parts by weight | 100 | 100 | 100 | 100 | 100 | 100 | 100 | 100 | 100 | 100 |
| Impact modifier | E-1 | Parts by weight | 30 | 30 | — | — | — | — | 30 | — | — | — |
|  | E-2 | Parts by weight | — | — | 30 | 30 | 45 | — | — | 30 | 30 | 30 |
| Hyperbranched-polyester resin | A-21 | Parts by weight | 5 | — | 5 | — | — | — | — | — | — | — |
|  | A-21 | Parts by weight | — | 5 | — | 5 | 5 | — | — | — | — | — |
| Additives | B-4 | Parts by weight | — | — | — | — | — | — | — | — | 5 | — |
|  | B-6 | Parts by weight | — | — | — | — | — | — | — | — | — | 5 |
| Flow length | mm |  | 115 | 135 | 105 | 120 | 85 | 135 | 80 | 60 | 85 | 95 |
| Tensile strength | MPa |  | 52 | 52 | 45 | 45 | 45 | 55 | 50 | 45 | 42 | 39 |
| Tensile elongation at break | % |  | 45 | 40 | 100 | 100 | 100 | 20 | 45 | 100 | 35 | 30 |
| Impact resistance | J/m |  | 145 | 140 | 350 | 350 | 350 | 40 | 150 | 350 | 120 | 150 |
| Low temperature impact resistance | J/m |  | 95 | 90 | 150 | 150 | 150 | 20 | 95 | 150 | 70 | 95 |

Examples 94 to 105, Comparatives Example 44 to 51

Using a twin screw extruder, Model TEX30, manufactured by: Japan Steel Works, LTD., components were dry-blended in each proportion shown in Table 14 and Table 15 and then the resultant blend was supplied from a main feeder. After setting a cylinder setting temperature to 250° C. and setting the number of screw rotations to 200 rpm, melt-kneading was carried out and a gut ejected from a mold was immediately cooled in a water bath and then palletized by a strand cutter. The resultant pellets were dried under reduced pressure at 80° C. for 12 hours, and specimens were prepared by injection molding (SG75H-MIV, manufactured by Sumitomo Heavy Industries, Ltd., cylinder temperature: 250° C., mold temperature: 80° C.) and then subjected to the above evaluations (7) to (9) and the following evaluations (15) to (16). The evaluation-results are shown in Table 14 and Table 15.

(15) Flexural Modulus

In accordance with ASTM D-790, a bending test was carried out, at a distance between the gauges of the sample of 100 mm and a strain rate of 3 mm/min. by a testing machine Tensilon RTA-1T (manufactured by ORIENTEC Co., LTD) in a thermostatic chamber at room temperature of 23° C. and humidity of 50% using bar-shaped specimens measuring 12.8 mm in width×128 mm in length×6.4 mm in thickness.

(16) Dimensional Stability

After setting an injection pressure to 20 MPa, plate-shaped specimens measuring 80 mm in length×80 mm in width ×3 mm in thickness were formed. Using a thermohygrostat (TE34, manufactured by ESPEC CORP.) at a temperature of 60° C. and humidity of 95%, a water absorption treatment was carried out for 24 hours. A size change rate of a length and a width of specimens before and after the water absorption treatment was measured by a caliper. As the numerical value becomes smaller, the dimensional change is smaller and dimensional stability is better.

Method for Calculation of Size Change Rate (Size after treatment (mm)−Size before treatment (mm))−Size before treatment (mm)×100=Size change rate (%)

As is apparent from a comparison between Comparative Examples 44 to 47, bending characteristics and dimensional stability are remarkably improved by blending a nylon 6 resin with an organically-modified layered silicate, but fluidity drastically deteriorates. In contrast, in the resin compositions of Example 94 to 105, fluidity is remarkably improved while maintaining excellent tensile characteristics and impact resistance obtained by blending of the organically-modified layered silicate. In both cases of Comparative Example 48 using a linear liquid crystal resin and Comparative Example 49 using a hyperbranched-polyester resin which does not satisfy requirements of the present invention, the fluidity improving effect was not exerted. In case of Comparative Examples 50 and 51 blended with a hyperbranched-resin having a structure which is different from that of the present invention, the fluidity improving effect was exerted, but physical properties deteriorated. In contrast, the resin compositions of Examples have good balance between excellent stiffness, dimensional stability and fluidity.

TABLE 14

| | | | Examples | | | | | | | | | | | |
|---|---|---|---|---|---|---|---|---|---|---|---|---|---|---|
| | | | 94 | 95 | 96 | 97 | 98 | 99 | 100 | 101 | 102 | 103 | 104 | 105 |
| Thermoplastic resin | C1 | Parts by weight | 100 | 100 | 100 | 100 | 100 | — | 100 | 100 | 100 | 100 | 100 | 100 |
| | C-11 | Parts by weight | — | — | — | — | — | 100 | — | — | — | — | — | — |
| Inorganic filler | F-1 | Parts by weight | 5 | 5 | 5 | — | 7.5 | 3 | 5 | 5 | 5 | 5 | 5 | 5 |
| | F-2 | Parts by weight | — | — | — | 7.5 | — | — | — | — | — | — | — | — |
| | Inorganic ash content | Parts by weight | 3.3 | 3.3 | 3.3 | 5.1 | 5 | 2 | 3.3 | 3.3 | 3.3 | 3.3 | 3.3 | 3.3 |
| Hyperbranched-polyester resin | A-20 | Parts by weight | 0.3 | 3 | 5 | 5 | 12 | 12 | — | — | — | — | — | — |
| | A-21 | Parts by weight | — | — | — | — | — | — | 5 | — | — | — | — | — |
| | A-1 | Parts by weight | — | — | — | — | — | — | — | 5 | — | — | — | — |
| | A-2 | Parts by weight | — | — | — | — | — | — | — | — | 5 | — | — | — |
| | A-5 | Parts by weight | — | — | — | — | — | — | — | — | — | 5 | — | — |
| | A-8 | Parts by weight | — | — | — | — | — | — | — | — | — | — | 5 | — |
| | A-24 | Parts by weight | — | — | — | — | — | — | — | — | — | — | — | 5 |
| Flow length | | mm | 120 | 135 | 150 | 145 | 175 | 135 | 165 | 150 | 135 | 140 | 120 | 125 |
| Melt viscosity | | Pa·s | 310 | 290 | 280 | 285 | 220 | 300 | 275 | 280 | 305 | 290 | 310 | 320 |
| Tensile strength | | MPa | 88 | 91 | 84 | 95 | 96 | 96 | 85 | 83 | 84 | 85 | 84 | 85 |
| Flexural Modulus | | GPa | 3.6 | 4.1 | 3.8 | 3.8 | 4.1 | 4.0 | 3.6 | 3.5 | 3.7 | 3.6 | 3.3 | 3.6 |
| Dimensional stability | | % | 0.5 | 0.2 | 0.4 | 0.3 | 0.3 | 0.4 | 0.3 | 0.3 | 0.3 | 0.3 | 0.4 | 0.3 |

TABLE 15

|  |  |  | Comparative Examples | | | | | | | |
|---|---|---|---|---|---|---|---|---|---|---|
|  |  |  | 44 | 45 | 46 | 47 | 48 | 49 | 50 | 51 |
| Thermoplastic resin | C-1 | Parts by weight | 100 | 100 | 100 | 100 | 100 | — | 100 | 100 |
|  | C-11 | Parts by weight | — | — | — | — | — | — | — | — |
| Inorganic filler | F-1 | Parts by weight | — | 5 | 7.5 | — | 5 | 5 | 5 | 5 |
|  | F-2 | Parts by weight | — | — | — | 7.5 | — | — | — | — |
|  | Inorganic ash content | Parts by weight | — | 3.3 | 5.0 | 5.1 | 3.3 | 3.3 | 3.3 | 3.3 |
| Additives | B-1 | Parts by weight | — | — | — | — | 5 | — | — | — |
|  | B-2 | Parts by weight | — | — | — | — | — | 5 | — | — |
|  | B-4 | Parts by weight | — | — | — | — | — | — | 5 | — |
|  | B-5 | Parts by weight | — | — | — | — | — | — | — | 5 |
| Flow length | | mm | 130 | 100 | 80 | 85 | 95 | 90 | 115 | 110 |
| Melt viscosity | | Pa·s | 250 | 330 | 380 | 390 | 340 | 360 | 280 | 285 |
| Tensile strength | | MPa | 73 | 85 | 88 | 84 | 83 | 81 | 75 | 73 |
| Flexural Modulus | | GPa | 2.3 | 3.3 | 3.6 | 3.3 | 3.1 | 3.1 | 2.5 | 2.3 |
| Dimensional stability | | % | 1.0 | 0.6 | 0.5 | 0.5 | 0.4 | 0.6 | 0.8 | 0.8 |

Examples 106 to 112, Comparative Examples 52 to 54

Using a twin screw extruder, Model TEX30, manufactured by Japan Steel Works, LTD., components were dry-blended in each proportion shown in Table 16 and then the resultant blend was supplied from a main feeder. After setting a cylinder setting temperature to 250° C. and setting the number of screw rotations to 200 rpm, melt-kneading was carried out and a gut ejected from a mold was immediately cooled in a water bath and then palletized by a strand cutter. The resultant pellets were dried under reduced pressure at 80° C. for 12 hours, and specimens were prepared by injection molding (SG75H-MIV, manufactured by Sumitomo Heavy Industries, Ltd., cylinder temperature: 250° C., mold temperature: 80° C.) and then subjected to the above evaluations (7) to (9) and (15) to (16). The evaluation results are shown in Table 16. In case of Examples 106 to 109 in which the hyperbranched-polyester of the present invention resin is blended, the resin compositions have excellent bending characteristics, dimensional stability and fluidity. In Examples 110 to 112 and Comparative Examples 52 to 54, an impact modifier is further blended. The resin compositions containing no hyperbranched-polyester of the present invention resin of Comparative Examples cause drastic deterioration of fluidity, whereas, the resin compositions containing the hyperbranched-polyester of the present invention resin of Examples have good balance between stiffness, dimensional stability, fluidity and impact resistance.

TABLE 16

|  |  |  |  |  | Examples | | | | | | | Comparative Examples | | |
|---|---|---|---|---|---|---|---|---|---|---|---|---|---|---|
|  |  |  |  |  | 106 | 107 | 108 | 109 | 110 | 111 | 112 | 52 | 53 | 54 |
| Main feeder | Thermoplastic resin | C-1 | | Parts by weight | 100 | 100 | 100 | 100 | 100 | 100 | 100 | 100 | 100 | 100 |
|  | Inorganic filler | F-1 | | Parts by weight | 5 | 5 | 5 | 7.5 | 5 | 5 | 5 | 5 | 5 | 5 |
|  |  | Inorganic ash content | | Parts by weight | 3.3 | 3.3 | 3.3 | 5 | 3.3 | 3.3 | 3.3 | 3.3 | 3.3 | 3.3 |
| Side feeder | Hyperbranched-polyester resin | A-20 | | Parts by weight | 0.3 | 3 | 5 | 5 | 5 | 5 | 5 | — | — | — |
|  | Impact modifier | E-1 | | Parts by weight | — | — | — | — | 10 | 20 | 20 | 10 | 20 | 20 |
|  | Inorganic filler | F-3 | | Parts by weight | — | — | — | — | — | — | 10 | — | — | 10 |
|  | Flow length | | | mm | 135 | 150 | 170 | 155 | 120 | 110 | 105 | 55 | 50 | 40 |
|  | Melt viscosity | | | Pa·s | 305 | 280 | 265 | 270 | 330 | 340 | 350 | 680 | 850 | 850 |
|  | Tensile strength | | | MPa | 86 | 90 | 96 | 88 | 57 | 55 | 60 | 56 | 52 | 57 |
|  | Flexural Modulus | | | GPa | 3.8 | 4.4 | 4.1 | 4.7 | 2.3 | 2.0 | 2.7 | 2.3 | 2.0 | 2.5 |
|  | Impact resistance | | | J/m | 47 | 44 | 44 | 42 | 530 | 810 | 800 | 530 | 810 | 800 |
|  | Dimensional stability | | | % | 0.5 | 0.4 | 0.4 | 0.3 | 0.8 | 0.8 | 0.5 | 1.3 | 1.2 | 0.5 |

Examples 113 to 117, Comparative Examples 55 to 59

Using a twin screw extruder, Model TEX30, manufactured by Japan Steel Works, LTD., components were dry-blended in each proportion shown in Table 17 and then the resultant blend was supplied from a main feeder. After setting a cylinder setting temperature to 250° C. and setting the number of screw rotations to 200 rpm, melt-kneading was carried out and a gut ejected from a mold was immediately cooled in a water bath and then palletized by a strand cutter. The resultant pellets were dried under reduced pressure at 110° C. for 12 hours, and specimens were prepared by injection molding (SG75H-MIV, manufactured by Sumitomo Heavy Industries, Ltd., cylinder temperature: 250° C., mold temperature: 80° C.) and then subjected to the above evaluations (7) to (9) and (15) to (16). The evaluation results are shown in Table 17.

When compared with the resin compositions containing no hyperbranched-resin of Comparative Examples 55 to 57 and the resin compositions blended with a hyperbranched-resin having a structure which is different from that of the present invention of Comparative Examples 58 and 59, the resin compositions of Examples 113 to 117 have good, balance between excellent bending characteristics, dimensional stability and fluidity.

hours and the pellets obtained in Examples 121 to 122 and Comparative Examples 63 to 64 were dried at 110° C. for 12 hours, and specimens were prepared by injection molding (SG75H-MIV, manufactured by Sumitomo Heavy Industries, Ltd., cylinder temperature: 250° C., mold temperature: 80°

TABLE 17

|  |  |  | Examples ||||| Comparative Examples |||||
|---|---|---|---|---|---|---|---|---|---|---|---|---|
|  |  |  | 113 | 114 | 115 | 116 | 117 | 55 | 56 | 57 | 58 | 59 |
| Thermoplastic resin | C-3 | Parts by weight | 100 | 100 | 100 | 100 | 100 | 100 | 100 | 100 | 100 | 100 |
| Inorganic filler | F-1 | Parts by weight | 5 | 5 | — | — | — | — | 5 | — | 5 | 5 |
|  | F-2 | Parts by weight | — | — | 5 | 5 | 7.5 | — | — | 5 | — | — |
|  | Inorganic ash content | Parts by weight | 3.3 | 3.3 | 3.4 | 3.4 | 5.1 | — | 3.3 | 3.4 | 3.3 | 3.3 |
| Hyperbranched-polyester resin | A-20 | Parts by weight | 5 | — | 5 | — | — | — | — | — | — | — |
|  | A-21 | Parts by weight | — | 5 | — | 5 | 5 | — | — | — | — | — |
| Additives | B-4 | Parts by weight | — | — | — | — | — | — | — | — | 5 | — |
|  | B-5 | Parts by weight | — | — | — | — | — | — | — | — | — | 5 |
| Flow length |  | mm | 130 | 145 | 130 | 140 | 115 | 135 | 100 | 95 | 95 | 95 |
| Tensile strength |  | MPa | 56 | 53 | 53 | 57 | 57 | 52 | 52 | 53 | 53 | 52 |
| Flexural Modulus |  | GPa | 2.9 | 3.0 | 2.8 | 2.8 | 2.9 | 2.4 | 2.8 | 2.8 | 2.3 | 2.2 |
| Dimensional stability |  | % | 0.2 | 0.2 | 0.2 | 0.2 | 0.2 | 0.2 | 0.2 | 0.2 | 0.2 | 0.2 |

Examples 118 to 122, Comparative Examples 60 to 64

Using a twin screw extruder, Model TEX30, manufactured by Japan Steel Works, LTD., components were dry-blended in each proportion shown in Table 18 and then the resultant blend was supplied from a main feeder. After setting a cylinder setting temperature to 250° C. and setting the number of screw rotations to 200 rpm, melt-kneading was carried out and a gut ejected from a mold was immediately cooled in a water bath and then palletized by a strand cutter. The pellets obtained in Examples 118 to 120 and Comparative Examples 60 to 62 were dried under reduced pressure at 80° C. for 12

C.). The evaluation results are shown in Table 18. When compared to Comparative Examples 60 to 64, the resin compositions of Examples 118 to 122 have good balance between excellent bending characteristics, dimensional stability and fluidity.

TABLE 18

|  |  |  | Examples ||||| Comparative Examples |||||
|---|---|---|---|---|---|---|---|---|---|---|---|---|
|  |  |  | 118 | 119 | 120 | 121 | 122 | 60 | 61 | 62 | 63 | 64 |
| Thermoplastic resin | A-1 | Parts by weight | 100 | 100 | 100 |  |  | 100 | 100 | 100 |  |  |
|  | A-3 | Parts by weight |  |  |  | 100 | 100 |  |  |  | 100 | 100 |
| Inorganic filler | B-3 | Parts by weight | 60 |  |  | 60 |  | 60 |  |  | 60 |  |
|  | B-4 | Parts by weight |  | 60 |  |  | 60 |  | 60 |  |  | 60 |
|  | B-5 | Parts by weight |  |  | 60 |  |  |  |  | 60 |  |  |
| Hyperbranched-polyester resin | C-1 | Parts by weight |  | 5 | 5 |  |  |  |  |  |  |  |
|  | C-2 | Parts by weight | 5 |  |  | 5 | 5 |  |  |  |  |  |
| Flow length |  | mm | 110 | 135 | 155 | 85 | 100 | 65 | 75 | 80 | 55 | 65 |
| Tensile strength |  | MPa | 115 | 108 | 97 | 101 | 90 | 110 | 105 | 95 | 99 | 88 |
| Flexural Modulus |  | GPa | 7.2 | 6.8 | 5.5 | 9.1 | 8.6 | 7 | 6.5 | 5.4 | 8.8 | 8.5 |
| Dimensional stability |  | % | 0.4 | 0.5 | 0.7 | 0.2 | 0.2 | 0.8 | 0.9 | 1.0 | 0.2 | 0.2 |

Reference Examples

Polyamide (C-12)

6.88 kg of terephthalic acid, 4.93 kg of adipic acid, 8.82 kg of hexamethylenediamine, 0.016 kg of sodium hypophosphite as a catalyst, 0.115 kg of benzoic acid as a molecular weight adjustor and 2,067 milliliter of ion-exchange water were charged in a batch-type pressure reaction can and the atmosphere in the can was sufficiently replaced by nitrogen, followed by heating. The polymerization pressure was set to 3.5 MPa and the inner temperature was raised to 250° C., followed by maintaining at 250 to 255° C. for 60 minutes. After the completion of the reaction, prepolyamide was obtained by discharging from the lower portion of the reaction can. The resultant prepolyamide had a viscosity ηr of 1.1 and a melting point of 296° C. The resultant prepolyamide was vacuum-dried at 100° C. for 24 hours and then subjected to melt polymerization in a 30 mm twin screw extruder at a retention time of 200 seconds and a maximum resin temperature of 330° C. to obtain a polyamide (C-12). The resultant polyamide had a relative viscosity ηr of 2.65 and a melting point of 309° C. The resultant polyamide has the composition of 55 mol % of a terephthalic acid component unit and 45 mol % of an adipic acid component unit as a dicarboxylic acid unit.

Polyamide (C-13)

9.00 kg of hexamethyleneammonium adipate (66 salt), 5.47 kg of terephthalic acid, 8.41 kg of an aqueous 64.5 wt % solution of hexamethylenediamine and 6.40 kg of ion-exchange water were charged in a 0.05 m³ batch-type pressure reaction can and the atmosphere in the can was sufficiently replaced by nitrogen, followed by heating. The polymerization pressure was set to 1.7 MPa and the temperature was raised to 240° C. over 3.5 hours under stirring, followed by maintaining at 240 to 245° C. for 30 minutes. After the completion of the reaction, prepolyamide was obtained by discharging from the lower portion of the reaction can. The resultant prepolyamide had a viscosity ηr of 1.2 and a melting point of 289° C. The resultant prepolyamide was vacuum-dried at 100° C. for 24 hours and then subjected to melt polymerization in a 30 mm twin screw extruder at a retention time of 200 seconds and a maximum resin temperature of 325° C. to obtain a polyamide (C-13). The resultant polyamide had a relative viscosity ηr of 2.8 and a melting point of 300° C.

Polyamide (C-14)

The prepolyamide obtained in Reference Example 1 was vacuum-dried at 100° C. for 24 hours and then subjected to melt polymerization in a 30 mm twin screw extruder at a retention time of 30 seconds and a maximum resin temperature of 305° C. to obtain a polyamide (C-14). The resultant polyamide had a relative viscosity ηr of 1.7 and a melting point of 293° C.

Polyamide (C-15)

6.72 kg of terephthalic acid, 3.61 kg of isophthalic acid, 12.26 kg of an aqueous 64.5 wt % solution of hexamethylenediamine and 5.5 kg of ion-exchange water were charged in a 0.05 m³ batch-type pressure reaction can and the atmosphere in the can was sufficiently replaced by nitrogen, followed by heating. The polymerization pressure was set to 1.7 MPa and the temperature was raised to 240° C. over 5 hours under stirring, followed by maintaining at 235 to 240° C. for 30 minutes. After the completion of the reaction, prepolyamide was obtained by discharging from the lower portion of the reaction can. The resultant prepolyamide had a viscosity ηr of 1.2 and a melting point of 318° C. The resultant prepolyamide was vacuum-dried at 100° C. for 24 hours and then subjected to melt polymerization in a 30 mm twin screw extruder at a retention time of 200 seconds and a maximum resin temperature of 340° C. to obtain a polyamide (C-15). The resultant polyamide had a relative viscosity ηr of 2.9 and a melting point of 318° C.

Reference Examples

Flame Retardants

G-1: Flame retardant: Brominated polystyrene resin (manufactured by GLC Co. under the trade name of PDBS)

G-2: Flame-retardant auxiliaries: Antimony trioxide ATOX (manufactured by Nihon Seiko Co., Ltd.)

Examples 123 to 137, Comparative Examples 65 to 75

Using a twin screw extruder, Model TEX30, manufactured by Japan Steel Works, LTD., components were dry-blended in each proportion shown in Table 19 and Table 20 and then the resultant blend was supplied from a main feeder. After setting to the cylinder setting temperature shown in Table 19 and Table 20 and setting the number of screw rotations to 200 rpm, melt-kneading was carried out and a gut ejected from a mold was immediately cooled in a water bath and then palletized by a strand cutter. The resultant pellets were dried under reduced pressure at 100° C. for 12 hours, and specimens were prepared by injection molding (SG75H-MIV, manufactured by Sumitomo Heavy Industries, Ltd., cylinder temperature and mold temperature shown in Table 19 and Table 20) and then subjected to the following evaluation (17) and the above evaluations (9), (10) and (15). The evaluation results are shown in Table 19 and Table 20.

(17) Fluidity

After setting an injection pressure to 15 MPa, using a mold for bar flow length test, measuring 200 mm in length×10 mm in width×1 mm in thickness, a bar flow length at a dwell pressure of 0 was measured. The larger the flow length, the more fluidity is better.

When compared with the polyamide resin compositions containing no hyperbranched-polyester of the present invention resin of Comparative Examples 67 to 70 and 75, the resin compositions of Examples have good balance between excellent mechanical characteristics and fluidity. In the resin composition containing a linear liquid crystal resin added therein of Comparative Example 71 and the resin composition containing a hyperbranched-polyester resin, which does not satisfy requirements of the present invention, of Comparative Example 72, sufficient fluidity improving effect was not exerted. In case of the resin compositions containing a hyperbranched-resin having a structure, which is different from that of the present invention, of Comparative Examples 73 and 74, the fluidity improving effect was exerted, but physical properties drastically deteriorated.

TABLE 19

| | | | Examples | | | | | | | | | | | | | | |
|---|---|---|---|---|---|---|---|---|---|---|---|---|---|---|---|---|---|
| | | | 123 | 124 | 125 | 126 | 127 | 128 | 129 | 130 | 131 | 132 | 133 | 134 | 135 | 136 | 137 |
| Polyamide resin containing aromatic ring | C-12 | Parts by weight | 100 | 100 | 100 | 100 | 100 | 100 | 100 | — | — | — | — | — | — | — | — |
| | C-13 | Parts by weight | — | — | — | — | — | — | — | 100 | 100 | 100 | 100 | 100 | 100 | — | — |
| | C-14 | Parts by weight | — | — | — | — | — | — | — | — | — | — | — | — | — | — | — |

TABLE 19-continued

| | | | \multicolumn{15}{c|}{Examples} | | | | | | | | | | | | | |
|---|---|---|---|---|---|---|---|---|---|---|---|---|---|---|---|---|
| | | | 123 | 124 | 125 | 126 | 127 | 128 | 129 | 130 | 131 | 132 | 133 | 134 | 135 | 136 | 137 |
| | C-15 | Parts by weight | — | — | — | — | — | — | — | — | — | — | — | — | — | 100 | 100 |
| Hyperbranched-polyester resin | A-20 | Parts by weight | 2 | — | — | — | — | — | — | — | — | — | — | — | — | — | — |
| | A-21 | Parts by weight | — | 0.5 | 2 | 2 | 2 | 2 | 12 | 2 | — | — | — | — | — | — | — |
| | A-1 | Parts by weight | — | — | — | — | — | — | — | — | 2 | — | — | — | — | — | — |
| | A-2 | Parts by weight | — | — | — | — | — | — | — | — | — | 2 | — | — | — | — | — |
| | A-5 | Parts by weight | — | — | — | — | — | — | — | — | — | — | 2 | — | — | — | — |
| | A-8 | Parts by weight | — | — | — | — | — | — | — | — | — | — | — | 2 | — | — | — |
| | A-24 | Parts by weight | — | — | — | — | — | — | — | — | — | — | — | — | 2 | — | — |
| Flame retardant | G-1 | Parts by weight | — | — | — | 40 | 40 | — | 40 | 40 | 40 | 40 | 40 | 40 | 40 | — | — |
| Flame-retardant auxiliary | G-2 | Parts by weight | — | — | — | 10 | 10 | — | 10 | 10 | 10 | 10 | 10 | 10 | 10 | — | — |
| Inorganic filler | D-3 | Parts by weight | — | — | — | — | 55 | — | 55 | 55 | 55 | 55 | 55 | 55 | 55 | 45 | 45 |
| Impact modifier | E-1 | Parts by weight | — | — | — | — | — | 25 | — | — | — | — | — | — | — | — | — |
| Cylinder temperature upon melt-kneading | | °C. | 330 | 330 | 330 | 330 | 330 | 330 | 330 | 320 | 320 | 320 | 320 | 320 | 320 | 335 | 335 |
| Cylinder temperature upon injection molding | | °C. | 330 | 330 | 330 | 330 | 330 | 330 | 330 | 320 | 320 | 320 | 320 | 320 | 320 | 335 | 335 |
| Mold temperature upon injection molding | | °C. | 130 | 130 | 130 | 130 | 130 | 80 | 130 | 130 | 130 | 130 | 130 | 130 | 130 | 130 | 130 |
| Flow length | | mm | 158 | 160 | 170 | 124 | 112 | 136 | 188 | 115 | 102 | 110 | 105 | 98 | 95 | 128 | 154 |
| Tensile strength | | MPa | 89 | 88 | 88 | 85 | 232 | 41 | 225 | 232 | 231 | 230 | 231 | 231 | 219 | 219 | 213 |
| Tensile elongation | | % | 50 | 45 | 43 | 35 | 5 | 130 | 4 | 5 | 4 | 4 | 5 | 5 | 4 | 4 | 4 |
| Flexural Modulus | | GPa | 3.4 | 3.5 | 3.3 | 3.4 | 10.9 | 2.3 | 11.2 | 11 | 10.8 | 10.7 | 10.6 | 10.8 | 10.5 | 11.4 | 11.2 |
| Impact strength | | J/m | 67 | 63 | 65 | 56 | 125 | 480 | 117 | 122 | 120 | 121 | 122 | 119 | 117 | 105 | 107 |

TABLE 20

| | | | \multicolumn{11}{c|}{Comparative Examples} | | | | | | | | | |
|---|---|---|---|---|---|---|---|---|---|---|---|---|---|
| | | | 65 | 66 | 67 | 68 | 69 | 70 | 71 | 72 | 73 | 74 | 75 |
| Polyamide resin containing aromatic ring | C-12 | Parts by weight | 100 | — | 100 | 100 | 100 | — | — | — | — | — | — |
| | C-13 | Parts by weight | — | — | — | — | — | 100 | 100 | 100 | 100 | 100 | — |
| | C-14 | Parts by weight | — | 100 | — | — | — | — | — | — | — | — | — |
| | C-15 | Parts by weight | — | — | — | — | — | — | — | — | — | — | 100 |
| Additives | B-1 | Parts by weight | — | — | — | — | — | — | 2 | — | — | — | — |
| | B-2 | Parts by weight | — | — | — | — | — | — | — | 2 | — | — | — |
| | B-4 | Parts by weight | — | — | — | — | — | — | — | — | 2 | — | — |
| | B-5 | Parts by weight | — | — | — | — | — | — | — | — | — | 2 | — |
| Flame retardant | G-1 | Parts by weight | — | — | 40 | 40 | — | 40 | 40 | 40 | 40 | 40 | — |
| Flame-retardant auxiliary | G-1 | Parts by weight | — | — | 10 | 10 | — | 10 | 10 | 10 | 10 | 10 | — |
| Inorganic filler | D-3 | Parts by weight | — | — | — | 55 | — | 55 | 55 | 55 | 55 | 55 | 45 |
| Impact modifier | E-1 | Parts by weight | — | — | — | — | 25 | — | — | — | — | — | — |

TABLE 20-continued

|  |  | Comparative Examples | | | | | | | | | | |
| --- | --- | --- | --- | --- | --- | --- | --- | --- | --- | --- | --- | --- |
|  |  | 65 | 66 | 67 | 68 | 69 | 70 | 71 | 72 | 73 | 74 | 75 |
| Cylinder temperature upon melt-kneading | °C. | 330 | 320 | 330 | 330 | 330 | 320 | 320 | 320 | 320 | 320 | 335 |
| Cylinder temperature upon injection molding | °C. | 330 | 320 | 330 | 330 | 330 | 320 | 320 | 320 | 320 | 320 | 335 |
| Mold temperature upon injection molding | °C. | 130 | 130 | 130 | 130 | 80 | 130 | 130 | 130 | 130 | 130 | 130 |
| Flow length | mm | 95 | 155 | 70 | 53 | 65 | 53 | 58 | 60 | 110 | 105 | 64 |
| Tensile strength | MPa | 90 | 75 | 82 | 230 | 42 | 231 | 215 | 220 | 168 | 155 | 215 |
| Tensile elongation | % | 42 | 5 | 38 | 4 | 110 | 5 | 4 | 4 | 3 | 3 | 4 |
| Flexural Modulus | GPa | 3.4 | 2.9 | 3.5 | 10.8 | 2.2 | 10.9 | 10.9 | 10.8 | 9.3 | 8.5 | 11.2 |
| Impact strength | J/m | 65 | 21 | 57 | 120 | 455 | 118 | 115 | 118 | 95 | 89 | 105 |

Reference Examples

Polyamide (C-16)

An aqueous mixed solution (concentration of solid raw material: 60% by weight) of 30 mol % of hexamethylenediammonium terephthalate (6T salt) and 70 mol % of hexamethylenediammonium adipate (AH salt) was charged in a pressure reaction can, followed by heating under stirring. After reacting under a water vapor pressure of 19 kg/cm$^2$ for 1.5 hours, a pressure was gradually released over about 2 hours and the reaction was carried out under a nitrogen gas flow at normal pressure for about 30 minutes to obtain a polyamide resin (C-16) having a relative viscosity of 2.63 (in sulfuric acid) and a melting point of 278° C.

Polyamide (C-17)

An aqueous mixed solution (concentration of solid raw material: 60% by weight) of 62 mol % of hexamethylenediammonium terephthalate (6T salt), 26 mol % of hexamethylenediammonium isoterephthalate (6I salt) and 12 mol % of hexamethylenediammonium adipate (AH salt) was charged in a pressure reaction can, followed by heating under stirring. After reacting under a water vapor pressure of 35 kg/cm$^2$ for one hour, a pressure was gradually released over about 2 hours to obtain a polyamide. The resultant polyamide was dried and then subjected to melt polymerization at a cylinder temperature of 330° C. using a twin screw extruder to obtain a polyamide resin (C-17) having a relative viscosity of 2.3 (in sulfuric acid) and a melting point of 320° C.

Thermoplastic Resins

C-19: Nylon 66 resin having a melting point of 265° C. and a relative viscosity at 98% sulfuric acid (1 g/dl) of 2.9
C-20: Polyethylene terephthalate resin having a melting point of 260° C. (J125, manufactured by Mitsui Chemicals, Inc.)

Additives

D-3: Inorganic filler: Glass fiber (T289, manufactured by Nippon Electric Glass Co., Ltd.)
E-3: Impact modifier: Acid anhydride grafted ethylene-1-butene copolymer ("TAFMER" MH7020, manufactured by Mitsui Chemicals, Inc.)
H-1: Epoxy resin (NC-3000, manufactured by NIPPON KAYAKU CO., LTD.)

Flame Retardants

G-2: Flame-retardant auxiliary: Antimony trioxide (ATOX, manufactured by Nihon Seiko Co, Ltd.)
G-3: Red phosphorus (Nova Excel 140, manufactured by RINKAGAKU KOGYO CO., LTD.)
G-4: Melamine cyanurate (MC-440, manufactured by Nissan Chemical Industry Co., Ltd.)
G-5: Magnesium hydroxide (5E Kisuma, manufactured by Koyowa Chemical Industry Co., Ltd.)
G-6: Melamine, melem, melam polyphosphate compound [PMP-200, manufactured by Nissan Chemical Industry Co., Ltd.]
G-7: Aromatic phosphate ester (PX-200, manufactured by Daihachi Chemical Industry Co., Ltd.)
G-8: 100 parts by weight of a mixture of the same weight of a melamine powder (manufactured by Mitsubishi Chemical Corp.) and a cyanuric acid powder (manufactured by Shikoku Chemical Corp.) was mixed with 10 parts by weight of a silica hydrosol ("SNOWTEX C", manufactured by Nissan Chemical Industry Co., Ltd.) and 500 parts by weight of water to obtain a water slurry, followed by mixing with heating at 90° C. for one hour. The resultant slurry in the form of fine particles were filtered, dried and then ground to obtain salt of a triazine-based compound surface-treated with metal oxide having an average particle diameter of about 10 μm and cyanuric acid.

Examples 138 to 152, Comparative Examples 76 to 89

Using a twin screw extruder, Model TEX30, manufactured by Japan Steel Works, LTD., components were dry-blended in each proportion shown in Table 21 and Table 22 and then the resultant blend was supplied from a main feeder. After setting to the cylinder setting temperature shown in Table 21 and Table 22 and setting the number of screw rotations to 200 rpm, melt-kneading was carried out and a gut ejected from a mold was immediately cooled in a water bath and then palletized by a strand cutter. The resultant pellets were dried under reduced pressure at 100° C. for 12 hours, and specimens were prepared by injection molding (SG75H-MIV, manufactured by Sumitomo Heavy Industries, Ltd., cylinder temperature and mold temperature shown in Table 21 and Table 22) and then subjected to the following evaluation (24) and the above evaluations (9), (15) and (17). The evaluation results are shown in Table 21 and Table 22.

(24) Flame Retardancy

Using 0.8 mm thick specimens for evaluation of flame retardancy defined in UL94, flame retardancy was evaluated in accordance with evaluation criteria defined in UL94. Grade of flame retardancy lowers in the following order: V-0>V-1>V-2>HB.

The resin compositions containing no hyperbranched-polyester of the present invention of Comparative Examples 77 to 79 and 84 to 89 have excellent flame retardancy, but have not sufficient fluidity. In the resin composition containing a linear liquid crystal resin added therein of Comparative Example 80 and the resin composition containing a hyper-branched-polyester resin, which does not satisfy requirements of the present invention, added therein of Comparative Example 81, a sufficient fluidity improving effect was not exerted. In case of the resin compositions blended with a hyperbranched-resin having a structure, which is different from that of the present invention, of Comparative Examples 82 and 83, the fluidity improving effect was exerted, but physical properties drastically deteriorated. In contrast, it is apparent that resin compositions of Examples have excellent flame retardancy and fluidity and are also excellent in mechanical characteristics.

TABLE 21

|  |  |  | Examples |  |  |  |  |  |  |  |  |  |  |  |  |  |  |
|---|---|---|---|---|---|---|---|---|---|---|---|---|---|---|---|---|---|
|  |  |  | 138 | 139 | 140 | 141 | 142 | 143 | 144 | 145 | 146 | 147 | 148 | 149 | 150 | 151 | 152 |
| Thermoplastic resin | C-16 | Parts by weight | 100 | 100 | 100 | 100 | 100 | 100 | 100 | 100 | 100 | 100 | — | — | — | — | — |
|  | C-17 | Parts by weight | — | — | — | — | — | — | — | — | — | — | — | 100 | 100 | — | — |
|  | C-1 | Parts by weight | — | — | — | — | — | — | — | — | — | — | — | — | — | 100 | — |
|  | C-19 | Parts by weight | — | — | — | — | — | — | — | — | — | — | 100 | — | — | — | 100 |
| Flame retardant | G-3 | Parts by weight | 10 | — | — | — | — | — | — | — | — | — | — | 10 | — | 8 | — |
|  | G-4 | Parts by weight | — | — | — | — | — | — | — | — | — | — | — | — | — | — | 10 |
|  | G-5 | Parts by weight | — | 40 | 40 | 40 | 40 | 40 | 40 | 40 | 40 | 40 | — | — | 40 | — | — |
|  | G-1 | Parts by weight | — | — | — | — | — | — | — | — | — | — | — | — | — | 40 | — |
|  | G-6 | Parts by weight | — | — | — | — | — | — | — | — | — | — | 30 | — | — | — | — |
| Hyperbranched-polyester resin | A-20 | Parts by weight | — | 2 | — | — | — | — | — | — | — | — | — | — | — | — | — |
|  | A-21 | Parts by weight | 2 | — | 3 | 3 | 2 | — | — | — | — | — | 2 | 2 | 2 | 2 | 2 |
|  | A-1 | Parts by weight | — | — | — | — | — | 2 | — | — | — | — | — | — | — | — | — |
|  | A-2 | Parts by weight | — | — | — | 10 | 10 | — | 2 | — | — | — | — | — | — | — | — |
|  | A-5 | Parts by weight | — | — | — | — | 55 | — | — | 2 | — | — | — | — | — | — | — |
|  | A-8 | Parts by weight | — | — | — | — | — | 25 | — | — | 2 | — | — | — | — | — | — |
|  | A-24 | Parts by weight | — | — | — | — | — | — | — | — | — | 2 | — | — | — | — | — |
| Flame-retardant auxiliary | G-2 | Parts by weight | — | 10 | 10 | 10 | 10 | 10 | 10 | 10 | 10 | 10 | 45 | — | 10 | — | — |
| Inorganic filler | D-3 | Parts by weight | — | — | 55 | — | — | — | — | — | — | — | — | 45 | 55 | — | — |
| Impact modifier | E-1 | Parts by weight | — | — | — | 25 | — | — | — | — | — | — | — | — | — | — | — |
| Cylinder temperature upon melt-kneading | | °C. | 300 | 300 | 300 | 300 | 300 | 300 | 300 | 300 | 300 | 300 | 280 | 335 | 335 | 250 | 280 |
| Cylinder temperature upon injection molding | | °C. | 300 | 300 | 300 | 300 | 300 | 300 | 300 | 300 | 300 | 300 | 280 | 335 | 335 | 250 | 280 |
| Mold temperature upon injection molding | | °C. | 130 | 130 | 130 | 80 | 130 | 130 | 130 | 130 | 130 | 130 | 80 | 130 | 130 | 80 | 80 |
| Flow length | | mm | 125 | 115 | 105 | 110 | 120 | 100 | 97 | 95 | 91 | 90 | 104 | 135 | 128 | 100 | 110 |
| Tensile strength | | MPa | 87 | 82 | 228 | 50 | 82 | 83 | 82 | 80 | 81 | 82 | 165 | 243 | 241 | 73 | 86 |
| Flexural Modulus | | GPa | 3.5 | 3.5 | 10.2 | 2.4 | 3.5 | 3.6 | 3.5 | 3.2 | 3.3 | 3.5 | 8.1 | 11.1 | 10.8 | 3.8 | 3.6 |
| Flame Retardancy | | UL-94 | V-0 | V-0 | V-0 | V-0 | V-0 | V-0 | V-0 | V-0 | V-0 | V-0 | V-0 | V-0 | V-0 | V-0 | V-0 |

TABLE 22

|  |  |  | Comparative Examples |  |  |  |  |  |  |  |  |  |  |  |  |  |
|---|---|---|---|---|---|---|---|---|---|---|---|---|---|---|---|---|
|  |  |  | 76 | 77 | 78 | 79 | 80 | 81 | 82 | 83 | 84 | 85 | 86 | 87 | 88 | 89 |
| Thermoplastic resin | C-16 | Parts by weight | 100 | 100 | 100 | 100 | 100 | 100 | 100 | 100 | 100 | — | — | — | — | — |
|  | C-17 | Parts by weight | — | — | — | — | — | — | — | — | — | — | 100 | 100 | — | — |
|  | C-1 | Parts by weight | — | — | — | — | — | — | — | — | — | — | — | — | 100 | — |
|  | C-19 | Parts by weight | — | — | — | — | — | — | — | — | — | 100 | — | — | — | 100 |

TABLE 22-continued

|  |  |  | Comparative Examples |  |  |  |  |  |  |  |  |  |  |  |  |
|---|---|---|---|---|---|---|---|---|---|---|---|---|---|---|---|
|  |  |  | 76 | 77 | 78 | 79 | 80 | 81 | 82 | 83 | 84 | 85 | 86 | 87 | 88 | 89 |
| Flame retardant | G-3 | Parts by weight | — | 10 | — | — | — | — | — | — | — | — | 10 | — | 8 | — |
|  | G-4 | Parts by weight | — | — | — | — | — | — | — | — | — | — | — | — | — | 10 |
|  | G-5 | Parts by weight | — | — | 40 | 40 | 40 | 40 | 40 | 40 | 40 | — | — | 40 | — | — |
|  | G-1 | Parts by weight | — | — | — | — | — | — | — | — | — | — | — | — | 40 | — |
|  | G-6 | Parts by weight | — | — | — | — | — | — | — | — | — | 30 | — | — | — | — |
| Additives | B-1 | Parts by weight | — | — | — | — | 2 | — | — | — | — | — | — | — | — | — |
|  | B-2 | Parts by weight | — | — | — | — | — | 2 | — | — | — | — | — | — | — | — |
|  | B-4 | Parts by weight | — | — | — | — | — | — | 2 | — | — | — | — | — | — | — |
|  | B-5 | Parts by weight | — | — | — | — | — | — | — | 2 | — | — | — | — | — | — |
| Flame-retardant auxiliary | G-2 | Parts by weight | — | — | 10 | 10 | 10 | 10 | 10 | 10 | 10 | — | — | 10 | — | — |
| Inorganic filler | D-3 | Parts by weight | — | — | — | 55 | 55 | 55 | 55 | 55 | — | 55 | 55 | 55 | — | — |
| Impact modifier | E-1 | Parts by weight | — | — | — | — | — | — | — | — | 25 | — | — | — | — | — |
| Cylinder temperature upon melt-kneading |  | ° C. | — | 300 | 300 | 300 | 300 | 300 | 300 | 300 | 300 | 280 | 335 | 335 | 250 | 280 |
| Cylinder temperature upon injection molding |  | ° C. | 300 | 300 | 300 | 300 | 300 | 300 | 300 | 300 | 300 | 280 | 335 | 335 | 250 | 280 |
| Mold temperature upon injection molding |  | ° C. | 130 | 130 | 130 | 130 | 130 | 130 | 130 | 130 | 80 | 80 | 130 | 130 | 80 | 80 |
| Flow length | | mm | 138 | 80 | 73 | 55 | 65 | 70 | 95 | 102 | 60 | 55 | 95 | 91 | 55 | 70 |
| Tensile strength | | MPa | 90 | 83 | 80 | 230 | 225 | 215 | 170 | 155 | 42 | 163 | 245 | 240 | 75 | 85 |
| Flexural Modulus | | GPa | 3.6 | 3.4 | 3.5 | 10.2 | 9.8 | 9.6 | 8.2 | 7.5 | 2.3 | 7.8 | 10.9 | 10.7 | 3.8 | 3.5 |
| Flame Retardancy | | UL-94 | HB | V-0 | V-0 | V-0 | V-0 | V-0 | V-0 | V-0 | V-0 | V-0 | V-0 | V-0 | V-0 | V-0 |

Example 153 to 156, Comparative Examples 90 to 93

Using a twin screw extruder, Model TEX30, manufactured by Japan Steel Works, LTD., components were dry-blended in each proportion shown in Table 23 and then the resultant blend was supplied from a main feeder. After setting to the cylinder setting temperature shown in Table 23 and setting the number of screw rotations to 200 rpm, melt-kneading was carried out and a gut ejected from a mold was immediately cooled in a water bath and then palletized by a strand cutter. The resultant pellets of Examples 153 to 155 and Comparative Examples 90 to 92 were hot air-dried at 110° C. for 12 hours, while the resultant pellets of Example 156 and Comparative Example 93 were hot air-dried at 80° C. for 12 hours. Using pellets after drying, specimens were prepared by injection molding (SG75H-MIV, manufactured by Sumitomo Heavy Industries, Ltd., cylinder temperature and mold temperature shown in Table 23) and then subjected to the above evaluations (9), (15), (17) and (24). The evaluation results are shown in Table 23. It is apparent that resin compositions of Examples have excellent flame retardancy and fluidity and are also excellent in mechanical characteristics when compared with Comparative Examples.

TABLE 23

|  |  |  | Examples |  |  |  | Comparative Examples |  |  |  |
|---|---|---|---|---|---|---|---|---|---|---|
|  |  |  | 153 | 154 | 155 | 156 | 90 | 91 | 92 | 93 |
| Thermoplastic resin | C-3 | Parts by weight | 100 | 100 | 20 | — | 100 | 100 | 20 | — |
|  | C-20 | Parts by weight | — | — | 80 | — | — | — | 80 | — |
|  | C-9 | Parts by weight | — | — | — | 100 | — | — | — | 100 |
| Flame retardant | G-3 | Parts by weight | 20 | — | — | — | 20 | — | — | — |
|  | G-5 | Parts by weight | — | 25 | — | — | — | 25 | — | — |
|  | G-7 | Parts by weight | — | — | 20 | 10 | — | — | 20 | 10 |
|  | G-8 | Parts by weight | — | — | 20 | — | — | — | 20 | — |
| Hyperbranched-polyester resin | A-21 | Parts by weight | 2 | 2 | 2 | 3 | — | — | — | — |
| Flame-retardant auxiliary | G-2 | Parts by weight | — | 10 | — | — | — | 10 | — | — |

TABLE 23-continued

|  |  |  | Examples | | | | Comparative Examples | | | |
| --- | --- | --- | --- | --- | --- | --- | --- | --- | --- | --- |
|  |  |  | 153 | 154 | 155 | 156 | 90 | 91 | 92 | 93 |
| Inorganic filler | D-3 | Parts by weight | — | 45 | 60 | — | — | 45 | 60 | — |
| Epoxy resin | H-1 | Parts by weight | — | — | — | 8 | — | — | — | 8 |
| Cylinder temperature upon melt-kneading |  | ° C. | 250 | 250 | 280 | 220 | 250 | 250 | 280 | 220 |
| Cylinder temperature upon injection molding |  | ° C. | 250 | 250 | 280 | 220 | 250 | 250 | 280 | 220 |
| Mold temperature upon injection molding |  | ° C. | 80 | 80 | 80 | 40 | 80 | 80 | 80 | 40 |
| Flow length |  | mm | 123 | 89 | 95 | 90 | 55 | 43 | 45 | 53 |
| Tensile strength |  | MPa | 84 | 125 | 153 | 42 | 85 | 128 | 155 | 45 |
| Flexural Modulus |  | GPa | 3 | 7.2 | 10.6 | 2.3 | 3.1 | 7.3 | 10.8 | 2.5 |
| Flame Retardancy |  | UL-94 | V-0 | V-0 | V-0 | V-1 | V-0 | V-0 | V-0 | V-1 |

Thermoplastic Resins

Polyamides (C-21 to C-23)

Polyamide resins (C-21) to (C-23) were polymerized by the following method. An equimolar salt of hexamethylenediamine and adipic acid, an equimolar salt of hexamethylenediamine and isophthalic acid, and ε-caprolactam were charged in a pressure reaction can in the weight ratio shown in Table 24 and benzoic acid was added in the amount shown in Table 24, and then pure water was added in the amount which is the same as the total amount of the above components. After replacing the atmosphere in the reaction can with nitrogen, heating was initiated while stirring and the reaction was carried out by adjusting a final arrival temperature to 270° C. while adjusting a can internal pressure to 20 Kg/cm² at most. The polymer ejected in a water bath was palletized by a strand cutter to obtain polyamide resins (C-21) to (C-23).

C-21: Nylon 66/6I/6 resin having a relative viscosity (98% sulfuric acid, 1 g/dl) of 2.3 polymerized by the above, method C-22: Nylon 66/6I/6 resin having a relative viscosity (98% sulfuric acid, 1 g/dl) of 2.3 polymerized by the above method C-23: Nylon 66/6I/6 resin having a relative viscosity (98% sulfuric acid, 1 g/dl) of 2.2 polymerized by the above method

TABLE 24

|  | Unit | C-21 | C-22 | C-23 |
| --- | --- | --- | --- | --- |
| Hexamethyleneadipamide unit | % by weight | 81 | 76 | 71 |
| Hexamethyleneisophthalamide unit | % by weight | 15 | 16 | 17 |
| Caproamide unit | % by weight | 4 | 8 | 12 |
| Amount of benzoic acid | ×10⁻⁵ mol/g | 6.1 | 6.1 | 6.1 |

C-24: Nylon 610 resin having a melting point of 223° C. and a relative viscosity (98% sulfuric acid, 1 g/dl) of 2.7 (CM2001, manufactured by TORAY INDUSTRIES, INC.)

Inorganic Fillers

D-5: Wollastonite (NYAD325, manufactured by NYCO Co.)

D-6: Glass beads (EGB731A, manufactured by Potters-Ballotini Co., Ltd.)

Example 157

Hyperbranched-Polyester

In a reaction vessel equipped with a stirring blade and a distillation tube, 48.0 g (0.35 mol) of p-hydroxybenzoic acid, 30.9 g (0.17 mol) of 4,4'-dihydroxybiphenyl, 5.41 g (0.033 mol) of terephthalic acid, 10.4 g (0.054 mol) of PRT having an inherent viscosity of about 0.6 dl/g, 42.0 g (0.20 mol) of trimesic acid and 76.3 g (1.1 equivalents based on the entire phenolic hydroxyl groups) of acetic anhydride were charged and reacted at 145° C. for 1.5 hours while stirring under a nitrogen gas atmosphere, and then a deacetylation condensation reaction was carried out by heating to 250° C. After the reactor inner temperature reached 250° C., 14.7 g (0.12 mol) of benzoic acid was added, followed by heating to 280° C. When 100% of a theoretical distillation amount of acetic acid was distilled off, heating and stirring were terminated and contents were ejected in cold water. In the same manner as in Example 1, the resultant hyperbranched-polyester was evaluated. The results are shown in Table 25 and Table 26.

TABLE 25

|  | Hyperbranched-polyester | Content of branching point B (Mol %) | p | q | r | p + q + r | Ratio of terminal carboxylic acid/acetyl group | Extent of branching $B$ | Molecular weight |
| --- | --- | --- | --- | --- | --- | --- | --- | --- | --- |
| Example 157 | A-25 | 25 | 2.00 | 0.50 | 0.50 | 3 | 65/35 | 0.65 | 25.00 |

TABLE 26

| | Hyperbranched-polyester | Melting point (° C.) | Liquid crystallization initiation temperature (° C.) | Melt viscosity | | Response under shear | Storage elastic modulus (GPa) | Anisotropy (MD/TD) | Hydrogen gas barrier properties (cm³·cm/cm²·sec·cmHg) |
|---|---|---|---|---|---|---|---|---|---|
| | | | | Viscosity (Pa·s) | Temperature (° C.) | | | | |
| Example 157 | A-25 | 182 | 163 | 11 | 192 | 28 | 4.2 | 1 | 1.7 |

Examples 158 to 173, Comparative Examples 94 to 101

Using a twin screw extruder, Model TEX30, manufactured by Japan Steel Works, LTD., components were dry-blended in each proportion shown in Table 27 and Table 28 and then the resultant blend was supplied from a main feeder. A fibrous inorganic filler and a non-fibrous inorganic filler were supplied from a side feeder disposed at a downstream of the extruder. After setting the cylinder setting temperature to 260° C. and setting the number of screw rotations to 200 rpm, melt-kneading was carried out and a gut ejected from a mold was immediately cooled in a water bath and then palletized by a strand cutter. The resultant pellets were dried under reduced pressure at 80° C. for 12 hours, and specimens were prepared by injection molding (SG75H-MIV, manufactured by Sumitomo Heavy Industries, Ltd., cylinder temperature: 260° C., mold temperature: 80° C.) and then subjected to the above evaluations (7), (9) and (15) and the following evaluations (28) to (29). The evaluation results are shown in Table 27 and Table 28.

(28) Surface Appearance 1 of Molding

A mirror-polished square plate measuring 80×80×3 (mm) (film gate) was obtained by injection molding and then glossiness was measured on a surface of the resultant square plate in accordance with JIS K7105.

(29) Surface Appearance 2 of Molding

A mirror-polished square plate measuring 115×115×2 (mm) (film gate) was obtained by injection molding and then visibility of a reflection image of a fluorescent lamp was measured on a surface of the resultant square plate. Evaluation criteria are as follows.

A: A reflection image of a fluorescent lamp is clearly observed.
B: A reflection image of a fluorescent lamp is slightly unclearly observed.
C: A reflection image of a fluorescent lamp is observed, but is considerably unclear.
D: A reflection image of a fluorescent lamp cannot be observed.

The resin compositions containing no hyperbranched-polyester of the present invention resin of Comparative Examples 94 to 96 had high flexural modulus and high stiffness because they contain an inorganic filler, but had not sufficient fluidity. In the resin composition containing a linear liquid crystal resin added therein of Comparative Example 97 and the resin composition containing a hyperbranched-polyester resin, which does not satisfy requirements of the present invention, added therein of Comparative Example 98, the fluidity improving effect was not exerted. In case of the resin compositions blended with a hyperbranched-resin having a structure, which is different from that of the present invention, of Comparative Examples 99 to 101, the fluidity improving effect was exerted, but physical properties drastically deteriorated. In contrast, the resin compositions of Examples showed good balance between mechanical characteristics such as stiffness, and fluidity and also showed good molding appearance because of good mold transfer properties.

TABLE 27

| | | | Examples | | | | | | | | | | | | | | |
|---|---|---|---|---|---|---|---|---|---|---|---|---|---|---|---|---|---|
| | | | 158 | 159 | 160 | 161 | 162 | 163 | 164 | 165 | 166 | 167 | 168 | 169 | 170 | 171 | 172 | 173 |
| Polyamide resin | C-21 | Parts by weight | — | — | — | 50 | — | — | — | — | — | — | — | — | — | — | — | — |
| | C-21 | Parts by weight | 100 | — | — | — | 50 | — | 50 | 50 | 50 | 50 | 50 | 50 | 50 | 50 | 50 | 50 |
| | C-23 | Parts by weight | — | — | — | — | — | 50 | — | — | — | — | — | — | — | — | — | — |
| | C-1 | Parts by weight | — | 100 | 100 | 50 | 50 | 50 | — | 50 | 50 | 50 | 50 | 50 | 50 | 50 | 50 | 50 |
| | C-24 | Parts by weight | — | — | — | — | — | — | 50 | — | — | — | — | — | — | — | — | — |
| Inorganic filler | D-4 | Parts by weight | 100 | 100 | — | 100 | 100 | 100 | 100 | 100 | 100 | 100 | 100 | 100 | 100 | 70 | 70 | 70 |
| | D-5 | Parts by weight | — | — | 80 | — | — | — | — | — | — | — | — | — | — | — | — | — |
| Nonfibrous inorganic filler | D-6 | Parts by weight | — | — | — | — | — | — | — | — | — | — | — | — | 40 | — | — | — |
| Hyper-branched-polyester | A-20 | Parts by weight | — | — | — | — | — | — | — | 2 | — | — | — | — | — | — | — | — |
| | A-25 | Parts by weight | 2 | 2 | 2 | 2 | 2 | 2 | 2 | — | — | — | — | — | — | 1 | 2 | 5 |
| | A-1 | Parts by weight | — | — | — | — | — | — | — | — | 2 | — | — | — | — | — | — | — |
| | A-2 | Parts by weight | — | — | — | — | — | — | — | — | — | 2 | — | — | — | — | — | — |

TABLE 27-continued

|  |  | Examples | | | | | | | | | | | | | | | |
|---|---|---|---|---|---|---|---|---|---|---|---|---|---|---|---|---|
|  |  | 158 | 159 | 160 | 161 | 162 | 163 | 164 | 165 | 166 | 167 | 168 | 169 | 170 | 171 | 172 | 173 |
| A-5 | Parts by weight | — | — | — | — | — | — | — | — | — | — | 2 | — | — | — | — | — |
| A-8 | Parts by weight | — | — | — | — | — | — | — | — | — | — | — | 2 | — | — | — | — |
| A-9 | Parts by weight | — | — | — | — | — | — | — | — | — | — | — | — | 2 | — | — | — |
| Flow length | mm | 150 | 115 | 130 | 120 | 130 | 135 | 125 | 125 | 120 | 120 | 110 | 100 | 95 | 110 | 135 | 155 |
| Tensile strength | MPa | 235 | 240 | 110 | 238 | 240 | 243 | 232 | 238 | 236 | 237 | 237 | 245 | 238 | 229 | 231 | 227 |
| Flexural Modulus | GPa | 15.4 | 16.2 | 6.0 | 15.8 | 15.9 | 15.4 | 14.7 | 15.3 | 15.4 | 15.4 | 15.3 | 15.7 | 15.2 | 14.9 | 15.0 | 15.0 |
| Glossiness | % | 92 | 82 | 90 | 90 | 91 | 92 | 90 | 90 | 91 | 90 | 87 | 80 | 90 | 90 | 92 | 92 |
| Surface appearance | Visually observed | A | B | A | A | A | A | A | A | A | A | A | A | A | A | A | A |

TABLE 28

|  |  |  | Comparative Examples | | | | | | | |
|---|---|---|---|---|---|---|---|---|---|---|
|  |  |  | 94 | 95 | 96 | 97 | 98 | 99 | 100 | 101 |
| Polyamide resin | C-22 | Parts by weight | — | — | 50 | 50 | 50 | 50 | 50 | 50 |
|  | C-1 | Parts by weight | 100 | 100 | 50 | 50 | 50 | 50 | 50 | 50 |
| Inorganic filler | D-4 | Parts by weight | 100 | — | 100 | 100 | 100 | 100 | 100 | 70 |
|  | D-5 | Parts by weight | — | 80 | — | — | — | — | — | — |
| Nonfibrous inorganic filler | D-6 | Parts by weight | — | — | — | — | — | — | — | 30 |
| Additives | B-1 | Parts by weight | — | — | — | 2 | — | — | — | — |
|  | B-2 | Parts by weight | — | — | — | — | 2 | — | — | — |
|  | B-4 | Parts by weight | — | — | — | — | — | 2 | — | — |
|  | B-5 | Parts by weight | — | — | — | — | — | — | 2 | 2 |
| Flow length | mm |  | 55 | 80 | 70 | 65 | 75 | 90 | 95 | 100 |
| Tensile strength | MPa |  | 238 | 100 | 236 | 242 | 239 | 180 | 175 | 160 |
| Flexural Modulus | GPa |  | 16.0 | 5.9 | 15.5 | 16.0 | 15.8 | 14.7 | 14.6 | 13.8 |
| Glossiness | % |  | 54 | 70 | 88 | 75 | 78 | 69 | 70 | 72 |
| Surface appearance | Visually observed |  | D | C | A | B | B | C | C | C |

Reference Examples

Polyamide (Concentration of an Amide Group is 7 or More)

C-25: Nylon 610 resin having a melting point of 223° C. and a relative viscosity (98% sulfuric acid, 1 g/dl) of 3.3 (CM2021, manufactured by TORAY INDUSTRIES, INC.)

C-26: Nylon 612 resin having a melting point of 215° C. and a relative viscosity (98% sulfuric acid, 1 g/dl) of 3.4 ("VESTAMID"D18, manufactured by Daicel-Degussa Ltd.)

Inorganic Filler

D-7: Glass fiber, (T-747GH, manufactured by Nippon Electric Glass Co., Ltd.)

Examples 174 to 186, Comparative Examples 102 to 108

Using a twin screw extruder, Model TEX30, manufactured by Japan Steel Works, LTD., components were dry-blended in each proportion shown in Table 29 and Table 30 and then the resultant blend was supplied from a main feeder (upstream) and a side feeder (midstream), respectively. After setting the cylinder setting temperature to a melting point of a polyamide resin +20° C. (cylinder setting temperature in Example 186) and setting the number of screw rotations to 200 rpm, melt-kneading was carried out and a gut ejected from a mold was immediately cooled in a water bath and then palletized by a strand cutter. The resultant pellets were dried under reduced pressure at 80° C. for 12 hours, and specimens were prepared by injection molding (SG75H-MIV, manufactured by Sumitomo Heavy Industries, Ltd., cylinder temperature: a melting point of a polyamide resin +20° C., mold temperature: 80° C.) and then subjected to the above evaluations (7) and (9) and the following evaluations (32). The evaluation results are shown in Table 29 and Table 30.

(32) Coolant-Resistance

In an aqueous 50% solution of a long life coolant (LLC), ASTM No. 1 dumbbell specimens were treated at 130° C. for 1,000 hours. From a change in a tensile strength before and after treatment, a strength retention rate was measured as shown in the following formula and was used as an indicator of coolant resistance.

Method for Calculation of Strength Retention Rate (Tensile strength after treatments−Tensile strength before treatment)÷Tensile strength before treatment×100=Strength retention rate (%).

As is apparent from Comparative Examples 102 to 104, use of a polyamide resin having the concentration of an amide group of 7 or more enables an improvement in coolant resistance but causes drastic deterioration of fluidity. In contrast, the resin compositions of Examples 174 to 186 showed remarkably improved fluidity while maintaining excellent tensile strength and coolant resistance. In both cases of Comparative Example 105 in which a linear liquid crystal resin is used and Comparative Example 106 in which a hyperbranched-polyester resin, which does not satisfy requirements of the present invention, is used, the fluidity improving effect was not exerted. In case of Comparative Examples 107 and 108 in which a hyperbranched-resin having a structure, which is different from that of the present invention, is blended small fluidity improving effect was exerted. In contrast, the resin compositions of Examples had good balance between excellent coolant resistance and fluidity.

INDUSTRIAL APPLICABILITY

The hyperbranched-polyester of the present invention has small anisotropy and is excellent in viscosity response under shear and also has a lot of reactive functional groups, and is therefore excellent in reactivity and compatibility with various thermoplastic resins. Therefore, thin-wall flowability, stiffness and gas barrier property can be remarkably

TABLE 29

|  |  |  | Examples ||||||||||||
|  |  |  | 174 | 175 | 176 | 177 | 178 | 179 | 180 | 181 | 182 | 183 | 184 | 185 | 186 |
|---|---|---|---|---|---|---|---|---|---|---|---|---|---|---|---|
| Polyamide resin having amide group concentration of 7 or more | C-25 | Parts by weight | 100 | 100 | 100 | 100 | 100 | 100 | 100 |  | 100 | 100 | 100 | 100 | 100 |
|  | C-26 | Parts by weight |  |  |  |  |  |  |  | 100 |  |  |  |  |  |
| Resin other than polyamide resin having amide group concentration of 7 or more | C-19 | Parts by weight |  |  |  |  |  |  |  |  |  |  |  | 20 |  |
|  | C-5 | Parts by weight |  |  |  |  |  |  |  |  |  |  |  |  | 20 |
| Fibrous inorganic filler | D-7 | Parts by weight | 50 | 50 | 50 | 50 | 50 | 50 | 50 | 50 | 50 | 50 | 100 | 60 | 60 |
| Hyperbranched-polyester | A-20 | Parts by weight | 2 |  |  |  |  |  |  |  |  |  |  |  |  |
|  | A-21 | Parts by weight |  | 2 |  |  |  |  |  | 2 | 1 | 5 | 2 | 2 | 2 |
|  | A-1 | Parts by weight |  |  | 2 |  |  |  |  |  |  |  |  |  |  |
|  | A-2 | Parts by weight |  |  |  | 2 |  |  |  |  |  |  |  |  |  |
|  | A-5 | Parts by weight |  |  |  |  | 2 |  |  |  |  |  |  |  |  |
|  | A-8 | Parts by weight |  |  |  |  |  | 2 |  |  |  |  |  |  |  |
|  | A-9 | Parts by weight |  |  |  |  |  |  | 2 |  |  |  |  |  |  |
| Flow length |  | mm | 110 | 120 | 110 | 100 | 100 | 90 | 90 | 100 | 80 | 140 | 80 | 120 | 100 |
| Tensile strength |  | MPa | 160 | 165 | 160 | 160 | 160 | 160 | 160 | 160 | 165 | 160 | 200 | 180 | 170 |
| Coolant resistance | Tensile strength | MPa | 95 | 100 | 90 | 95 | 90 | 90 | 90 | 95 | 100 | 90 | 120 | 90 | 90 |
|  | Strength retention rate | % | 59 | 61 | 56 | 59 | 56 | 56 | 56 | 59 | 61 | 56 | 60 | 50 | 53 |

TABLE 30

|  |  |  | Comparative Examples |||||||
|  |  |  | 102 | 103 | 104 | 105 | 106 | 107 | 108 |
|---|---|---|---|---|---|---|---|---|---|
| Polyamide resin having amide group concentration of 7 or more | C-25 | Parts by weight | 100 |  |  | 100 | 100 | 100 | 100 |
|  | C-26 | Parts by weight |  | 100 |  |  |  |  |  |
| Resin other than polyamide resin having amide group concentration of 7 or more | C-19 | Parts by weight |  |  | 100 |  |  |  |  |
| Fibrous inorganic filler | D-7 | Parts by weight | 50 | 50 | 50 | 50 | 50 | 50 | 50 |
| Additives | B-1 | Parts by weight |  |  |  | 2 |  |  |  |
|  | B-2 | Parts by weight |  |  |  |  | 2 |  |  |
|  | B-4 | Parts by weight |  |  |  |  |  | 2 |  |
|  | B-5 | Parts by weight |  |  |  |  |  |  | 2 |
| Flow length |  | mm | 50 | 40 | 100 | 45 | 45 | 60 | 60 |
| Tensile strength |  | MPa | 160 | 160 | 190 | 160 | 165 | 165 | 160 |
| Coolant resistance | Tensile strength | MPa | 90 | 90 | 25 | 80 | 90 | 95 | 95 |
|  | Strength retention rate | % | 56 | 56 | 13 | 50 | 55 | 58 | 59 | improved by blending the hyperbranched-polyester of the present invention with a thermoplastic resin.

The thermoplastic resin composition blended with the hyperbranched-polyester of the present invention can be formed into moldings, sheets, pipes, films and fibers, which have excellent surface appearance (color tone) and mechanical properties, heat resistance and flame retardancy, by a molding method such as a conventional injection molding, extrusion molding or press molding method. The thermoplastic resin composition is particularly useful for giant moldings having a thin-wall portion and fuel tanks having a gas barrier property.

The invention claimed is:

1. A hyperbranched-polyester comprising structural units of an aromatic oxycarbonyl unit (P), aromatic and/or aliphatic dioxy units (Q), and an aromatic dicarboxy unit (R), and a trifunctional or higher polyfunctional organic residue (B), wherein the organic residue B is an organic residue of a compound represented by the formula (5) or the formula (6):

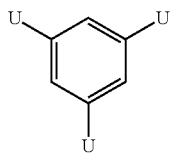

where

—U = —COOH or —OH or —NH2

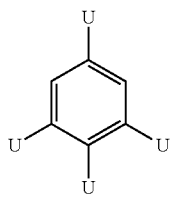

where

—U = —COOH or —OH or —NH2 and the content of B is within a range from 7.5 to 50 mol % based on entire monomers constituting the hyperbranched-polyester, a ratio of p to q and a ratio of p to r are each within a range from 5/95 to 95/5, where p, q and r are molar ratios of structural units P, Q and R, respectively, and the hyperbranched-polyester shows melt liquid crystallinity.

2. The hyperbranched-polyester according to claim 1, wherein the aromatic oxycarbonyl unit (P), the aromatic and/or aliphatic dioxy unit (Q) and the aromatic dicarboxy unit (R) each represents at least one kind of a structural unit selected from structural units represented by the following formula (1) and, when the content of B is 1 mol, the contents p, q and r of P, Q and R satisfy the following equation:

$p+q+r=1$ to 10 mol:

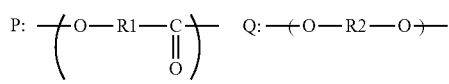

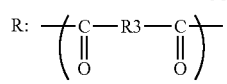

wherein R1, R2 and R3 each represents at least one kind of a structural unit selected from structural units represented by the following formulas:

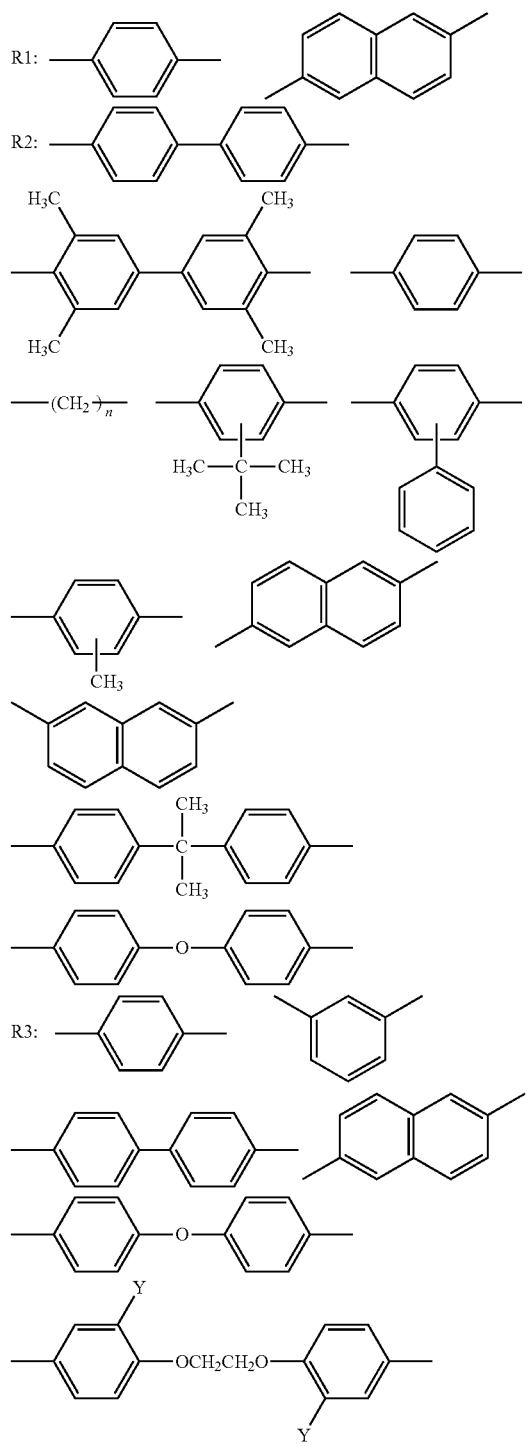

wherein Y represents at least one kind selected from a hydrogen atom, a halogen atom and an alkyl group, and n represents an integer of 2 to 8.

3. The hyperbranched-polyester according claim 1, which contains a molecular framework represented by the formula (2):

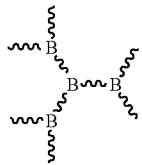
(2)

wherein B represents an organic residue of a trifunctional compound and B and B are bonded directly by an eater bond and/or an amide bond, or bonded via a structural unit selected from P, Q and R.

4. The hyperbranched-polyester according to claim 1, wherein contains a molecular framework represented by the formula (3):

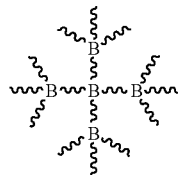
(3)

wherein B represents an organic residue of a tetrafunctional compound, B and B are bonded directly by an ester bond and/or an amide bond, or bonded via a structural unit selected from P, Q and R.

5. The hyperbranched-polyester according to claim 1, wherein the hyperbranched-polyester has a number average molecular weight of from 1,000 to 5,000.

6. The hyperbranched-polyester according to claim 1, wherein the terminal functional group of the hyperbranched-polyester is capped with a monofunctional organic Compound.

7. A thermoplastic resin composition comprising the hyperbranched-polyester according to claim 1 and a thermoplastic resin.

8. The thermoplastic resin composition according to claim 7, which contains 0.01 to 99 parts by weight of a hyperbranched-polyester based on 100 parts by weight of the thermoplastic resin.

9. The thermoplastic resin composition according to claim 7, wherein the thermoplastic resin is at least one kind of a thermoplastic resin selected from polyamide, polyester, polycarbonate and polyarylene sulfide.

10. The thermoplastic resin composition according to claim 9, wherein the thermoplastic resin is at least one kind of a thermoplastic resin selected from polyamide and polyester.

11. The thermoplastic resin composition according to claim 7, which further contains 1 to 100 parts by weight of an impact modifier based on 100 parts by weight of the thermoplastic resin.

12. The thermoplastic resin composition according to claim 7, which further contains 0.01 to 200 parts by weight of an inorganic filler based on 100 parts by weight of the thermoplastic resin.

13. The thermoplastic resin composition according to claim 7, which further contains 1 to 150 parts by weight of a flame retardant based on 100 parts by weight of the thermoplastic resin.

14. A molding comprising the thermoplastic resin composition according to claim 7.

* * * * *

UNITED STATES PATENT AND TRADEMARK OFFICE
CERTIFICATE OF CORRECTION

| | | |
|---|---|---|
| PATENT NO. | : 8,097,685 B2 | Page 1 of 1 |
| APPLICATION NO. | : 12/225811 | |
| DATED | : January 17, 2012 | |
| INVENTOR(S) | : Tachikawa et al. | |

It is certified that error appears in the above-identified patent and that said Letters Patent is hereby corrected as shown below:

In the Claims

Claim 1, line 3: "aromatic dicarboxy unit (R)" should read --aromatic dicarbonyl unit (R)--.

Claim 2, lines 3 and 4: "aromatic dicarboxy unit (R)" should read --aromatic dicarbonyl unit (R)--.

Claim 3, third line from the end: "eater bond" should be changed to --ester bond--.

Signed and Sealed this
Eleventh Day of February, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,097,685 B2
APPLICATION NO. : 12/225811
DATED : January 17, 2012
INVENTOR(S) : Tachikawa et al.

It is certified that error appears in the above-identified patent and that said Letters Patent is hereby corrected as shown below:

In the Claims

Column 73, Claim 1, line 18: "aromatic dicarboxy unit (R)" should read --aromatic dicarbonyl unit (R)--.

Column 73, Claim 2, lines 54 and 55: "aromatic dicarboxy unit (R)" should read --aromatic dicarbonyl unit (R)--.

Column 75, Claim 3, line 18: "eater bond" should be changed to --ester bond--.

This certificate supersedes the Certificate of Correction issued February 11, 2014.

Signed and Sealed this
Eighteenth Day of March, 2014

Michelle K. Lee
*Deputy Director of the United States Patent and Trademark Office*